United States Patent
Berger et al.

(10) Patent No.: US 8,456,484 B2
(45) Date of Patent: *Jun. 4, 2013

(54) APPARATUS AND METHODS FOR WRAPPING TEXTURE ONTO THE SURFACE OF A VIRTUAL OBJECT

(75) Inventors: Torsten Berger, Watertown, MA (US); Elaine Chen, Arlington, MA (US); Walter C. Shannon, III, West Newton, MA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,507

(22) Filed: May 7, 2012

(65) Prior Publication Data

US 2013/0009948 A1    Jan. 10, 2013

Related U.S. Application Data

(63) Continuation of application No. 13/026,667, filed on Feb. 14, 2011, now Pat. No. 8,174,535, which is a continuation of application No. 10/733,862, filed on Dec. 10, 2003, now Pat. No. 7,889,209.

(51) Int. Cl.
*G09G 5/00* (2006.01)
*G06T 15/04* (2006.01)
*G06T 11/00* (2006.01)

(52) U.S. Cl.
CPC .............. *G06T 15/04* (2013.01); *G06T 11/001* (2013.01)
USPC ........... 345/582; 345/419; 345/420; 345/423; 345/424; 345/428; 345/581; 345/587

(58) Field of Classification Search
None
See application file for complete search history.

(56) References Cited

U.S. PATENT DOCUMENTS

| 2,475,484 A | 7/1949 | DeNise |
| 3,168,203 A | 2/1965 | Gallistel |

(Continued)

FOREIGN PATENT DOCUMENTS

| EP | 0915434 A2 | 5/1999 |
| GB | 2389764 A | 12/2003 |

(Continued)

OTHER PUBLICATIONS

Altmann, "About Nonuniform Rational B-Splines—NURBS," <http://www.cs.wpi.edu/~matt/courses/cs563/talks/nurbs.html>., printed Jul. 29, 2003, 6 pgs.

(Continued)

*Primary Examiner* — Antonio A Caschera
(74) *Attorney, Agent, or Firm* — Choate, Hall & Stewart LLP

(57) ABSTRACT

The invention provides techniques for wrapping a two-dimensional texture conformally onto a surface of a three dimensional virtual object within an arbitrarily-shaped, user-defined region. The techniques provide minimum distortion and allow interactive manipulation of the mapped texture. The techniques feature an energy minimization scheme in which distances between points on the surface of the three-dimensional virtual object serve as set lengths for springs connecting points of a planar mesh. The planar mesh is adjusted to minimize spring energy, and then used to define a patch upon which a two-dimensional texture is superimposed. Points on the surface of the virtual object are then mapped to corresponding points of the texture. The invention also features a haptic/graphical user interface element that allows a user to interactively and intuitively adjust texture mapped within the arbitrary, user-defined region.

16 Claims, 25 Drawing Sheets

U.S. PATENT DOCUMENTS

| | | |
|---|---|---|
| 3,263,824 A | 8/1966 | Jones et al. |
| 3,449,008 A | 6/1969 | Colechia |
| 3,531,868 A | 10/1970 | Stevenson |
| 3,618,786 A | 11/1971 | Fick |
| 3,637,092 A | 1/1972 | George et al. |
| 3,920,972 A | 11/1975 | Corwin, Jr. et al. |
| 3,944,798 A | 3/1976 | Eaton |
| 4,062,455 A | 12/1977 | Flatau |
| 4,150,803 A | 4/1979 | Fernandez |
| 4,216,467 A | 8/1980 | Colston |
| 4,302,138 A | 11/1981 | Zarudiansky |
| 4,367,532 A | 1/1983 | Crum et al. |
| 4,420,808 A | 12/1983 | Diamond et al. |
| 4,521,685 A | 6/1985 | Rebman |
| 4,604,016 A | 8/1986 | Joyce |
| 4,632,341 A | 12/1986 | Repperger et al. |
| 4,638,798 A | 1/1987 | Shelden et al. |
| 4,653,011 A | 3/1987 | Iwano et al. |
| 4,654,648 A | 3/1987 | Herrington et al. |
| 4,655,673 A | 4/1987 | Hawkes |
| 4,661,032 A | 4/1987 | Arai et al. |
| 4,670,851 A | 6/1987 | Murakami et al. |
| 4,676,002 A | 6/1987 | Slocum |
| 4,680,519 A | 7/1987 | Chand et al. |
| 4,686,522 A | 8/1987 | Hernandez et al. |
| 4,703,443 A | 10/1987 | Moriyasu |
| 4,729,098 A | 3/1988 | Cline et al. |
| 4,769,763 A | 9/1988 | Trieb et al. |
| 4,791,934 A | 12/1988 | Brunnett |
| 4,795,296 A | 1/1989 | Jau |
| 4,800,721 A | 1/1989 | Cemenska et al. |
| 4,819,195 A | 4/1989 | Bell et al. |
| 4,823,634 A | 4/1989 | Culver |
| 4,837,734 A | 6/1989 | Ichikawa et al. |
| 4,839,838 A | 6/1989 | LaBiche et al. |
| 4,853,874 A | 8/1989 | Iwamoto et al. |
| 4,888,538 A | 12/1989 | Dimitrov et al. |
| 4,893,981 A | 1/1990 | Yoshinada et al. |
| 4,907,970 A | 3/1990 | Meenen, Jr. |
| 4,907,973 A | 3/1990 | Hon |
| 4,942,538 A | 7/1990 | Yuan et al. |
| 4,945,305 A | 7/1990 | Blood |
| 4,945,501 A | 7/1990 | Bell et al. |
| 4,961,138 A | 10/1990 | Gorniak |
| 4,973,111 A | 11/1990 | Haacke et al. |
| 4,973,215 A | 11/1990 | Karlen et al. |
| 4,982,504 A | 1/1991 | Soderberg et al. |
| 4,988,981 A | 1/1991 | Zimmerman et al. |
| 5,004,391 A | 4/1991 | Burdea |
| 5,007,300 A | 4/1991 | Siva et al. |
| 5,018,922 A | 5/1991 | Yoshinada et al. |
| 5,019,761 A | 5/1991 | Kraft |
| 5,038,089 A | 8/1991 | Szakaly |
| 5,040,306 A | 8/1991 | McMurtry et al. |
| 5,044,956 A | 9/1991 | Behensky et al. |
| 5,053,975 A | 10/1991 | Tsuchihashi et al. |
| 5,072,361 A | 12/1991 | Davis et al. |
| 5,088,046 A | 2/1992 | McMurtry et al. |
| 5,088,055 A | 2/1992 | Oyama et al. |
| 5,103,404 A | 4/1992 | McIntosh |
| 5,105,367 A | 4/1992 | Tsuchihashi et al. |
| 5,116,051 A | 5/1992 | Moncrief et al. |
| 5,116,180 A | 5/1992 | Fung et al. |
| 5,130,632 A | 7/1992 | Ezawa et al. |
| 5,131,844 A | 7/1992 | Marinaccio et al. |
| 5,142,931 A | 9/1992 | Menahem |
| 5,143,505 A | 9/1992 | Burdea et al. |
| 5,184,319 A | 2/1993 | Kramer |
| 5,185,561 A | 2/1993 | Good et al. |
| 5,189,806 A | 3/1993 | McMurtry et al. |
| 5,193,963 A | 3/1993 | McAffee et al. |
| 5,204,824 A | 4/1993 | Fujimaki et al. |
| 5,220,260 A | 6/1993 | Schuler |
| 5,223,776 A | 6/1993 | Radke et al. |
| 5,237,647 A | 8/1993 | Roberts et al. |
| 5,239,246 A | 8/1993 | Kim |
| 5,255,211 A | 10/1993 | Redmond |
| 5,255,352 A | 10/1993 | Falk |
| 5,264,768 A | 11/1993 | Gregory et al. |
| 5,266,875 A | 11/1993 | Slotine et al. |
| 5,333,257 A | 7/1994 | Merrill et al. |
| 5,354,162 A | 10/1994 | Burdea et al. |
| 5,369,736 A | 11/1994 | Kato et al. |
| 5,371,778 A | 12/1994 | Yanof et al. |
| 5,382,885 A | 1/1995 | Salcudean et al. |
| 5,389,865 A | 2/1995 | Jacobus et al. |
| 5,396,265 A | 3/1995 | Ulrich et al. |
| 5,414,337 A | 5/1995 | Schuler |
| 5,429,140 A | 7/1995 | Burdea et al. |
| 5,438,529 A | 8/1995 | Rosenberg et al. |
| 5,446,834 A | 8/1995 | Deering |
| 5,459,382 A | 10/1995 | Jacobus et al. |
| 5,461,709 A | 10/1995 | Brown |
| 5,482,051 A | 1/1996 | Reddy et al. |
| 5,489,830 A | 2/1996 | Fernandez |
| 5,497,452 A | 3/1996 | Shimizu et al. |
| 5,506,785 A | 4/1996 | Blank et al. |
| 5,515,078 A | 5/1996 | Greschler et al. |
| 5,555,894 A | 9/1996 | Doyama et al. |
| 5,559,412 A | 9/1996 | Schuler |
| 5,576,727 A | 11/1996 | Rosenberg et al. |
| 5,587,937 A | 12/1996 | Massie et al. |
| 5,589,854 A | 12/1996 | Tsai et al. |
| D377,932 S | 2/1997 | Schena et al. |
| 5,623,582 A | 4/1997 | Rosenberg |
| 5,623,642 A | 4/1997 | Katz et al. |
| 5,625,576 A | 4/1997 | Massie et al. |
| 5,629,594 A | 5/1997 | Jacobus et al. |
| 5,642,469 A | 6/1997 | Hannaford et al. |
| 5,659,493 A | 8/1997 | Kiridena et al. |
| 5,666,138 A | 9/1997 | Culver |
| 5,691,898 A | 11/1997 | Rosenberg et al. |
| 5,694,013 A | 12/1997 | Stewart et al. |
| 5,701,140 A | 12/1997 | Rosenberg et al. |
| 5,721,566 A | 2/1998 | Rosenberg et al. |
| 5,724,264 A | 3/1998 | Rosenberg et al. |
| 5,731,804 A | 3/1998 | Rosenberg |
| 5,734,373 A | 3/1998 | Rosenberg et al. |
| 5,737,505 A | 4/1998 | Shaw et al. |
| 5,739,811 A | 4/1998 | Rosenberg et al. |
| 5,742,278 A | 4/1998 | Chen et al. |
| 5,751,289 A | 5/1998 | Myers |
| 5,754,023 A | 5/1998 | Roston et al. |
| 5,767,839 A | 6/1998 | Rosenberg |
| 5,769,640 A | 6/1998 | Jacobus et al. |
| 5,774,130 A | 6/1998 | Horikawa et al. |
| 5,784,542 A | 7/1998 | Ohm et al. |
| 5,790,108 A | 8/1998 | Salcudean et al. |
| 5,798,752 A | 8/1998 | Buxton et al. |
| 5,800,177 A | 9/1998 | Gillio |
| 5,800,178 A | 9/1998 | Gillio |
| 5,800,179 A | 9/1998 | Bailey |
| 5,802,353 A | 9/1998 | Avila et al. |
| 5,803,738 A | 9/1998 | Latham |
| 5,805,140 A | 9/1998 | Rosenberg et al. |
| 5,821,920 A | 10/1998 | Rosenberg et al. |
| 5,825,308 A | 10/1998 | Rosenberg |
| 5,828,197 A | 10/1998 | Martin et al. |
| 5,831,408 A | 11/1998 | Jacobus et al. |
| 5,844,392 A | 12/1998 | Peurach et al. |
| 5,847,956 A | 12/1998 | Bronfeld et al. |
| 5,859,934 A | 1/1999 | Green |
| 5,872,438 A | 2/1999 | Roston |
| 5,873,106 A | 2/1999 | Joseph |
| 5,880,714 A | 3/1999 | Rosenberg et al. |
| 5,881,178 A | 3/1999 | Tsykalov et al. |
| 5,882,206 A | 3/1999 | Gillio |
| 5,889,670 A | 3/1999 | Schuler et al. |
| 5,898,599 A | 4/1999 | Massie et al. |
| 5,903,270 A | 5/1999 | Gentry et al. |
| 5,903,886 A | 5/1999 | Heimlich et al. |
| 5,907,487 A | 5/1999 | Rosenberg et al. |
| 5,913,727 A | 6/1999 | Ahdoot |
| 5,929,607 A | 7/1999 | Rosenberg et al. |
| 5,929,846 A | 7/1999 | Rosenberg et al. |
| 5,956,484 A | 9/1999 | Rosenberg et al. |
| 5,963,212 A | 10/1999 | Bakalash et al. |

| | | | |
|---|---|---|---|
| 5,973,678 | A | 10/1999 | Stewart et al. |
| 5,988,862 | A | 11/1999 | Kacyra et al. |
| 6,040,840 | A | 3/2000 | Koshiba et al. |
| 6,061,004 | A | 5/2000 | Rosenberg |
| 6,064,394 | A | 5/2000 | Morrison |
| 6,084,587 | A | 7/2000 | Tarr et al. |
| 6,111,577 | A | 8/2000 | Zilles et al. |
| 6,131,097 | A | 10/2000 | Peurach et al. |
| 6,188,403 | B1 | 2/2001 | Sacerdoti et al. |
| 6,191,796 | B1 | 2/2001 | Tarr |
| 6,204,851 | B1 | 3/2001 | Netschke et al. |
| 6,211,848 | B1 | 4/2001 | Plesniak et al. |
| 6,219,032 | B1 | 4/2001 | Rosenberg et al. |
| 6,226,003 | B1 | 5/2001 | Akeley |
| 6,308,144 | B1 | 10/2001 | Bronfeld et al. |
| 6,337,678 | B1 | 1/2002 | Fish |
| 6,342,880 | B2 | 1/2002 | Rosenberg et al. |
| 6,369,834 | B1 | 4/2002 | Zilles et al. |
| 6,384,822 | B1 | 5/2002 | Bilodeau et al. |
| 6,405,158 | B1 | 6/2002 | Massie et al. |
| 6,417,638 | B1 | 7/2002 | Guy et al. |
| 6,421,048 | B1 | 7/2002 | Shih et al. |
| 6,552,722 | B1 | 4/2003 | Shih et al. |
| 6,608,631 | B1 | 8/2003 | Milliron |
| 6,671,651 | B2 | 12/2003 | Goodwin et al. |
| 6,707,458 | B1 | 3/2004 | Leather et al. |
| 6,792,398 | B1 | 9/2004 | Handley et al. |
| 6,822,635 | B2 | 11/2004 | Shahoian et al. |
| 6,831,640 | B2 | 12/2004 | Shih et al. |
| 6,853,965 | B2 | 2/2005 | Massie et al. |
| 6,879,315 | B2 | 4/2005 | Guy et al. |
| D510,739 | S | 10/2005 | Jones et al. |
| 6,958,752 | B2 | 10/2005 | Jennings, Jr. et al. |
| 6,985,133 | B1 | 1/2006 | Rodomista et al. |
| 7,236,176 | B2 | 6/2007 | Milinusic |
| 7,889,209 | B2 * | 2/2011 | Berger et al. ............ 345/585 |
| 8,174,535 | B2 * | 5/2012 | Berger et al. ............ 345/582 |
| 2002/0075283 | A1 | 6/2002 | Payne |
| 2002/0089500 | A1 | 7/2002 | Jennings et al. |
| 2002/0154132 | A1 | 10/2002 | Dumesny et al. |
| 2002/0158842 | A1 | 10/2002 | Guy et al. |
| 2003/0117411 | A1 | 6/2003 | Fujiwara et al. |
| 2003/0128208 | A1 | 7/2003 | Shih et al. |
| 2003/0191554 | A1 | 10/2003 | Russell et al. |
| 2005/0060130 | A1 | 3/2005 | Shapiro et al. |
| 2005/0062738 | A1 | 3/2005 | Handley et al. |
| 2005/0168460 | A1 | 8/2005 | Razdan et al. |

FOREIGN PATENT DOCUMENTS

| | | |
|---|---|---|
| GB | 2410351 A | 7/2005 |
| WO | WO-95/02801 A1 | 1/1995 |
| WO | WO-9616397 A1 | 5/1996 |
| WO | WO-9622591 A1 | 7/1996 |
| WO | WO-9642078 A1 | 12/1996 |
| WO | WO-9706410 A1 | 2/1997 |
| WO | WO-9712337 A1 | 4/1997 |
| WO | WO-9712357 A1 | 4/1997 |
| WO | WO-9719440 A1 | 5/1997 |
| WO | WO-9721160 A2 | 6/1997 |
| WO | WO-9744775 A1 | 11/1997 |
| WO | WO-9806024 A1 | 2/1998 |
| WO | WO-9826342 A2 | 6/1998 |
| WO | WO-9830951 A2 | 7/1998 |
| WO | WO-9858308 A1 | 12/1998 |
| WO | WO-9858323 A2 | 12/1998 |
| WO | WO-9910872 A1 | 3/1999 |

OTHER PUBLICATIONS

Apple Computer Inc., "OpenGL for Mac OS: Glossary," <http://www.developer.apple.com/documentation/GraphicsImaging/Conceptual/OpenGL/glossary> . . . , printed Aug. 2002, 3pgs.

Avid Technology, "Curves," printed Nov. 6, 2003, http://www.iro.umontreal.ca/~roys/softimage/html/model/curves.html, chapter 10, 19 pgs.

Avid Technology, "Fundamentals of NURBS Modeling," printed Nov. 6, 2003, http://www.iro.umontreal.ca/~roys/softimage/html/model/nurbs_basics.html, chapter 9, 7 pgs.

Avid Technology, "Surfaces," printed Nov. 6, 2003, http://www.iro.umontreal.ca/~roys/softimage/html/model/surfs.html, chapter 11, 22 pgs.

Adachi, "Touch and Trace on the Free-Form Surface of Virtual Object," Proceedings of IEEE Virtual Reality Annual International Symposium, Sep. 18-22, 1993, Seattle WA, pp. 162-168.

Agrawala et al., "3D Painting on Scanned Surfaces", Stanford University, 1995, pp. 145-150.

Barr, "Global and Local Deformations of Solid Primitives"; Computer Graphics; vol. 18, No. 3, pp. 21-30 (Jul. 1984).

Bentley, "Rendering Cubic Bezier Patches," Worcester Polytechnic Institute, printed Nov. 17, 2003, http://www.cs.wpi.edu/~matt/courses/cs563/talks/surface/bez_surf.html, 10 pgs.

Birn, "How to Model a Hairy Hippo Nose in Softimage 3D," <http.www.3drender.com/jbirn/hippo/hairyhipponose.html>, printed Jul. 29, 2003, 3 pgs.

Birn, "Mental Ray Resources," <http://www.3drender.com/ref/max.htm>., printed Jul. 29, 2003, 4 pgs.

Birn, "NurbsPatchHead.igs," <http://www.turbosquid.com/HTMLClient/FullPreview/>. . . printed Jul. 29, 2003, 1 pg.

Birn, "Softimage's Surface Continuity Manager," <' http://www.3drender.com/ncf/index.html>, printed Jul. 29, 2003, 2 pgs.

Birn, "Tutorial: NURBS Head Modeling," printed Jul. 29, 2003, http://www.3drender.com/jbirn/ea/HeadModel.html, 5 pgs.

Blinn, "Simulation of Wrinkled Surfaces," Computer Graphics, vol. 12-3, Aug. 1978, pp. 286-292.

Brooks et al., "Project GROPE—Haptic Displays for Scientific Visualization," Computer Graphics, vol. 24, No. 4, Aug. 1990, pp. 177-185.

Creating a Lathed NURBS Surface, http://www.maxhelp.com/content/tutorials/nurbs/nurbs.htm, printed Jul. 29, 2003, 3 pgs.

CSB/SJU IT Services, "Color Depth and Color Spaces," <http://www.csbsju.edu/itsevices/teaching/c_space/colors.htm>, Sep. 12, 2003, 3 pgs.

Decaudin, "Geometric Deformation by Merging a 3D-Object with a Simple Shape," Graphics Interface '96 Proceedings (Toronto, Canada), 6 pgs. (May 21-24, 1996).

Digital Photography and Imaging Glossary, Aug. 2000.

Dworkin et al., "A New Model for Efficient Dynamic," Fourth Eurographics Animation and Simulation Workshop Proceedings Eurographics Technical Report Series, ISSN 1017-4656, Sep. 4-5, 1993, pp. 135-147.

Elhajj et al., "Supermedia-Enhanced Internet-Based Telerobotics," Proceedings of the IEEE, vol. 91, No. 3, pp. 396-421 (Mar. 2003).

Farin, "NURBS," printed Nov. 17, 2003, www.eros.cagd.eas.asu.edu/~farin/rbook/toc.html, 2 pgs.

Fisher et al., "Pixel Values," http://www/dai.ed.ac.uk/HIPR2/value.htm (1 pg.), 2003.

Foskey et al, "ArtNova: Touch-Enabled 3D Model Design," Proceedings of IEEE Virtual Reality 2002, Mar. 24-28, 2002, Orlando, Florida pp. 119-126.

Fuentes et al., "The Virtual Tool Approach to Dextrous Telemanipulation," Proceedings of the 1996 IEEE International Conference on Robotics and Automation (Minneapolis, MN), pp. 1700-1705 (Apr. 1996).

Galyean, "Sculpting: An Interactive Volumetric Modeling Technique," Computer Graphics (SIGGRAPH '91 Las Vegas), vol. 25, No. 4, pp. 267-274 (Jul. 1991).

Geomagic, "geomagicshape," <http;//www.geomagic.com/products/shape/>, printed Nov. 26, 2003.

Gu et al., "Global Conformal Surface Parameterization," Eurographics Symposium on Geometry Processing (2003), 12 pgs.

Hashimoto et al., "Dynamic Force Simulator for Force Feedback Human-Machine Interaction", IEEE, Sep. 1993, pp. 209-215.

Hirata et al., "3-Dimensional Interface Device for Virtual Work Space," Proceedings of the 1992 IEEE, Jul. 7-10, 1992, pp. 889-896.

Hirota et al., "Development of Surface Display," Proceedings of the Virtual Reality Annual International Symposium (Seattle), pp. 256-262 (Sep. 18-23, 1993).

Hirota et al., "Providing Force Feedback in Virtual Environments", IEEE, Sep. 1995, pp. 22-30.

"How to Create Complex Meshes With NURBS," http://www.geocities.com/SiliconValley/Lakes/2057/nurbs.html>., printed Jul. 29, 2003, 4 pgs.

Immersion Corporation, "Laparoscopic Impulse Engine : A New Force Feedback Surgical Simulation Tool", Immersion Corporation, 1995. http://www.immerse.com/wwwpages/laplEpg.htm.

Immersion Corporation, "The Impulse Engine ", 1 page, Immersion Corporation, 1996.

Immersion Corporation, "Virtual Laparoscopic Interface", Immersion Corporation, 1995, 1 pg.

Ishii et al., "A 3D Interface Device with Force Feedback: A Virtual Work Space for Pick-and-Place Tasks", IEEE, Sep. 1993, pp. 331-335.

Iwata, "Artificial Reality with Force-feedback: Development of Desktop Virtual Space with Compact Master Manipulator," Computer Graphics (SIGGRAPH '90 Dallas), vol. 24, No. 4, pp. 165-170 (Aug. 1990).

Jay Arraich's Photoshop Tips, "7 Quick Mask," <http://www.arraich.com/ref/aatool-quick_mask6.htm>, printed Sep. 12, 2003, 3 pgs.

Kelley et al. "MagicMouse: Tactile and Kinesthetic Feedback in the Human-Computer Interface Using an Electromagnetically Actuated Input/Output Device," Department of Electrical Engineering, University of British Columbia, Vancouver, BC, V6T 1Z4, Canada, Oct. 19, 1993, pp. 1-27.

Komerska et al., "Haptic Interface for Center-of-Workspace Interaction: Demonstration Paper," *Haptics Interfaces for Virtual Environments and Teleoperator Systems* (2002), pp. 352-353.

Kotoku et al., "A Force Display Algorithm for Virtual Environments," SICE, pp. 347-355, 1992.

Luo et al., "Networked Intelligent Robots Through the Internet: Issues and Opportunities," Proceedings of the IEEE, vol. 91, No. 3, pp. 371-382 (Mar. 2003).

Macadac Engineering, Inc., "The power of 3D photography: Turning physical objects into digital assets," <http://www.macdac.com/raindrop/studio.htm>, printed Oct. 3, 2003, 4 pgs.

Marcus et al., "EXOS Research on Master Controllers for Robotic Devices," Fifth Annual Workshop on Space Operations Applications and Research (SOAR '91) pp. 238-245, Jul. 1991.

Massie, "Design of a Three Degree of Freedom Force-Reflecting Haptic Interface", Massachusetts Institute of Technology; Bachelor of Science in Electrical Science and Engineering Thesis, May 1993, pp. 1-38.

Massie, "Initial Haptic Explorations with the Phantom: Virtual Touch Through Point Interaction", Massachusetts Institute of Technology Master of Science Thesis, Feb. 1996, pp. 1-49. (not admitted as prior art).

Math Forum, "What is a Tessellation?", http://rnathforum.org/sum95/suzanne/whattess.html>, printed Jul. 29, 2003, 4pgs.

MathWorld, "Conformal Mapping," <http://mathworld.wolfram.com/ConformalMapping.html>, printed Nov. 11, 2003.

McAffee et al, "Teleoperator Subsystem/Telerobot Demonstrator," Force Reflecting Hand Controller Equipment Manual, Jet Propulsion Laboratory, Jan. 1988.

Miller et al., "The Design of 3D Haptic Widgets," Proceedings of the 1999 Symposium on Interactive 3D Graphics Conference Proceedings, (1999) pp. 1-6.

Millman et al., "A System for the Implementation and Kinesthetic Display of Virtual Environments," Telemanipulator Technology, Proceedings of 1992 SPIE, vol. 1833, pp. 49-56.

Minsky et al., "Feeling and Seeing: Issues in Force Display," Computer Graphics, vol. 24, No. 2, Mar. 1990, pp. 235-270.

Minsky, "Computational Haptics: The Sandpaper System for Synthesizing Texture for a Force-Feedback Display," Massachusetts Institute of Technology Ph.D. Thesis, Jun. 1995, pp. 1-217.

Models and Modeling, <http://www.3drender.com/models/index.htm>, printed Jul. 29, 2003, 1 pg.

Morgenbesser, "Force Shading for Shape Perception in Haptic Virtual Environments", Massachusetts Institute of Technology Master of Engineering Thesis, Sep. 1995, pp. 1-77.

Nagel, "A Closer Look: Photoshop's New Paint Engine, p. 2 of 3," Mar. 7, 2002, http://www.creativemac.com/2002/03_mar/features/ps7dynamics1.htm (6 pgs.).

Nicholson, "Photoshop," <http://iit.bloomu.edu/vthc/Photoshop/Basics/layers.htm>, printed Sep. 12, 2003.

"Nurbs Curves & Surfaces," <http://www.ocnus.com/NURBS/>, printed Jul. 29, 2003, 2 pgs.

"NURBS Models," <http://www.3drender.com/models/models.htm>, Jul. 29, 2003, 1 pg.

"NURBS-Non-Uniform Rational B-Splines," <http://www.aria.uklinux.net/nurbs.php3>, printed Jul. 29, 2003, 4 pgs.

Oboe, "Force-Reflecting Teleoperation Over the Internet: The JBIT Project," Proceedings of the IEEE, vol. 91, No. 3, pp. 449-462 (Mar. 2003).

Payne et al., "Distance Field Manipulation of Surface Models," IEEE Computer Graphics & Applications, pp. 65-71 (Jan. 1992).

Photoshop Techniques, "How to Use Postscript Art as a Stencil in Photoshop," Swanson Technical Support, 1994.

Rogers, "An Introduction to NURBS," *Morgan Kaufmann Publishers*, (2000), pp. 1-4.

Roxen Platform, "Graphics tags," <http://docs.roxen.com/roxen/1.3/creator/graphics/>, printed Sep. 12, 2003, 2 pgs.

Safaric et al., "Control of Robot Arm with Virtual Environment via the Internet," Proceedings of the IEEE, vol. 91, No. 3, pp. 422-429 (Mar. 2003).

Salisbury et al., "Haptic Rendering: Programming Touch Interaction with Virtual Objects," Presented and disseminated at the 1995 Symposium on Interactive 3D Graphics held Apr. 9-12, 1995 in Monterey, CA, sponsored by the Association for Computing Machinery (ACM) and published by the ACM in Proceedings: 1995 Symposium on Interactive 3D Graphics, Monterey, California, Apr. 9-12, 1995, pp. 123-130.

SensAble Technologies, Inc., "Phantom Haptic Interface," 1996, Cambridge, MA (6 pgs).

Sensable Technologies, "Feature Overview," Nov. 25, 2003 printout, http://www.sensable.com/products/3ddesign/freeform/overview.asp, 5 pgs.

Sensable Technologies, "Feature Overview: Emboss with Wrapped Image," Nov. 25, 2003 printout, http://www.sensable.com/products/3ddesign/freeform/emboss_with_wrap.asp, 1 pg.

Sharman C "The Marching Cubes Algorithm," http://www.exaflop.org/docs/marchcubes/ind.html (6 pgs.), Feb. 2006.

Snow et al., "Compact Force-Reflecting Hand Controller," NASA Tech Brief, vol. 15, No. 4 from Jet Propulsion Laboratory Report NPO-17851-7348, Apr. 1991, pp. i, 1-3, 1a-11a, 14a, 15a.

Sorkine, et. al, "Bounded-distortion Piecewise Mesh Parameterization," Proceedings of the Conference on Visualization 2002, Boston, Massachusetts, pp. 355-362.

Swarup, "Haptic Interaction with Deformable Objects Using Real-Time Dynamic Simulation", Massachusetts Institute of Technology, Sep. 1995, pp. 1-83.

Tan et al., "Virtual Environments for Internet-Based Robots—I: Modeling a Dynamic Environment," Proceedings of the IEEE, vol. 91, No. 3, pp. 383-388 (Mar. 2003).

Tan et al., "Virtual Environments for Internet-Based Robots—II: Path Planning," Proceedings of the IEEE, vol. 91, No. 3, pp. 389-395 (Mar. 2003).

"Tensor product spline surfaces," <http://www.ibiblio.org/e-notes/Splines/Inter.htm>, Aug. 24, 2001.

Terzopoulos et al.; "Elastically Deformable Models"; Computer Graphics, vol. 21, No. 4, pp. 205-214 (Jul. 1987).

"Texture Mapping," <http://www.geocities.com/SiliconValley/2151/tmap.html>, printed Nov. 26, 2003, 22 pgs., Feldman, The Win95 Game Programmer's Encyclopedia.

"3D Animation Workshop: Lesson 39—Softimage—NURBS Blending," <http://www.webreference.com/3d/lesson39/>, Apr. 28, 1988.

"3D Animation Workshop: Lesson 64—Introducing Max NURBS," http://www.webreference.com/3d/lesson64/ <http://www.webreference.com/3d/lesson39/>, Apr. 14, 1999.

"3D Animation Workshop: Lesson 65—Basic Max NURBS Surfaces," http://www.webreference.com/3d/lesson65/ <http://www.webreference.com/3d/lesson39/>, Apr. 28, 1998.

"3D Animation Workshop: Lesson 66—From Max NURBS to Polygons," http://www.webreference.com/3d/lesson66/ <http://www.webreference.com/3d/lesson39/>, May 12, 1999.

"3D Animation Workshop: Lesson 67—Basic Max NURBS Patches," <http://www.webreference,com/3d/lesson67/>, May 12, 1999.

"3D Animation Workshop: Lesson 68—Trimming Max NURBS," http://www.webreference.com/3d/lesson68/ <http://www.webreference.com/3d/lesson39/>, Jun. 8, 1999.

"3D Animation Workshop: Lesson 69—Max NURBS—The Piston Project," <http://www.webreference.com/3d/lesson69/>, Jul. 21, 1999.

"3D Animation Workshop: Lesson 72—A Challenging Model," http://www.webreference.com/3d/lesson72/ <http://www.webreference.com/3d/lesson39/>, Aug. 2, 1999.

"3D Animation Workshop: 3D Modeling Tutorials, Lessons, and Software Reviews," <http://www.webreference.com/3d/>, May 8, 2001, 6 pgs.

Tyson, Howstuffworks, "How AGP Works," <http://computer.howstuffworks.com/agp.htm/printable>, printed Jul. 15, 2003.

Wang et al., "Volume Sculpting", 1995 Symposium on Interactive 3D Graphics, Monterey, California, pp. 151-156.

University of North Carolina at Chapel Hill, "Touch-Enabled 3D Model Design," Department of Computer Science, Feb. 2002.

Yoshikawa et al., "Construction of Virtual World Using Dynamics Modules and Interaction Modules," Proceedings of the 1996 IEEE International Conference on Robotics and Automation (Minneapolis, MN), pp. 2358-2364 (Apr. 1996).

Zilles et al., "A Constraint-Based God-object Method for Haptic Display," published by IEEE Computer Society Press, Los Alamitos, California, in Proceedings of the 1995 IEEE/RSJ International Conference on Intelligent Robots and Systems—Human Robot Interaction and Cooperative Robots, held Aug. 5-9, 1995 in Pittsburgh, Pennsylvania, 1995, pp. 146-151.

Zilles, "Haptic Rendering with the Toolhandle Haptic Interface," Massachusetts Institute of Technology Master of Science Thesis, May 1995, pp. 1-46.

Deering, "Revival of the Virtual Lathe," <http://www-vrl.umich.edu/sel_prj/lathe/>, Dec. 20, 2002.

Joy, Kenneth I., "Catmull-Clark Surfaces," On-Line Geometric Modeling Notes, Computer Science Department, University of California, Davis, © 1996-1999.

"The Maya 4.5 Handbook (with CD-ROM) (Graphics Series)." Amazon.com citation, pp. 1-6 (See "Product Details" for date of Dec. 31, 2002), <http.//www.amazon.com/>.

Staiger, Phillip, "Tutorial—Amapi 4.1.5 Material Editor," Revised Jan. 1, 2001, © 2000-2001 TGS, Inc., <http://www.tgs.com>, accessed on Sep. 8, 2006 via <http://www.thebest3d.com/amapi/tutorials/materialeditor/>.

Staiger, Phillip, "Tutorial—Getting Started with Amapi 4.1," Revised Jul. 7, 2003, © 2000 TGS, Inc., <http://www.tgs.com>, accessed on Sep. 8, 2006 via <http://www.thebest3d.com/amapi/tutorials/materialeditor/>.

Watkins, Adam, "The Maya 4.5 Handbook," Charles River Media, Inc., © 2003, ISBN 1-58450234-7, Dec. 31, 2002, pp. 332-336.

Piponi et al., Seamless texture mapping of subdivision surfaces by model pelting and texture blending,: SIGGRAPH 2000, ACM Press/Addison-Wesley Publishing Co., New York, NY., pp. 471-478, ISBN: 1-58113-208-5.

US 5,903,456, 05/1999, Schena et al. (withdrawn)

\* cited by examiner

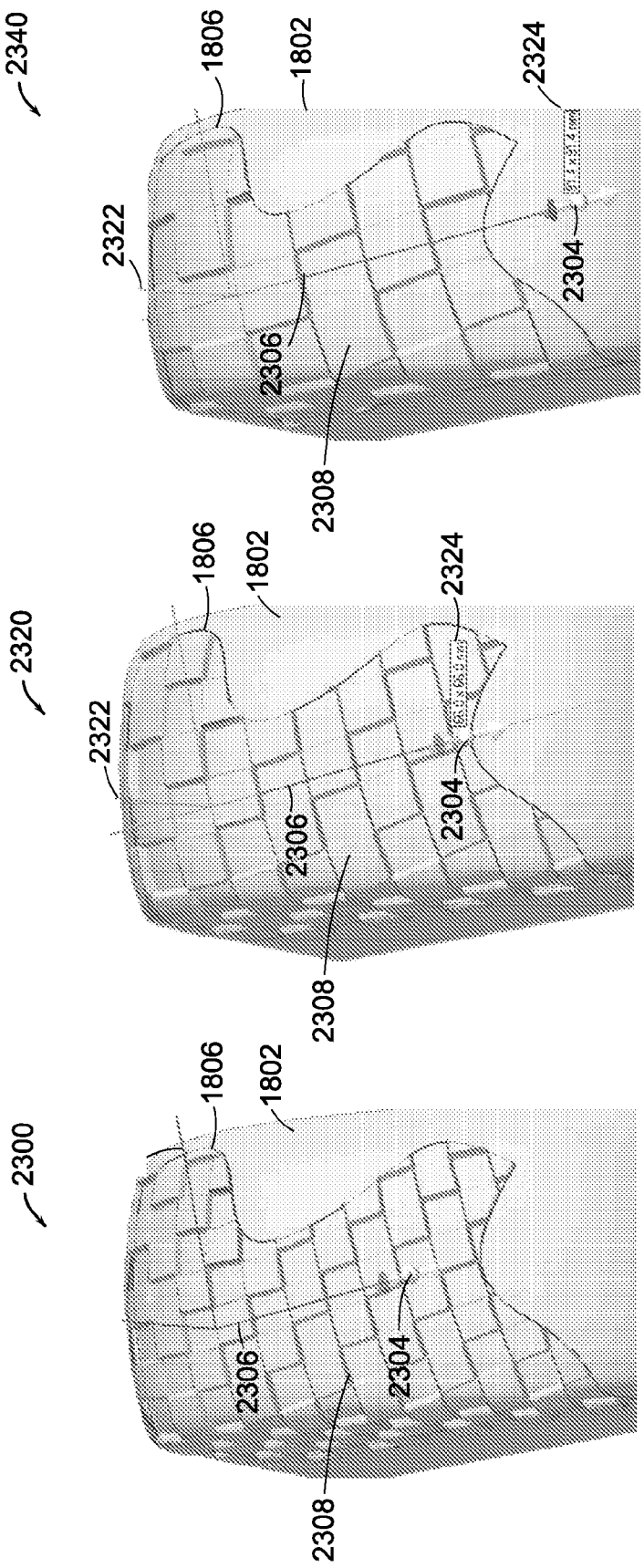

APPARATUS AND METHODS FOR WRAPPING TEXTURE ONTO THE SURFACE OF A VIRTUAL OBJECT

RELATED APPLICATIONS

This application is a continuation of U.S. application Ser. No. 13/026,667, filed on Feb. 14, 2011, which is a continuation of U.S. application Ser. No. 10/733,862, filed on Dec. 10, 2003, which is related to the commonly-owned U.S. patent application Ser. No. 10/733,860 entitled, "A Haptic Graphical User Interface Element for Adjusting Mapped Texture," by Berger, the entire disclosures of which are hereby incorporated by reference herein in their entireties.

FIELD OF THE INVENTION

This invention relates generally to the rendering of virtual objects. More particularly, in certain embodiments, the invention relates to methods of mapping texture onto the surface of virtual objects.

BACKGROUND OF THE INVENTION

Certain computer graphics applications allow a user to apply a two-dimensional texture onto the surface of a three-dimensional model. For example, a graphics package may allow a user to cover the surface of a sphere or a cylinder with a two-dimensional checkerboard pattern.

A two-dimensional texture must generally be distorted to some extent in order to cover the surface of a three-dimensional model. Prior texture mapping techniques often introduce an unacceptable amount of distortion, particularly where the three-dimensional model has a complex geometry.

Prior texture mapping methods use projection techniques to map a two-dimensional texture onto the surface of a three-dimensional model. For example, a spherical projection technique may be used to map a texture onto the surface of a spherical object. However, spherical projection introduces unacceptable distortion of the mapped texture if the object is non-spherical or has non-spherical portions. Similarly, planar projection and cylindrical projection methods do not work well for mapping texture onto three-dimensional models having non-planar or non-cylindrical portions.

Many realistic objects—for example, shoes—do not match well to any of the available projection methods. As a result, the application of a two-dimensional texture to the surface of such objects results in significant, unavoidable distortion of the two-dimensional texture.

Moreover, prior texture mapping methods are not sufficiently robust. For example, a prior texture mapping method may require mapping a texture onto the surface of an entire model, not just a portion of the model.

Furthermore, prior texture mapping methods are difficult for a user to apply because they require the user to provide input in a non-intuitive, multi-step manner. For example, where a given two-dimensional texture is a repeating, tiled image, prior texture mapping methods require the user to pre-align the texture in order to avoid discontinuities upon mapping the texture onto the three-dimensional model. The texture cannot be adjusted after mapping. Consequently, the process of positioning, scaling, and rotating the texture into its desired configuration is often difficult and time-consuming.

Therefore, there exists a need for a method of mapping a two-dimensional texture onto the surface of a three-dimensional virtual object with minimal distortion. This is of particular importance where the virtual object has a complex shape. Additionally, there is a need for a texture mapping method that is not limited to mapping the entire surface of a virtual object. Furthermore, there is a need for a versatile, interactive method for adjusting a texture after it has been mapped onto the surface of a three-dimensional virtual object.

SUMMARY OF THE INVENTION

The invention provides improved methods for mapping a point on the surface of a three-dimensional (3D) virtual object to a corresponding point on a two-dimensional (2D) texture. By performing these mapping methods, it is possible to wrap a 2D texture onto the surface of a 3D virtual object within an arbitrarily-shaped, user-defined region.

The invention also provides a haptic/graphical user interface element for adjusting mapped texture. The element allows a user to interactively and intuitively adjust texture mapped within an arbitrarily-shaped, user-defined region on the surface of a 3D virtual object.

Certain methods of the invention are analogous to wrapping a piece of elastic fabric onto the surface of a 3D model. The fabric cannot be cut internally, nor is the fabric allowed to fold over itself. The goal is to cover a user-selected region on the surface of the model with a piece of fabric by stretching and/or compressing the fabric as little as possible in order to minimize distortion.

The invention features an energy minimization scheme to determine how to best conform the texture to the surface of the 3D virtual object. An energy minimization scheme is used in place of a traditional projection technique. Distances between points on the surface of the 3D object serve as set lengths for modeled "springs" connecting points of a planar mesh. The planar mesh is adjusted to substantially minimize overall spring energy, and the adjusted planar mesh is then used to define a patch upon which a 2D texture is superimposed. Points on the surface of the virtual object are then mapped to corresponding points of the texture.

In this way, the 2D texture is wrapped onto the surface of the 3D virtual object with little distortion. Since the energy minimization scheme does not rely on geometric projection, a texture can be mapped onto a virtual object having a shape that is atypical of standard, easily-characterized geometric forms. Furthermore, methods of the invention do not require mapping texture onto an entire virtual object surface. Texture can be mapped within an arbitrarily-shaped, user-selected region of an object surface.

The energy minimization feature need not provide an absolute minimum total spring energy; a mere reduction in energy may suffice. The energy minimization feature may be replaced with any other quality metric that is associated with an arrangement of points of the planar mesh and that accounts for the spacing of corresponding points on the surface of the 3D virtual object.

Furthermore, various embodiments of the invention may include the use of another geometric representation in place of the aforementioned patch upon which the 2D texture is superimposed. For example, any representation that allows interpolation between points of the planar mesh may suffice.

Thus, in one aspect, the invention is drawn to a method for mapping a location on a surface of a 3D virtual object to a corresponding location on a 2D texture including the steps of: selecting a region on the surface of the 3D virtual object; creating a first mesh of points corresponding to points within the selected region; creating a second mesh of points corresponding to points of the first mesh; adjusting the second mesh to improve a quality metric associated with an arrangement of points of the second mesh; relating the adjusted second mesh to the 2D texture; and mapping a location in the selected region to a corresponding location in the texture.

In a preferred embodiment, the first mesh varies in three dimensions according to the surface of the object within the selected region, while the second mesh is a planar mesh. The step of adjusting the second mesh in the method above may further include defining the quality metric using the first mesh. For example, the quality metric may be a measure of total spring energy, where distances between points of the first mesh are used as set lengths for springs connecting points of the second mesh.

The 3D virtual object and the 2D texture may be represented in two different coordinate spaces. For example, the virtual object may be represented in a three-dimensional Cartesian coordinate space, while the texture is represented in a two-dimensional coordinate space.

The mapping method above may further include: (1) defining a first geometric representation, such as a first NURBS patch, that relates a parameter space—for example, a (u,v) space—to the coordinate space of the 3D object; and (2) defining a second geometric representation, such as a second NURBS patch, that relates the parameter space to the coordinate space of the 2D texture. Geometric representations include, for example, Bezier patches, Cardinal spline patches, Gregory patches, bilinear patches, bicubic patches, polygon meshes, and triangle meshes.

Each of the geometric representations used in the method are preferably interpolable. For example, the geometric representations each allow interpolation between mesh points.

The region on the surface of the 3D virtual object may be user-defined. The region may be selected according to a curve loop drawn on the surface of the object by the user. The curve loop may be divided into a plurality of boundary curves—preferably four boundary curves—used, for example, to create a patchwork of intersecting curves within the curve loop. The points at which the curves intersect are points of the first mesh. The first mesh may include substantially uniformly-spaced points, spaced such that the integrity of the shape of the object surface within the selected region may be maintained. However, it may be preferable for the first mesh to be anisotropic such that a portion of the selected region that is of high curvature is represented by a higher concentration of points than relatively flat portions of the region.

The points of the second mesh may be substantially uniformly-spaced prior to their adjustment in the method above. Points of the second mesh are adjusted to improve a quality metric associated with how the points are arranged. In one embodiment, the quality metric is a measure of spring energy, where at least a plurality of the points of the second mesh are modeled as connected by springs. The points are adjusted in a step-wise manner to reduce spring energy, preferably to a minimum or substantially close to a minimum.

The adjusting step may include modeling an interior point of the second mesh as connected to eight neighboring mesh points by eight springs. Alternately, an interior point is modeled as connected to four neighboring mesh points by four springs, or as connected to six neighboring mesh points by six springs. The latter case is particularly advantageous where the second mesh is a triangular mesh. Other spring arrangements are possible.

Although points on the edge of the second mesh have fewer neighbors than interior points, each edge point is also modeled as connected to its neighboring mesh points by springs, one spring per neighboring point. The edge points of the second mesh are adjusted, along with interior points. Preferably, all points of the second mesh are adjusted subject to the constraint that they remain within the plane. The springs may include linear springs, torsional springs, and/or other springs. Other mechanical modeling elements—for example, dashpots and/or sliders—may be used instead of springs or in combination with springs.

The amounts by which points of the second mesh are adjusted depends on the shape of the selected region on the surface of the 3D virtual object. In one embodiment employing an energy minimization scheme in the adjustment step, the distances between neighboring points of the first mesh are used as set lengths for corresponding springs. This provides a link between the second mesh and the shape of the selected region of the surface of the 3D object, since the first mesh contains points substantially on the selected region, and the points of the second mesh correspond to points of the first mesh. The distances between neighboring points of the first mesh may be shortest-path geodesic distances, approximate distances, or other measures of distance.

The step of creating the first mesh may include using a representation of the surface of the virtual object using a Delaunay triangulation technique and/or Voronoi diagrams.

The step of relating the adjusted second mesh to the 2D texture may include use of a transformation matrix. For example, the transformation matrix can account for translation, rotation, and/or scaling of the texture.

In another aspect, the invention is drawn to a method for mapping a location on a surface of a virtual object to a corresponding location on a texture, where the method includes the steps of: selecting a region on the surface of a virtual object represented in a first coordinate space; defining a first patch corresponding to the selected region; tessellating the first patch to create a first mesh; creating a second mesh including points corresponding to points of the first mesh; adjusting the second mesh to improve a quality metric associated with the arrangement of points of the second mesh; defining a second patch using the second mesh; superimposing a texture onto the second patch, where the texture is represented in a second coordinate space; and mapping a location on the surface of the virtual object to a corresponding location on the texture. Some of these steps are analogous to steps summarized hereinabove. These include the steps of creating and adjusting the second mesh, superimposing a texture onto the second patch, and mapping a location on the surface of the virtual object to a corresponding location on the texture.

The first coordinate space (in which the virtual object is represented) is preferably three-dimensional, and the second coordinate space (in which the texture is represented) is preferably two-dimensional. The first coordinate space may be a three-dimensional Cartesian coordinate space. The first parameter space is preferably a two-component parameter space—for example, a (u,v) space. The first patch relates the first parameter space to the coordinate space of the virtual object, and the second patch relates the first parameter space to the coordinate space of the texture. The second patch may directly relate the first parameter space to the coordinate space of the texture, or it may indirectly do so via a second parameter space, or additional parameter spaces, that are related to the first parameter space.

The first patch and second patch are preferably interpolable. That is, they are geometric representations of area and they allow interpolation between mesh points. Either (or both) of the first patch and second patch may be a NURBS patch, or other patch, such as a Bezier patch, a Cardinal spline patch, a Gregory patch, a bilinear patch, or a bicubic patch.

The selected region on the surface of the virtual object is preferably a contiguous, user-defined region. The region may be bound by a user-drawn curve, or series of curves. For example, the region may be a ring-shaped region bound by user-drawn inner and outer curves. The selected region may be noncontiguous; for example, the selected region may include a plurality of discrete regions on the surface of the virtual object.

The user-selected region may be thought of as a "window" through which the texture appears, wrapped onto the surface of the 3D object. In one embodiment, the texture is an image, and no boundary of the image is constrained to align with a boundary of the region. In another embodiment, the texture includes a tiled pattern, and no boundary of a tile of the tiled pattern is constrained to align with a boundary of the region. Thus, a user is not restricted to choosing a region whose boundary is forced to align with a boundary of the texture. Furthermore, the invention offers methods of adjusting the texture after it is applied to the surface of the virtual object.

In one embodiment, the step of defining the first patch includes generating an initial grid of points; projecting grid points onto the surface of the virtual object; modeling grid points as connected by springs; adjusting grid points to decrease an energy associated with the springs; and defining a NURBS patch using the grid points.

The energy minimization scheme used in defining the first patch is preferably different from the spring energy minimization scheme used to adjust the second mesh. For example, in one embodiment, a projection method is used in defining the first patch, since points are constrained to lie at least approximately on the surface of the virtual object. By contrast, the energy minimization scheme for adjusting the second mesh does not require projection of points onto the surface of the virtual object. Also, the use of a spring energy model to define the first patch may not take into account distances between points of a differently-dimensioned mesh. By contrast, the energy minimization scheme discussed herein for adjusting points of the second mesh (which lie on a plane) may include the use of springs whose set lengths vary depending on distances between corresponding points of the first mesh (which lie on a typically non-planar surface).

The step of defining the first patch as described above preferably includes repeating the steps of projecting grid points onto the surface of the virtual object and adjusting grid points to decrease an energy associated with the springs until the energy associated with the springs is substantially minimized. An interior grid point is preferably modeled as connected to four neighboring grid points by four springs. The springs of the grid preferably have identical set lengths. The step of defining a NURBS patch using grid points may include performing a least squares fit using the adjusted grid points.

An alternate technique may be used to define the first patch. For example, any technique that defines a surface using a representation of a 3D virtual object may be used to define the first patch.

The step of mapping a location on the surface of the virtual object to a corresponding location on the texture may further include assigning to the location on the surface of the virtual object a graphical value associated with the corresponding location on the texture. The graphical value may be a color value, for example, where the texture is an image or tiled (repeating) pattern to be applied within the selected region on the surface of the virtual object. Alternatively, the graphical value may represent an adjustment along a normal to the surface of the virtual object, as in the case of embossing the texture onto the surface of the virtual object within the selected region.

In yet another aspect, the invention is directed to a method for wrapping a texture onto a surface of a 3D virtual object, the method including the steps of: selecting an arbitrarily-shaped, user-defined region of the 3D virtual object; and, for each of a plurality of locations in the region, mapping the location in the selected region to a corresponding location in a texture, and assigning to the location in the selected region a graphical value associated with the location in the texture.

The method above may further include one or both of the following steps: graphically rendering the virtual object; and modifying a voxel representation of the virtual object according to the assigned graphical values.

The user-selected region may be thought of as a "window" through which the texture appears, wrapped onto the surface of the 3D object. Where the texture includes a tiled (repeating) pattern, a preferred embodiment does not constrain any boundary of a tile of the tiled pattern to align with a boundary of the user-defined region. Thus, a user is not restricted to choosing a region whose boundary is forced to align with a boundary of the texture. The method may further include the step of graphically rendering the virtual object with the tiled pattern applied within the user-defined region, and/or graphically rendering the virtual object with an embossing pattern applied within the user-defined region, where the tiled pattern and/or the embossing pattern are determined from the texture.

In another aspect, the invention is drawn to a graphical user interface (GUI) element that includes one or more active locations ("hotspots") for adjusting a texture, where the texture is mapped onto a user-defined region of the surface of a 3D virtual object. The GUI element preferably includes one or more hotspots for translating, rotating, and/or scaling the texture. The texture may be mapped onto the user-defined region using one or more methods summarized hereinabove.

The texture may include an image, a tiled pattern, and/or an embossing pattern. There may be one or more hotspots for adjusting an embossing height and/or depth normal to the surface of the virtual object.

The GUI element may be a haptic/graphical user interface element. Thus, in one aspect, the invention is drawn to a haptic/graphical user interface (H/GUI) element for adjusting a texture, where the texture is mapped onto a user-defined region of the surface of a 3D virtual object, and where there is at least one hotspot associated with haptic feedback. As with the GUI element summarized above, the H/GUI element preferably includes one or more hotspots for translating, rotating, and/or scaling the texture.

Haptic feedback is provided to a user via a haptic interface device that the user manipulates to move a cursor and/or virtual tool in relation to a virtual object in a virtual environment. The haptic feedback associated with the H/GUI element may include a gravity well at a given hotspot. A gravity well allows a user to easily "snap" the cursor or virtual tool to a given position in the virtual environment. For example, when the cursor/tool approaches within a "snap-distance" of a hotspot with an associated gravity well, a force feedback is provided to pull the haptic interface device toward the location of the hotspot. The force may be "weak" in that the user may "pull off" the hotspot location if desired, or the force may be "strong" in that the user may not pull the tool off the location. Various levels of force may be used.

The haptic feedback associated with the H/GUI element may include a constraint to limit movement of the cursor/tool to: (1) the surface of the virtual object; (2) the user-defined region on the surface of the virtual object; (3) an axis of the H/GUI element; and/or (4) a circular loop. The constraint may be weak or strong; and the constraint may be armed or disarmed according to a user action or user inaction.

For example, a user may perform a "click-and-drag" operation at a certain hotspot of the H/GUI element to translate a texture that is mapped onto the surface of the 3D virtual object. The H/GUI element may include a haptic constraint that limits movement of the cursor/tool to the user-defined region on the surface of the virtual object. The haptic constraint may be activated whenever the user clicks on the appropriate hotspot (or provides some other signal). Force feedback associated with the constraint helps guide the user and allows the user to physically sense the translation of the texture as it is being performed. Thus, the invention provides a user-friendly, interactive process for moving texture that is mapped onto the surface of a virtual object.

In another example, the user may click-and-drag at a certain hotspot of the H/GUI element to scale the mapped texture. The H/GUI element may include a haptic constraint that limits movement of the cursor/tool to an axis (or axes) of the H/GUI element whenever the user clicks on the appropriate hotspot(s). Force feedback associated with the constraint provides a physical cue to the user and helps guide the user in scaling the texture in the direction of the chosen axis. In addition to haptic feedback, the H/GUI element may provide visual feedback to the user by graphically displaying the axis to which the cursor/tool is constrained during scaling of the texture.

In another example, the user may click-and-drag at a certain hotspot of the H/GUI element to rotate the mapped texture. The H/GUI element may include a haptic constraint that limits movement of the cursor/tool to a circular loop whenever the user clicks on the appropriate hotspot(s). In addition to haptic feedback, the H/GUI element may provide visual feedback to the user by graphically displaying the circular loop to which the cursor/tool is constrained during rotation of the texture.

The aforementioned axis, circular loop, and surface to which a cursor/tool is constrained may include one or more detents. A detent is a gravity well at a location on the axis, loop, or surface that provides a haptic reference to the user. For example, the user may feel a "dent" or "bump" at the 0, 90, 180, and 270 degree positions along the loop to which the cursor/tool is constrained. The detents allow a user to easily move to a given location. For example, a detent at the "click" position may allow a user to easily return to the original position. A detent may be armed or disarmed. For example, a gravity well associated with a detent may be deactivated (disarmed) to allow a user to make fine adjustments in the vicinity of the detent location without "snapping" to the detent location.

In another aspect, the invention is drawn to a method for adjusting a texture within a user-defined region of a surface of a 3D virtual object, where the method includes the steps of: providing a graphical user interface element including one or more active locations (hotspots) for adjusting a 2D texture within the user-defined region; and adjusting the texture according to a user manipulation at one of the hotspots, where the adjusting step includes modifying a transformation matrix used in mapping points on the surface of the virtual object to points on the texture.

The method may further include graphically rendering the 3D virtual object with the adjusted 2D texture. Moreover, the user may be given a preview of the 3D virtual object with the adjusted 2D texture applied to its surface, without changing the underlying volumetric representation of the 3D virtual object. For example, the method may allow a user to visually preview the result of scaling an embossing pattern on the surface of a 3D virtual object before actually modifying the underlying volumetric model. Upon activation of a user signal, such as a button click and/or button release, the underlying volumetric model is modified according to the applied embossing pattern. For example, where the volumetric model is a voxel-based model, voxel values are modified upon activation of the user signal, according to the applied embossing pattern.

In one embodiment, the method allows a user to dynamically preview an adjustment of the mapped texture at a lower resolution than is executed upon final selection of the adjustment by the user. This provides faster processing and improved interactivity. The method may include implementing a slider control that allows a user to trade off preview quality against rendering performance. In one example, the slider allows the user to adjust texture resolution such that texture values are determined for as few as about 900 to as many as about 90,000 points on the first (or second) patch. In another example, fewer than 900 or more than 90,000 points are evaluated.

In another aspect, the invention is directed to an apparatus for adjusting a texture within a user-defined region of a surface of a 3D virtual object, where the apparatus includes: a memory for storing a code defining a set of instructions; and a processor for executing a set of instructions, where the code includes a graphical user interface (GUI) module adapted to provide a graphical user interface element with one or more hotspots for adjusting the texture within the user-defined region.

The code may further include a selection module adapted to select one of the hotspots based on a two-dimensional correspondence of the active location and the cursor/tool. This module allows "view-apparent" selection of a hotspot, such that depth is effectively collapsed for purposes of selection. This makes it easier for a user to find and select a given hotspot. As part of the "view-apparent" functionality, the code may further include a repositioning module adapted to move the cursor/tool to a 3D position corresponding to one of the hotspots of the graphical user interface element.

In one embodiment, the GUI element in the apparatus above is a haptic/graphical user interface element having one or more hotspots associated with haptic feedback. Examples of such haptic feedback are discussed herein.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 23A is a screenshot showing the virtual object and haptic/graphical user interface element of FIG. 18A following a haptic "snap" to an "end arrow" hotspot located at the x-axis tip or y-axis tip of the H/GUI element, where the hotspot allows a user to scale the texture applied within the user-defined region, according to an illustrative embodiment of the invention.

FIG. 23B is a screenshot showing the virtual object and haptic/graphical user interface element of FIG. 23A during a user "click-and-drag" at a "hotspot" for scaling texture, where the cursor is haptically constrained to the chosen axis, and where the user has dragged the cursor along the axis such that the tile size of the texture is increased to 66.0 mm×66.0 mm, according to an illustrative embodiment of the invention.

FIG. 23C is a screenshot showing the virtual object and haptic/graphical user interface element of FIG. 23A during a user "click-and-drag" at a "hotspot" for scaling texture, where the cursor is haptically constrained to the chosen axis, and where the user has dragged the cursor along the axis such that the tile size of the texture is increased to 91.4 mm×91.4 mm, according to an illustrative embodiment of the invention.

DETAILED DESCRIPTION

The invention provides improved methods for mapping a point on the surface of a three-dimensional (3D) virtual object onto a corresponding point on a two-dimensional (2D) texture. By using these mapping methods, it is possible to wrap a 2D texture onto the surface of a 3D virtual object within an arbitrarily-shaped, user-defined region in a way that minimizes the distortion of the wrapped texture.

Texture mapping is a process by which points on the surface of a virtual object are related to points of a texture. For example, a point on the surface of a 3D virtual object can be mapped to a point on a 2D surface; or, equivalently, a point on the 2D surface can be mapped to a point on the surface of the 3D virtual object. The 3D virtual object is generally represented in object space, for example, as a system of elements and/or points in a Cartesian (x,y,z) coordinate system.

Figure 1A:
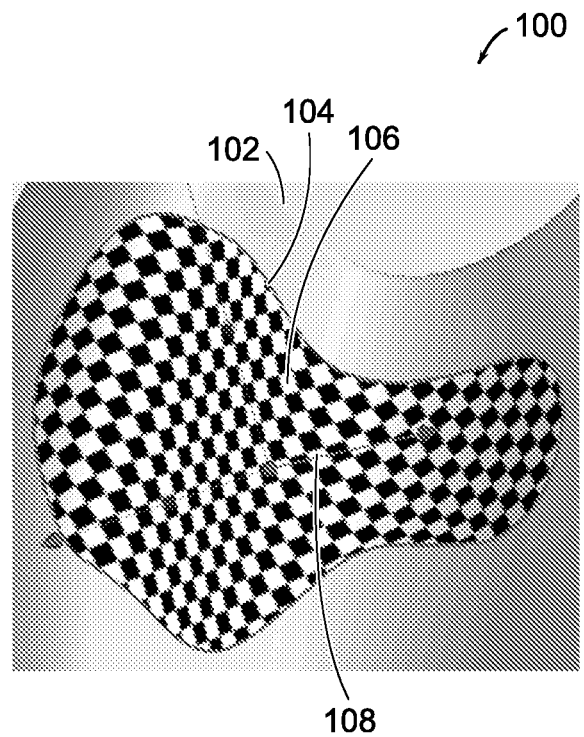
FIG. 1A is a screenshot of a three-dimensional virtual object and a haptic/graphical user interface element for wrapping a two-dimensional texture onto the surface of the object, where locations within a user-drawn curve loop on the object surface are mapped to a checkerboard texture, according to an illustrative embodiment of the invention.

FIG. 1A is a screenshot 100 of a three-dimensional object 102 where locations within a user-drawn curve loop 104 on the object surface are mapped to a two-dimensional checkerboard texture 106. The checkerboard pattern in FIG. 1A is not distorted by the presence of curvature on the surface of the three-dimensional object. The texture 106 appears to lay on the surface of the 3D object 102 as if it were a piece of elastic fabric stretched as little as possible to avoid warping of the checkerboard pattern, while still completely covering the surface of the object within the selected region. A haptic/graphical user interface (H/GUI) element 108 is also shown in FIG. 1A. The H/GUI element 108 is a user-friendly, intuitive interface for allowing the user to interactively position, scale, and rotate the texture within the selected region.

Figure 1B:
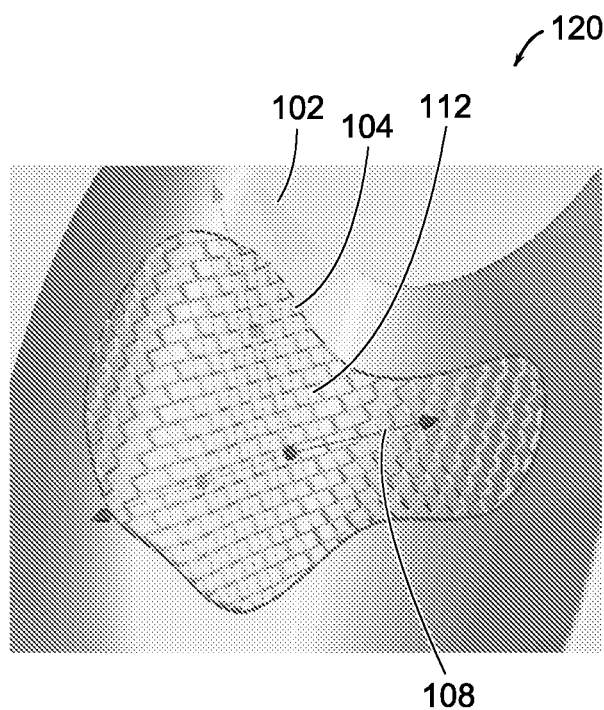
FIG. 1B is a screenshot of the three-dimensional virtual object and the haptic/graphical user interface element of FIG. 1A, where the two-dimensional texture serves as an embossing pattern for adjusting locations within the user-drawn curve loop along a normal to the surface of the virtual object, according to an illustrative embodiment of the invention.

FIG. 1B is a screenshot 120 of the three-dimensional virtual object 102 of FIG. 1A, where the two-dimensional texture is applied as an embossing pattern 112 for adjusting locations within the region bounded by the user-drawn curve loop 104 on the surface of the virtual object. Again, the regular pattern of the embossing texture 112 is not distorted by the mapping to the curved surface of the object.

Figure 2:
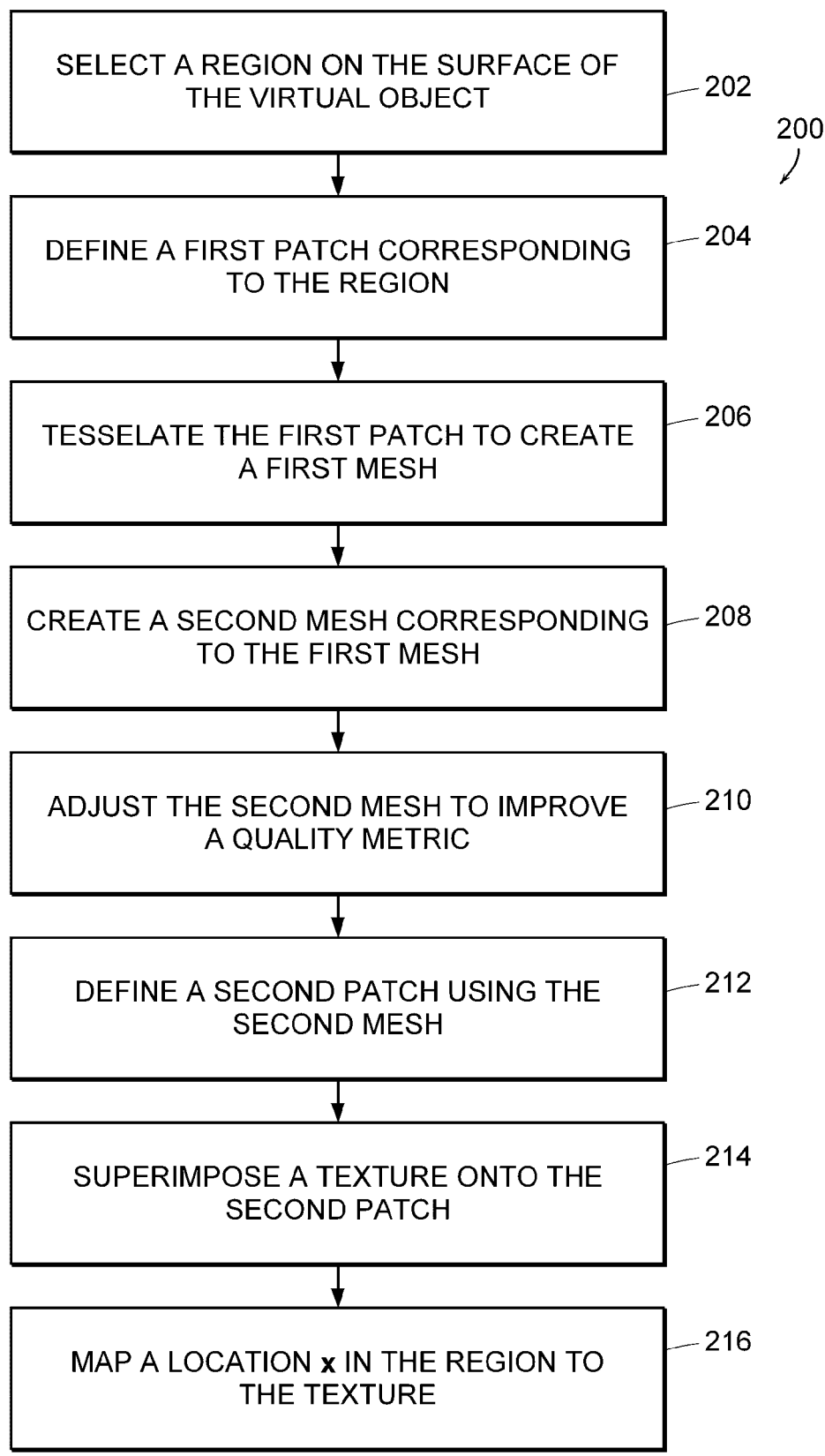
FIG. 2 is a block diagram featuring a method of mapping a location on the surface of a virtual object to a corresponding location on a texture, according to an illustrative embodiment of the invention.

FIG. 2 is a block diagram 200 featuring a method of mapping a location on the surface of a virtual object to a corresponding location on a texture. The mapping process of FIG. 2 includes selecting a region on the surface of the virtual object in step 202. The selected region may be user-defined, such as the region bounded by the user-drawn curve loop 104 illustrated in FIGS. 1A and 1B. Alternatively, the selected region may be defined automatically.

Figure 3A:
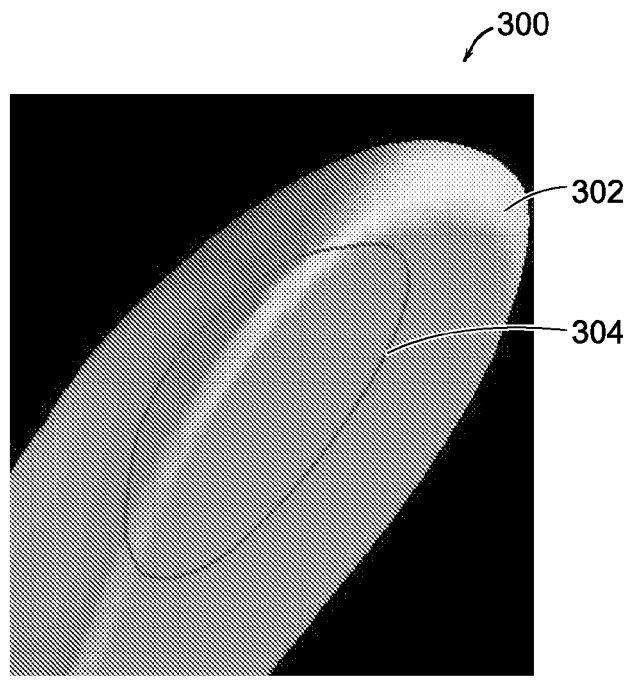
FIG. 3A is a screenshot of a three-dimensional virtual object showing a user-drawn curve loop defining the boundary of the selected region in the mapping method of FIG. 2, according to an illustrative embodiment of the invention.

FIG. 3A is a screenshot 300 of the surface of a three-dimensional object 302 showing a curve loop 304 created by a user. The user may create this loop interactively by using a graphical input device such as a mouse, pen and graphics tablet, joystick, or other device to draw the curve loop onto the displayed surface of the object. The graphical input device may be a haptic interface device having three, four, five, six, or more degrees of freedom, such as the haptic device described in co-owned U.S. Pat. No. 6,417,638, issued to Guy et al., the text of which is hereby incorporated by reference in its entirety. An analytically-defined curve, such as a polynomial curve or set of curves, may be fitted to the user-drawn curve to create a smooth boundary curve.

The 3D virtual object may have a voxel-based representation. For example, each of a plurality of volumetric elements (voxels) is associated with a value according to its proximity to a surface of the virtual object in object space. Voxel-based representation is useful, for example, in haptically rendering a 3D virtual object.

In order to define a surface patch over a user-defined region of the surface of a 3D voxel-based model, a curve loop enclosing the user-defined surface may be divided into four boundary curves, which are used to generate a 4-sided NURBS patch whose interior approximates the surface of the voxel-based model and whose outer edges exactly match the four boundary curves. A NURBS patch is useful because it relates a (u,v) parameter space to a Cartesian space, because it can be tessellated to any desired resolution, and because it provides surface normal vectors at any point of the patch.

Figure 3B:
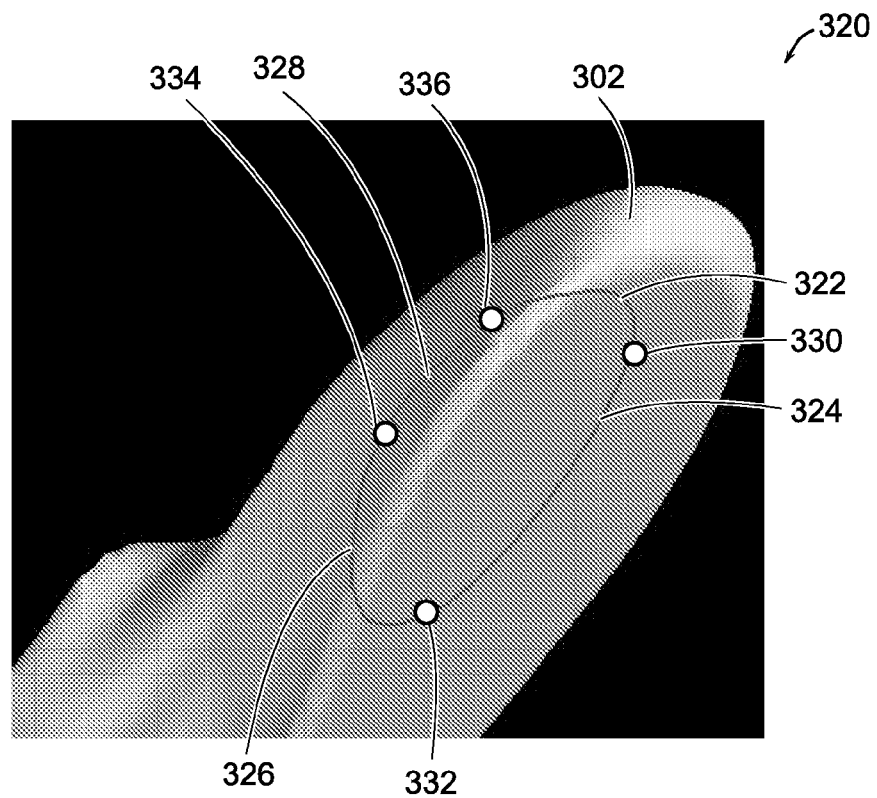
FIG. 3B is a schematic diagram illustrating the curve loop of FIG. 3A divided into four boundary curves, according to an illustrative embodiment of the invention.

Thus, in one embodiment, the user creates a single closed curve loop and the loop is divided into four parts. The division of the curve into four parts may be automatically performed. Alternatively, the user may manually divide the closed curve loop into four parts, or the user may create four separate boundary curves that are then end-connected to surround the desired region on the surface of the virtual object. FIG. 3B is a schematic diagram 320 illustrating the curve loop 304 of FIG. 3A. FIG. 3B shows the closed curve loop on the surface of the object 302 divided into four curves 322, 324, 326, 328 which connect four curve end points 330, 332, 334, 336. Alternatively, fewer than four or more than four boundary curves may be created to enclose the selected region. In FIG. 3B, a single closed loop curve is automatically divided into four portions of approximately equal length. Alternatively, an automatic division of the curve loop may depend on the shape of the surface bounded by the loop and/or other factors. Each of the four portions of the curve loop boundary is identified with an edge of the surface patch (first patch), defined in step 204 of FIG. 2. Each portion of the curve loop also corresponds to an edge of the first mesh created in step 206 of FIG. 2 and to an edge of the second mesh created in step 208 of FIG. 2.

Step 204 in the method of FIG. 2 includes defining a first patch corresponding to the region selected in step 202. The first patch in step 204 is a geometric representation of the surface of the virtual object within the selected region, and serves to relate a parameter space, such as a (u,v) space, to the coordinate space of the 3D object. The 3D object may be represented in a three-dimensional Cartesian coordinate space. Alternatively, the coordinate space may be a polar, spherical, mixed polar-Cartesian, or oblique coordinate space. The geometric representation may be a NURBS patch, Bezier patch, Cardinal spline patch, Gregory patch, bilinear patch, bicubic patch, polygon mesh, triangle mesh, or other representation that continuously relates a parameter space of the representation to the coordinate space of the 3D object.

In one embodiment, the first patch is a NURBS patch, and step 204 of FIG. 2 includes determining the parameters of a NURBS patch whose outer edges match the four boundary curves generated in Step 202 of FIG. 2, and whose surface within the boundary best fits the surface of the object within the user-defined region. Because the surface of the voxel-based model may be more finely detailed than a particular set of NURBS parameters could represent exactly, a least-squares optimization is performed to determine a set of NURBS parameters. In order to perform this optimization, an N×M grid of substantially evenly-spaced points is needed. An iterative process may be used to generate a substantially evenly-spaced set of points.

Figure 4:
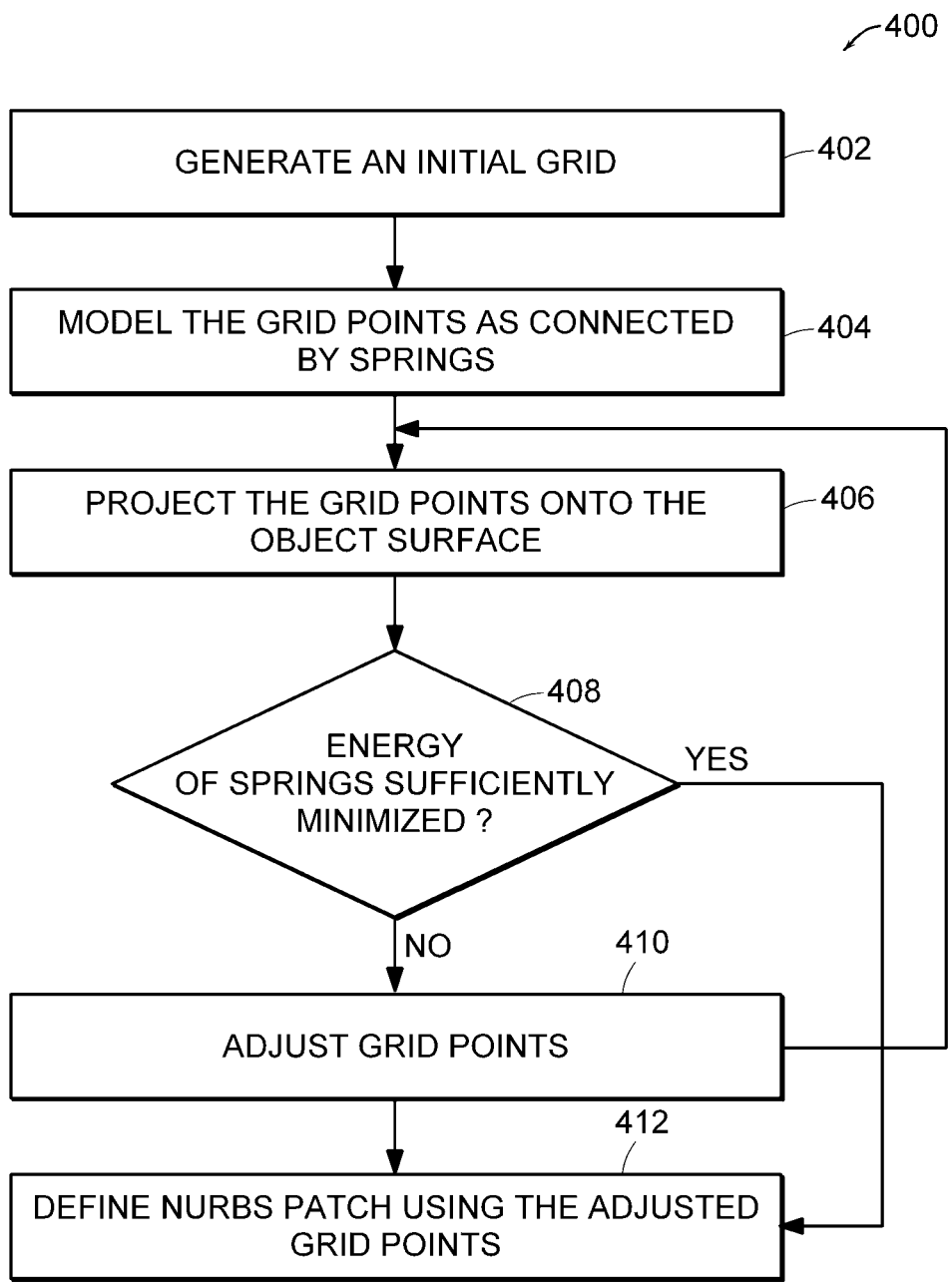
FIG. 4 is a block diagram featuring a method for defining the first patch in the mapping method of FIG. 2, where the first patch corresponds to the selected region, according to an illustrative embodiment of the invention.

FIG. 4 is a block diagram 400 featuring an iterative method for generating an N×M set of substantially evenly-spaced points in order to define the first patch in step 204 of FIG. 2. In step 402 of FIG. 4, an initial grid of points is generated by uniformly interpolating the boundary curves. In step 404, the grid points are modeled as connected to their neighbors by springs. In a preferred embodiment, an interior grid point is modeled as connected to its four neighboring points by springs, and all the springs have identical set lengths. In step 406 the grid points are projected onto the nearest point on the 3D surface of the voxel-based virtual object. This projection may cause the grid to stretch or compress, depending on the local curvature of the object surface. As a result, the distance between neighboring points may no longer be uniform. In step 408, the resulting energy of the system of springs is computed and checked to determine whether it is sufficiently reduced or minimized. If not, the grid points are adjusted in step 410 by allowing the network of springs to relax, so as to achieve a lower energy configuration. During this relaxation, grid points may be pulled off the object surface. The projection step 406 is then repeated and the energy testing step 408 is performed again. Steps 410 and 406 are repeated until the energy of the spring system has been sufficiently reduced. In step 412 the resulting grid of points is then used as input in a fitting algorithm to determine NURBS parameters for the first patch. Optimal parameters for the NURBS patch may be determined by using a least-squares optimization technique to fit the patch to the resulting adjusted grid points.

Other methods of using a geometric representation to define a surface corresponding to the selected region of the 3D object may be used. For example, where the surface of the virtual object is analytically defined, the method of FIG. 4 may not be required.

Figure 5:
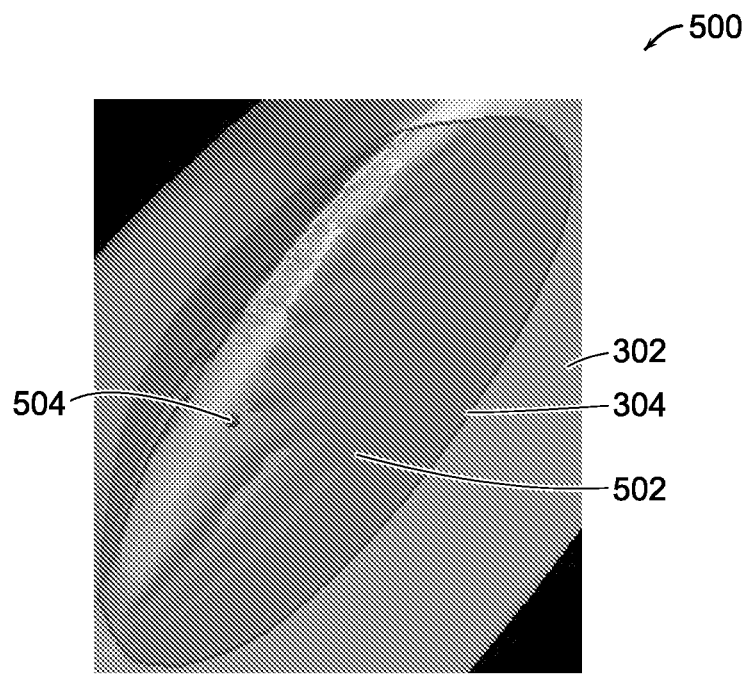
FIG. 5 is a schematic diagram featuring a representation of the first patch defined using the method of FIG. 4, where the first patch corresponds to the selected region within the curve loop on the surface of the three-dimensional object, according to an illustrative embodiment of the invention.

FIG. 5 is a schematic diagram 500 featuring a representation of a first patch 502 corresponding to the selected region lying within the user-defined curve loop 304 on the surface of the 3D virtual object 302 of FIGS. 3A and 3B. Since the patch is an approximation to the surface of the 3D virtual object, it lies slightly above the object surface in some regions, and slightly below in other regions. The point 504 represents an arbitrary point on the surface of the 3D object 302 and maps to point 908 shown in FIGS. 9 and 10 as discussed herein below.

In step 206 of FIG. 2, the first patch defined in step 204 is tessellated, thereby creating a first mesh of points corresponding to points within the selected region on the surface of the 3D virtual object. The points of the first mesh are spaced uniformly in the (u,v) parameter space of the first patch. The points of the first mesh are not necessarily spaced uniformly in Cartesian space, however. The number of points of the first mesh may be adjusted according to the curvature of the virtual object surface, the desired resolution of the texture mapping, and/or the desired rendering speed.

Figure 6:
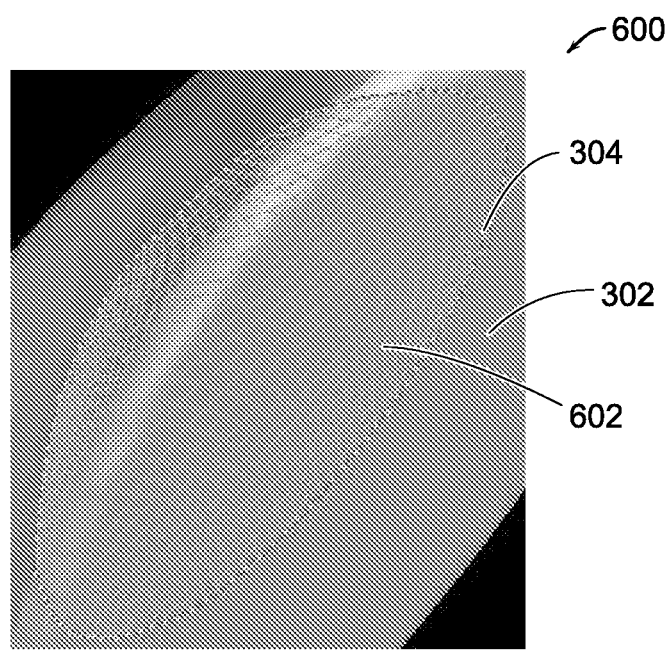
FIG. 6 is a schematic diagram featuring a representation of the first mesh in the mapping method of FIG. 2, where the first mesh is a tessellation of the first patch of FIG. 5, according to an illustrative embodiment of the invention.

FIG. 6 is a schematic diagram 600 featuring a representation of the first mesh 602 in the mapping method of FIG. 2. The mesh is a tessellation of the first patch 502 of FIG. 5, corresponding to the region on the surface of the 3D object 302 within the user-defined boundary curve 304.

Figure 7A:
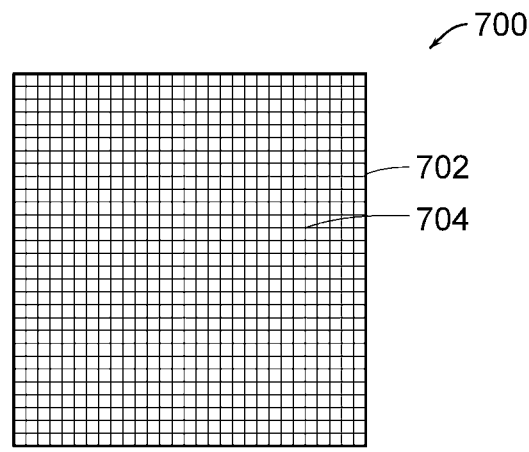
FIG. 7A is a schematic diagram illustrating a second mesh having uniformly-spaced points in two dimensions corresponding to points of the first mesh of FIG. 6, according to an illustrative embodiment of the invention.

In step 208 of FIG. 2 a second mesh corresponding to the first mesh is created. The second mesh is a planar mesh and preferably has the same number of mesh points as the non-planar first mesh. The second mesh is adjusted within its plane in a way that accounts for the spacing of points of the non-planar first mesh. FIG. 7A is a schematic diagram 700 illustrating an initial second mesh, prior to adjustment, where the boundary 702 corresponds to that of the first mesh 304 (FIG. 6). The second mesh 700, prior to adjustment, has uniformly-spaced points 704 in two dimensions, with each point corresponding to a point in the first mesh 602. The end points of the four boundary curves defined in step 202 of FIG. 2 and represented by points 330, 332, 334, and 336 in FIG. 3B correspond to the four corners of the second mesh 700 shown in FIG. 7A.

In step 210 of FIG. 2, the second mesh is adjusted to improve and/or optimize a quality metric associated with the arrangement of the points of the second mesh. This quality metric is related to the first mesh 602, which in turn corresponds to the shape of the surface of the 3D object 302 within the defined region 304. Thus, step 210 of FIG. 2 allows points on the surface of the 3D object to be mapped into the two-dimensional texture without the need for geometric projection and without the distortion that accompanies projection when the 3D object is not a regular, geometrically-defined shape.

Figure 7B:
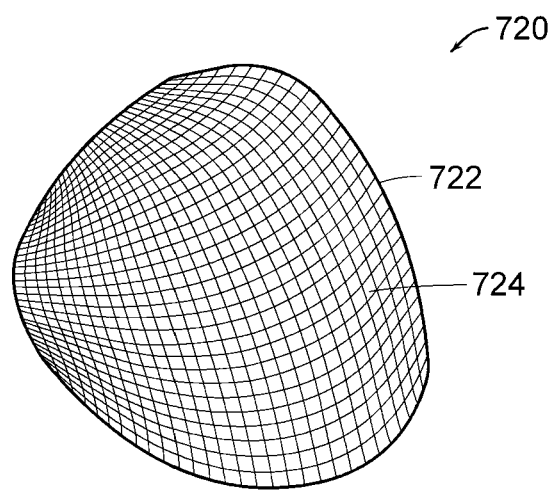
FIG. 7B is a schematic diagram illustrating the planar mesh of FIG. 7A following adjustment in two dimensions to optimize a quality metric (minimize spring energy), where points of the planar second mesh are modeled as connected by springs having set lengths based on distances between corresponding points of the non-planar first mesh, according to an illustrative embodiment of the invention.
Figure 8:
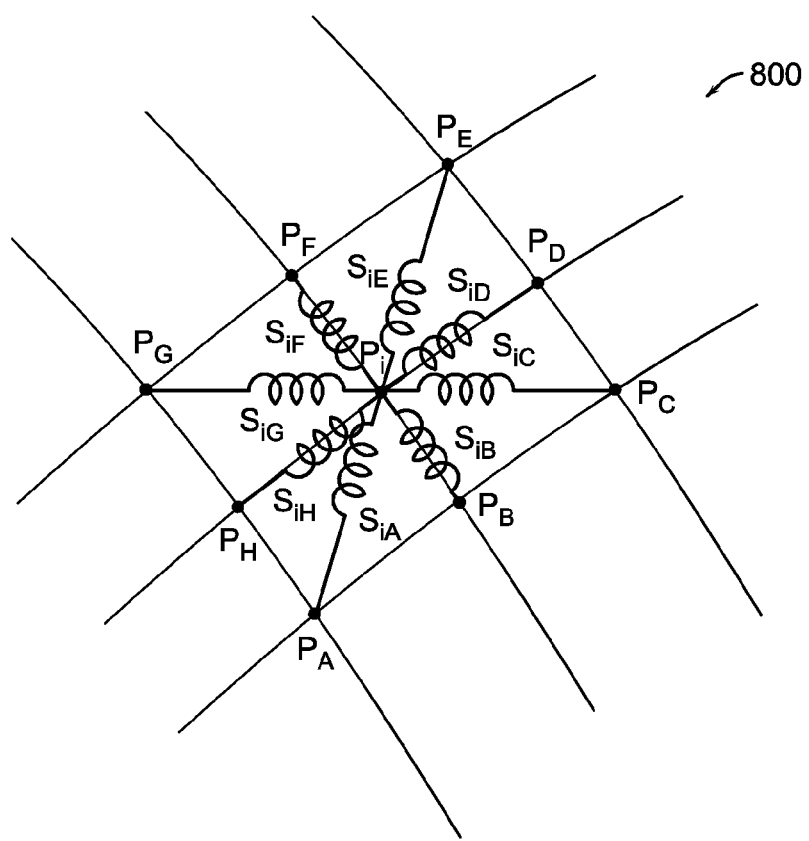
FIG. 8 is a schematic diagram illustrating the modeling of a point of the second mesh as connected by springs to each of its eight neighbors, according to an illustrative embodiment of the invention.

FIG. 7B is a schematic diagram 720 illustrating a non-uniform second mesh 724 that results from the application of the mesh adjustment step 210 of FIG. 2 to the initially uniform second mesh 700 in FIG. 7A. In the adjustment of the second mesh shown in FIGS. 7A and 7B, points of the second mesh are modeled as connected by springs, and the quality metric that is improved or optimized in step 210 of FIG. 2 is a measure of energy stored within the springs. FIG. 8 is a schematic diagram 800 illustrating the modeling of an interior point $P_i$ of the second mesh as connected by eight springs $S_{iA}, S_{iB}, S_{iC}, S_{iD}, S_{iE}, S_{iF}, S_{iG}$, to its nearest neighbor points $P_A, P_B, P_C, P_D, P_E, P_F, P_G, P_H$, respectively. Alternately, an interior point is modeled as connected to four neighboring mesh points by four springs, or as connected to six neighboring mesh points by six springs. The latter case is particularly advantageous where the second mesh is a triangular mesh. Other spring arrangements are possible. The adjusting step 210 of FIG. 2, as applied in FIGS. 7A and 7B, reduces spring energy while constraining the points of the second mesh to remain in a plane. The process of energy reduction may be viewed as a spring relaxation process, and is performed in an iterative manner. Alternatively, an explicit (non-iterative) optimization process may be used. The springs may include linear springs, torsional springs, and/or other springs. Other modeling elements, such as dashpots and/or sliders, may be used instead of springs, or in combination with springs.

Although points on the edge of the second mesh have fewer neighbors than interior points, each edge point may also modeled as connected to its neighboring mesh points by springs, one spring per neighboring point. Points along the edge of the planar second mesh 722 in FIG. 7B are not fixed, but are free to move in the 2D plane during the adjustment of step 210 in FIG. 2.

The amounts by which points of the second mesh are adjusted depends on the shape of the surface of the 3D object 302 within the defined region 304. This adjustment provides a means by which local shape information on the defined region 304 is conveyed to the texture mapping without the need for a global geometric representation. In an embodiment employing an energy minimization scheme in the adjustment step 210 in FIG. 2, the distances between neighboring points of the first mesh 602 (FIG. 6) can be used as set lengths for corresponding springs, such as those illustrated in FIG. 8. This provides a link between the second mesh 720 (FIG. 7B) and the shape of a selected region 304 of the surface of the 3D object 302 (FIGS. 3A, 3B, 5, 6), since the first mesh 602 contains points substantially on the selected region 304, and the points of the second mesh 720 correspond to points of the first mesh 602.

The distances between neighboring points of the first mesh 602 used as set lengths for springs in the optimization of step 210 may be Pythagorean straight line distances, Euclidean distances, shortest path geodesic distances, approximations of any of these distances, or other measures of distance.

The adjustment of the second mesh may be performed by implementing an iterative spring relaxation system wherein linear springs connect points of the second mesh. Assuming Hook's law applies for each spring, a linear system of equations is determined for the components of force at each mesh point, according to Equation (1) as follows:

$$F_{ij} = K_{ij}(|X_i - X_j| - L_{ij}) \quad (1)$$

where $F_{ij}$ is the magnitude of the force of the linear spring connecting neighboring mesh points $P_i$ and $P_j$ in the planar second mesh; $|X_i - X_j|$ is the geodesic distance between the points in the 3D first mesh corresponding to points $P_i$ and $P_j$; $L_{ij}$ is the two-dimensional distance between points $P_i$ and $p_j$; and $K_{ij}$ is the spring constant for the linear spring connecting points $P_i$ and $P_j$. The adjustment of the second mesh shown in FIGS. 7A and 7B sets $K_{ij}=1$ for all springs. According to the sign convention in Equation (1), a negative force implies tension in the spring, tending to pull the points $P_i$ and $P_j$ closer together, while a positive force implies compression, tending to push the points $P_i$ and $P_j$ apart.

The position of each of the points of the planar second mesh, including each point along the edge, is then modified iteratively, based on a sum of all forces acting on the point at a given "time step." The points are adjusted at subsequent time steps until substantial convergence is reached.

Figure 9:
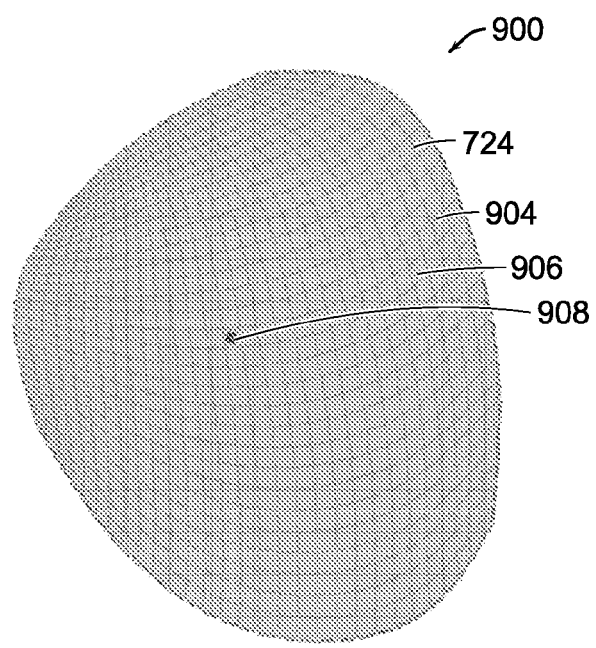
FIG. 9 is a schematic diagram illustrating the step of defining a second patch based on the second mesh of FIG. 7B, according to an illustrative embodiment of the invention.

FIG. 9 is a schematic diagram 900 illustrating step 212 in FIG. 2 of defining a second patch 906, shown as blue, based on the adjusted second mesh 720 of FIG. 7B, which is shown superimposed on the patch 906 for reference. Point 904 illustrates a point on the adjusted second mesh. The second patch 906 may be a NURBS patch, defined according to the four adjusted boundaries 722 of the second mesh 720, and the M×N points of the adjusted second mesh 720 (FIG. 7B). Alternatively, other geometric representations of the second patch may be used, such as, for example, Bezier patches, Cardinal Spline patches, Gregory patches, bilinear patches, bicubic patches, polygon meshes, and triangle meshes. The second patch represents the shape of the original 3D surface region 304 (FIGS. 3A, 3B) "unwrapped" into two dimensions with minimized distortion, retaining approximately the same surface area in two dimensions as it had in three dimensions. In a preferred embodiment, a point 504 on the first patch 502 in FIG. 5, which corresponds to a point on the 3D object surface 304, has the same (u,v) parameters as its corresponding point 908 in FIG. 9 on the second patch. The two patches thus provide a one-to-one mapping of points on the surface of the 3D object 302 to points on the minimally distorted "unwrapped" surface corresponding to the second patch 906.

Figure 10:
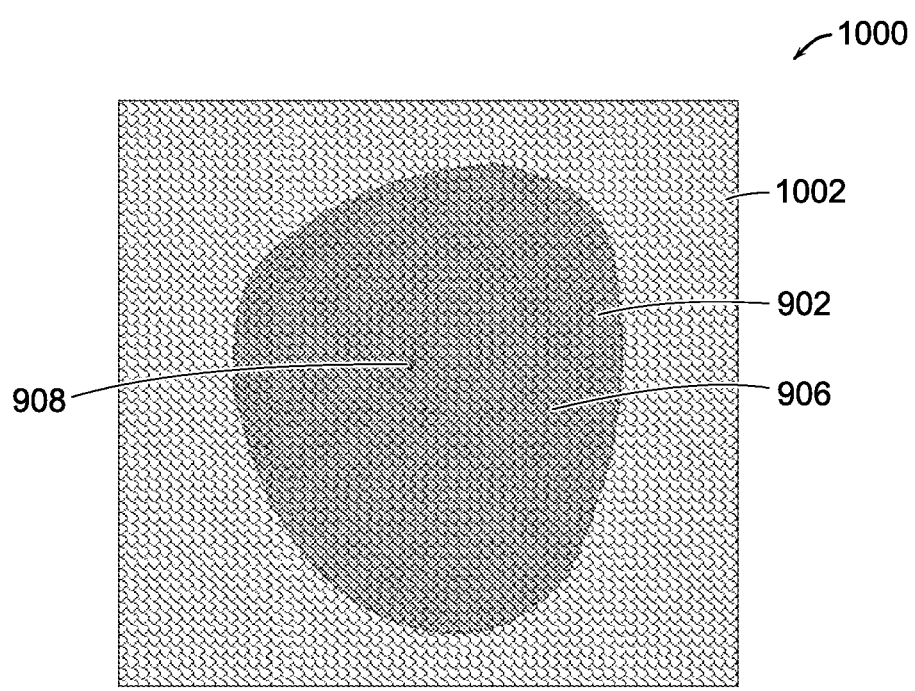
FIG. 10 is a schematic diagram illustrating the step of superimposing a texture onto the second patch of FIG. 9, according to an illustrative embodiment of the invention.

FIG. 10 is a schematic diagram 1000 illustrating step 214 of FIG. 2 in which a texture 1002 is superimposed onto the second patch 906 of FIG. 9. The texture 1002 may be superimposed onto the second patch 906 by applying a transformation matrix, Q, which contains components that specify translation, rotation, and/or scale. The texture may be a color image, a monochrome pattern, data that specifies a degree of displacement of the surface normal of an object, or any other set of two-dimensional information which is to be associated with the surface of a virtual object. The effect of step 214 of FIG. 2 is to superimpose the second patch 906 over the texture with a preferred alignment and scale. The H/GUI element 108 shown in FIG. 1A is a user-friendly interface that allows a user to perform step 214 and select a preferred alignment and scale interactively, as discussed in more detail herein below.

The method of FIG. 2 illustrates how the second patch provides a direct relationship between the first parameter space and the coordinate space of the texture. Alternatively, the second patch may provide this relationship indirectly via a second parameter space, or via several "intermediate" parameter spaces that are related to the first parameter space.

With the elements described in steps 204 to 214 of FIG. 2 in place, the mapping step 216 of FIG. 2 may be accomplished. In this step, a location x within the selected region 304 on the surface of the 3D virtual object 302 is mapped to a corresponding point in the texture 1002.

Figure 11:
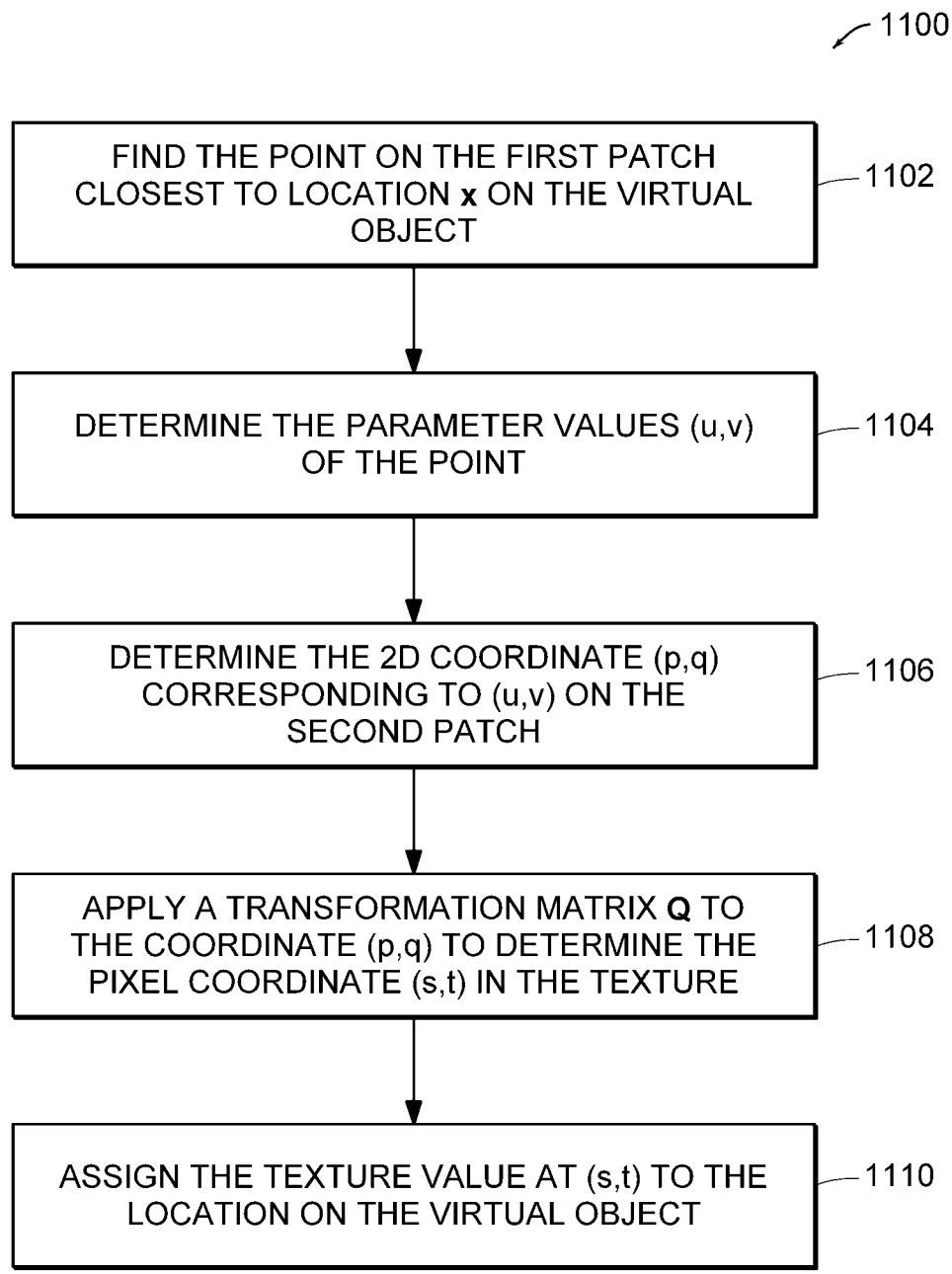
FIG. 11 is a block diagram featuring a method of performing the mapping step of FIG. 2, according to an illustrative embodiment of the invention.

FIG. 11 is a block diagram 1100 featuring a method of performing the mapping step 216 of FIG. 2. In step 1102, the nearest point on the first patch 502 (FIG. 5) is found for a given point x within the selected region 304 on the surface of the 3D virtual object 302. The parameters associated with this point are next determined in step 1104 of FIG. 11. For example, if the geometric representation used for the first patch is a NURBS patch, then the parameters (u,v) define this point on the NURBS patch. In step 1106 of FIG. 11, the two dimensional coordinate (p,q) of the point on the second patch 906 corresponding to the parameter values (u,v) determined in step 1104 is found. In step 1108 of FIG. 11, a transformation matrix Q is applied to the coordinate (p,q) to generate a coordinate (s,t) in the texture. The H/GUI element 108 in FIG. 1 allows the user to interactively translate, scale, rotate, or otherwise adjust applied texture by manipulating a haptic/graphical user interface device, resulting in a modification of matrix Q. The texture value at (s,t) is then assigned in step 1110 of FIG. 11 to location x on the virtual object. The assignment step 1110 may involve assigning a graphical value associated with the location (s,t) in the texture. For example, the graphical value may be a color value, and the texture may comprise a color image or a repeating pattern which is to be wrapped onto the selected region on the surface of the 3D object. Where the texture includes a repeating pattern, a preferred embodiment does not constrain any boundary of the tiled pattern to align with a boundary of the user-defined region.

Alternatively, the graphical value of the texture may represent an adjustment along a normal to the surface of the virtual object, as in the case of embossing the texture onto the surface of the 3D object within the selected region. For example, if the value of the texture image at (s,t) is v, the point x may be offset outwardly or inwardly along the surface normal of the virtual object by a distance v scaled by an emboss scale height factor h. The user may control the magnitude of h to achieve the desired embossing effect, using, for example, one of the controls on the H/GUI element 108 of FIG. 1, described in more detail below.

Figure 12:
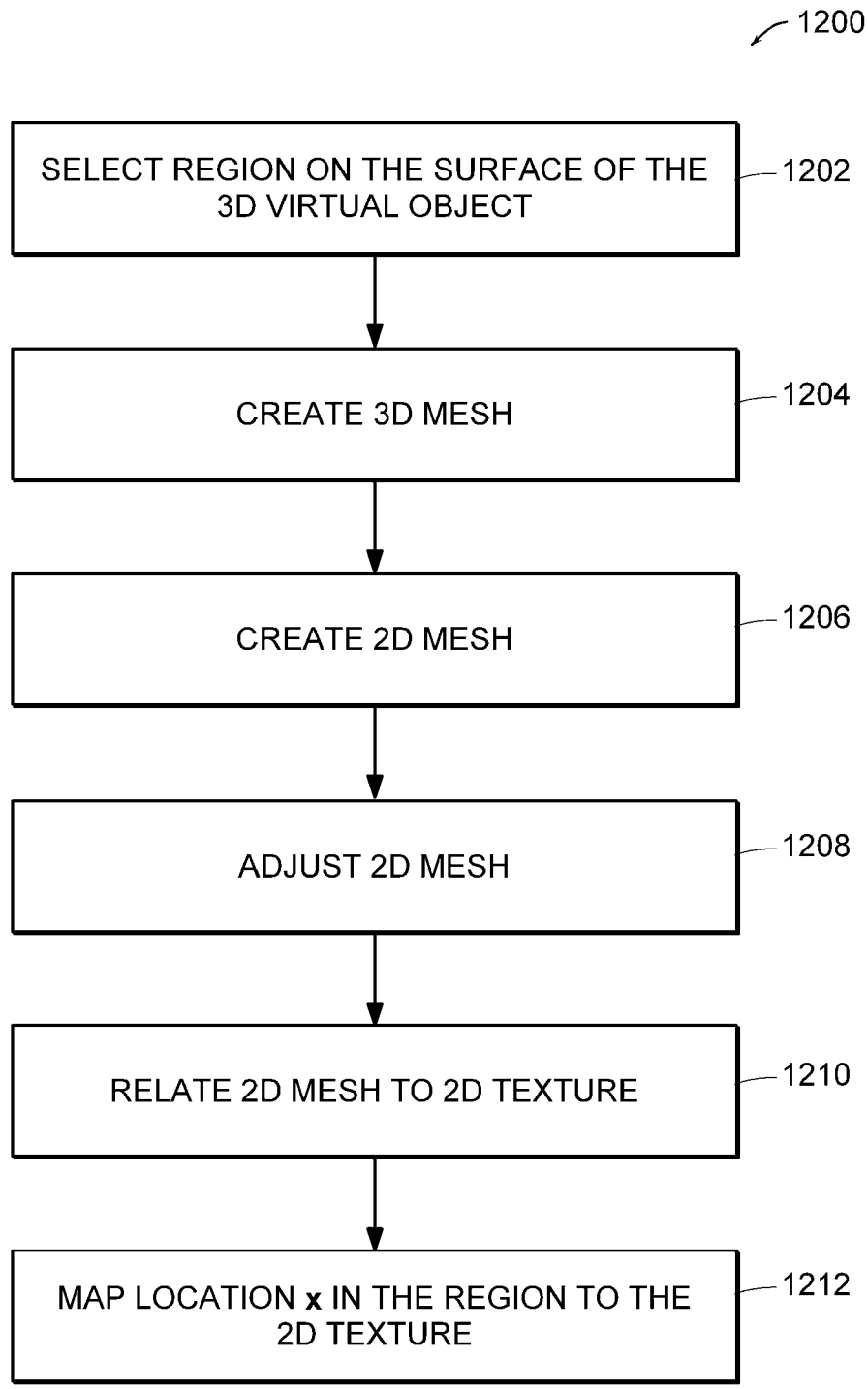
FIG. 12 is a block diagram featuring a method of mapping a location on the surface of a three-dimensional virtual object to a corresponding location on a two-dimensional texture, according to an illustrative embodiment of the invention.

FIG. 12 is a block diagram 1200 featuring an embodiment of the invention in which the method of mapping a location on the surface of a 3D virtual object to a corresponding location on a 2D texture is not necessarily performed using a first patch and/or a second patch. The steps in the method featured in FIG. 12 are similar to those of the method featured in FIG. 2, but the steps in FIG. 2 involving the use of the first patch and the second patch are omitted. In step 1202 of FIG. 12, a region on the surface of the 3D object is selected. This step corresponds to step 202 of FIG. 2 and is described above. The region selected in step 1202 is parameterized, and a first mesh is created in step 1204. This mesh lies in three-dimensional space, and comprises points that correspond to points within a user-selected region, such as the region bounded by the curve loop 304 in FIG. 3. The first mesh is substantially evenly spaced in parameter space. In a preferred embodiment, a geometric representation of the selected region 304 on the surface of the 3D virtual object 302 is used to relate a 2-component parameter space to the 3D coordinate space of the virtual object. For example, the 3D object may be described using an analytic geometrical representation of the virtual object surface. The creation of a two dimensional mesh in step 1206 of FIG. 12 and the adjustment of the two dimensional mesh in step 1208 of FIG. 12 to improve a quality metric associated with an arrangement of points of the second mesh correspond to steps 208 and 210 in FIG. 2, respectively.

In some cases the adjusted two-dimensional mesh of step 1208 can be directly related to a corresponding point in the texture, as indicated in step 1210, without the need for a second patch. For example, it may be possible to determine texture values corresponding to fractional parameter locations by interpolating texture values corresponding to nearby mesh points.

Step 1210 of FIG. 12 involves the use of a transformation matrix in order to bring the texture into a desired alignment and scale, as described above in connection with step 214 of FIG. 2. In the final step 1212 of the mapping method of FIG. 12, a location x in the selected region 304 of FIG. 3 is mapped to a location in the texture.

Figure 13:
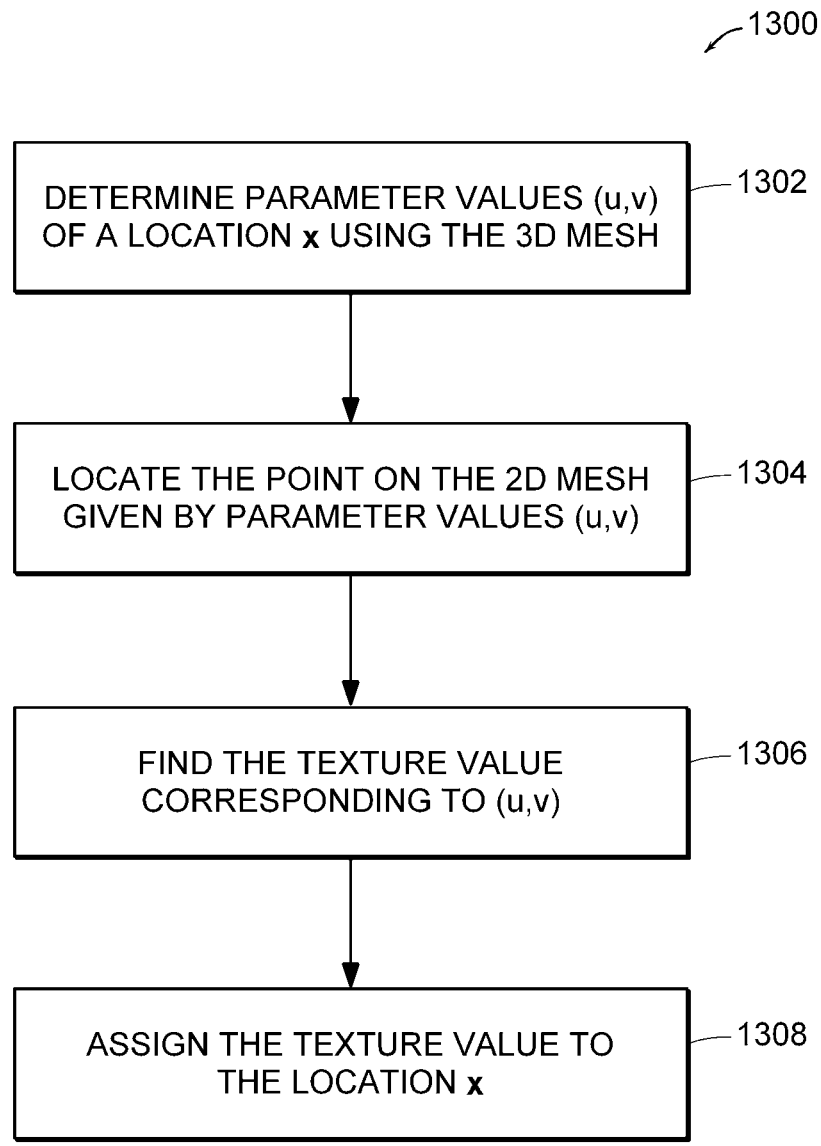
FIG. 13 is a block diagram featuring a technique for performing the mapping step in the method of FIG. 12, according to an illustrative embodiment of the invention.

FIG. 13 is a block diagram 1300 featuring a method of performing the mapping step 1212 in the method of FIG. 12. In step 1302 of FIG. 13, the parameter values (u,v) of a location x on the surface of the selected region 304 of FIG. 3 are determined by using the non-planar first mesh. Parameters associated with the mesh point nearest to the location x may be used, or, alternatively, the mesh may be interpolated to give fractional parameter values that more closely correspond to the location x. The point on the planar second mesh associated with the parameter values (u,v) is then located in step 1304. Fractional parameter values may be interpolated, for example, linearly, to obtain the point on the second mesh that best corresponds to the parameters (u,v) determined in step 1304. Next, the texture value corresponding to the point is determined in step 1306 using the relationship established in step 1210 of FIG. 12. Step 1308 of FIG. 13 is the assignment of the texture value determined in step 1306 to the location x. As described above in connection with step 1110 of FIG. 11, the assignment step may consist of assigning a graphical value, such as a color to the location x, or displacing the surface at x by an amount corresponding to the texture value.

Figure 14:
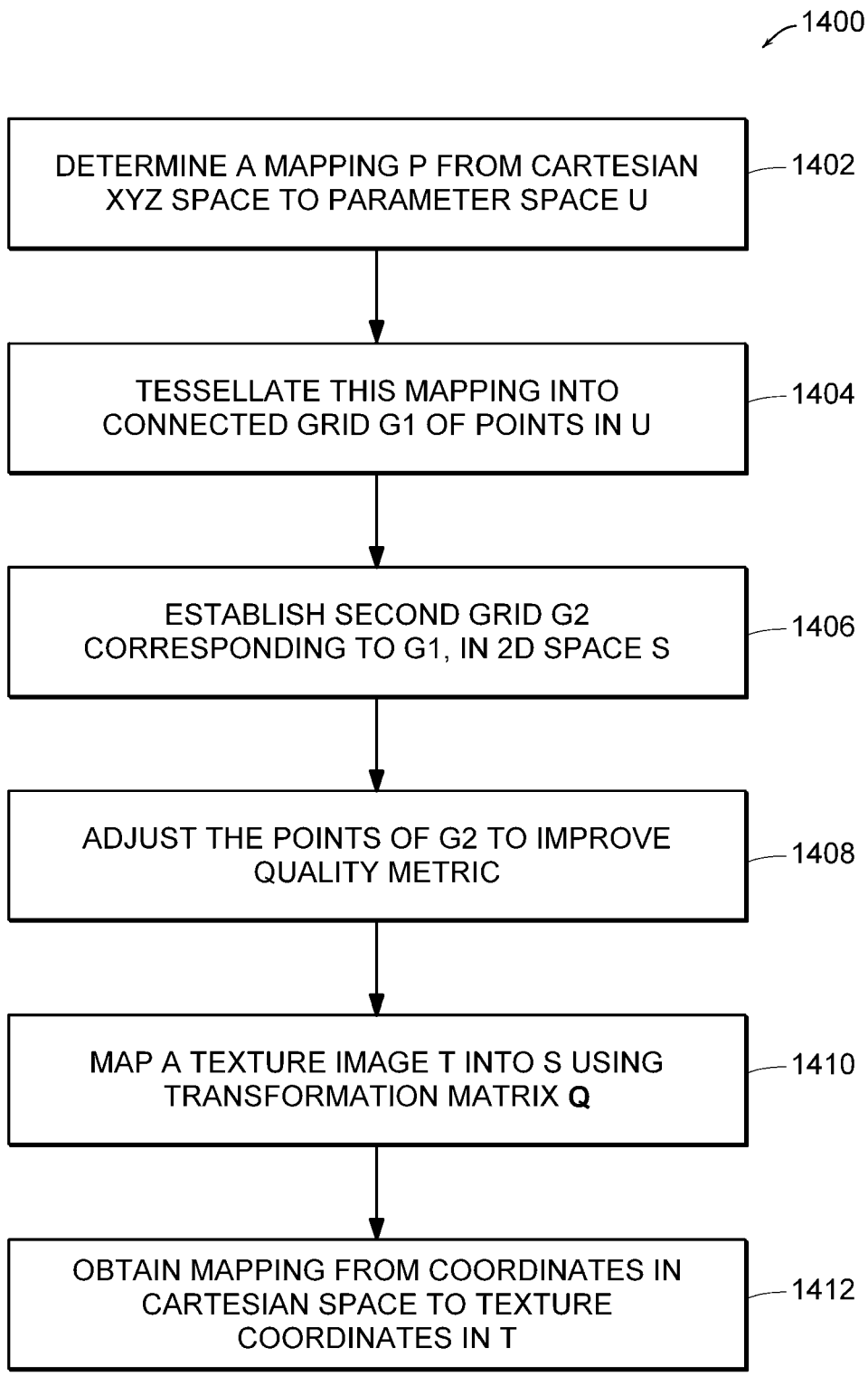
FIG. 14 is a block diagram featuring a method of mapping a location on the surface of a virtual object represented in three-dimensional Cartesian space to a corresponding location on a texture represented in two-dimensional texture space, according to an illustrative embodiment of the invention.

FIG. 14 is a block diagram 1400 featuring an alternative method of mapping a location on the surface of a virtual object represented in three-dimensional Cartesian space to a corresponding location on a texture represented in two-dimensional texture space. The mapping methods described above and illustrated in FIGS. 2 through 13 include specific embodiments of the method of FIG. 1400. In step 1402, a mapping P from Cartesian XYZ space to parameter space U is determined. This mapping captures the information associated with the geometry of the surface of the virtual object within a selected region. In step 1404 of FIG. 14, the mapping is tessellated into a connected grid G1 of points in U, preferably relatively evenly-spaced in U. In one embodiment, the mapping P of step 1402 is provided by a NURBS patch and the Grid G1 of step 1404 is obtained by creating an N×M tessellation of the NURBS patch. Alternatively, the parameterized grid could be obtained by using Voronoi diagrams and Delaunay triangulation. The grid G1 need not be rectangular. For example, the grid G1 may be a triangular mesh or other polygonal mesh. In step 1406 of FIG. 14, a second grid G2 is established. G2 corresponds to G1 and, in a preferred embodiment, it has the same number of points, connectivity, and parameter space representation as G1. G2 lies in a two-dimensional planar space S; coordinates of points in S may be referred to as (p,q). In step 1408 of FIG. 14, the points of the second grid G2 are adjusted to improve a quality metric associated with an arrangement of points in G2. In one embodiment, the quality metric is the energy of a system of springs associated with the points in G2, where the system of springs connects pairs of adjacent points in G2 and the springs are assigned set-lengths corresponding to the distance in Cartesian space between corresponding neighboring grid points in G1. In one embodiment, the optimization comprises reducing the energy associated with the springs, preferably reaching a configuration in which the energy of the spring system is substantially minimized. One technique for performing the adjustment step 1408 of FIG. 14 is described in more detail above, and an example of this technique is illustrated in FIGS. 7A, 7B, and 8. In step 1410, a texture T is mapped into the 2D parameter space S using a transformation matrix Q. This matrix performs arbitrary positioning, scaling, and rotation of the texture with respect to the selected region on the surface of the virtual object, and converts a given texture coordinate (s,t) into a location (p,q) in S. In the final step 1412, the representations developed in steps 1402 to 1410 are combined to obtain a mapping from XYZ coordinates in Cartesian space to texture coordinates in texture space.

Figure 15:
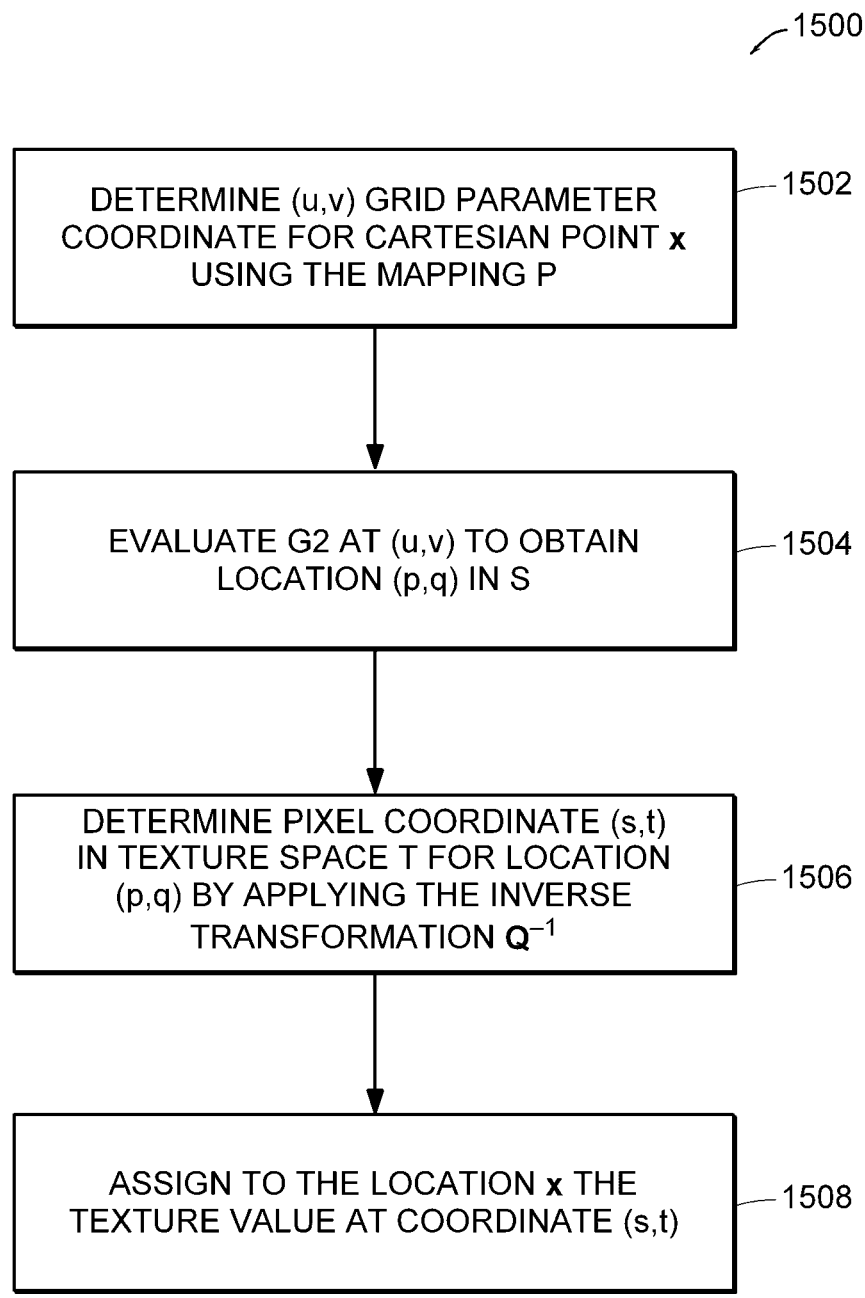
FIG. 15 is a block diagram featuring a technique for performing the step of mapping from Cartesian coordinates to texture coordinates in the method of FIG. 14, according to an illustrative embodiment of the invention.

FIG. 15 is a block diagram 1500 featuring a technique for performing the mapping step 1412 of FIG. 14. First, in step 1502, a point (u,v) in parameter space U of the first grid G1 corresponding to point x is determined by using the mapping P. Alternatively, the first grid and/or the parameter space U may be differently-defined. Next, in step 1504, the second grid G2 is evaluated at the parameter values (u,v) to obtain a location (p,q) in S. This (p,q) coordinate is then transformed into texture space T by applying the inverse transformation $Q^{-1}$, as shown in step 1506, yielding a pixel coordinate (s,t) in the texture.

Figure 16A:
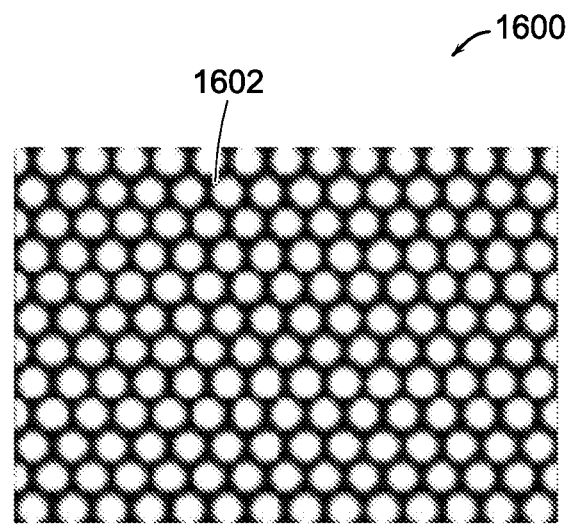
FIG. 16A is a schematic diagram illustrating an example of a two-dimensional texture to be applied to the surface of a three-dimensional virtual object as an embossing pattern, according to an illustrative embodiment of the invention.
Figure 16B:
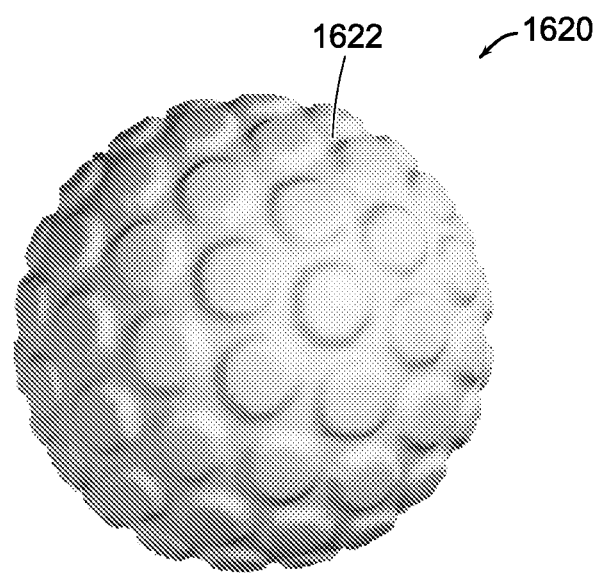
FIG. 16B is a schematic diagram illustrating a spherical virtual object following application of the texture of FIG. 16A as an embossing pattern on the surface of the object, according to an illustrative embodiment of the invention.

In step 1508 of FIG. 15, the texture value at the coordinate (s,t) is assigned to the location x. The assignment step may involve the modification of the surface of the three-dimensional virtual object at the location x using the information at (s,t) in the texture. The modification may include applying a color value. Alternatively, the texture value may represent a distance through which the surface normal of the virtual object at location x is displaced in an embossing application. FIG. 16A is a schematic diagram 1600 illustrating an example of a two-dimensional texture 1602 that is applied to the surface of a three-dimensional virtual object as an embossing pattern. FIG. 16B is a schematic diagram 1620 illustrating a spherical virtual object 1622 following the application of the texture of FIG. 16A as an embossing pattern on the surface of the object 1622.

Figure 17:
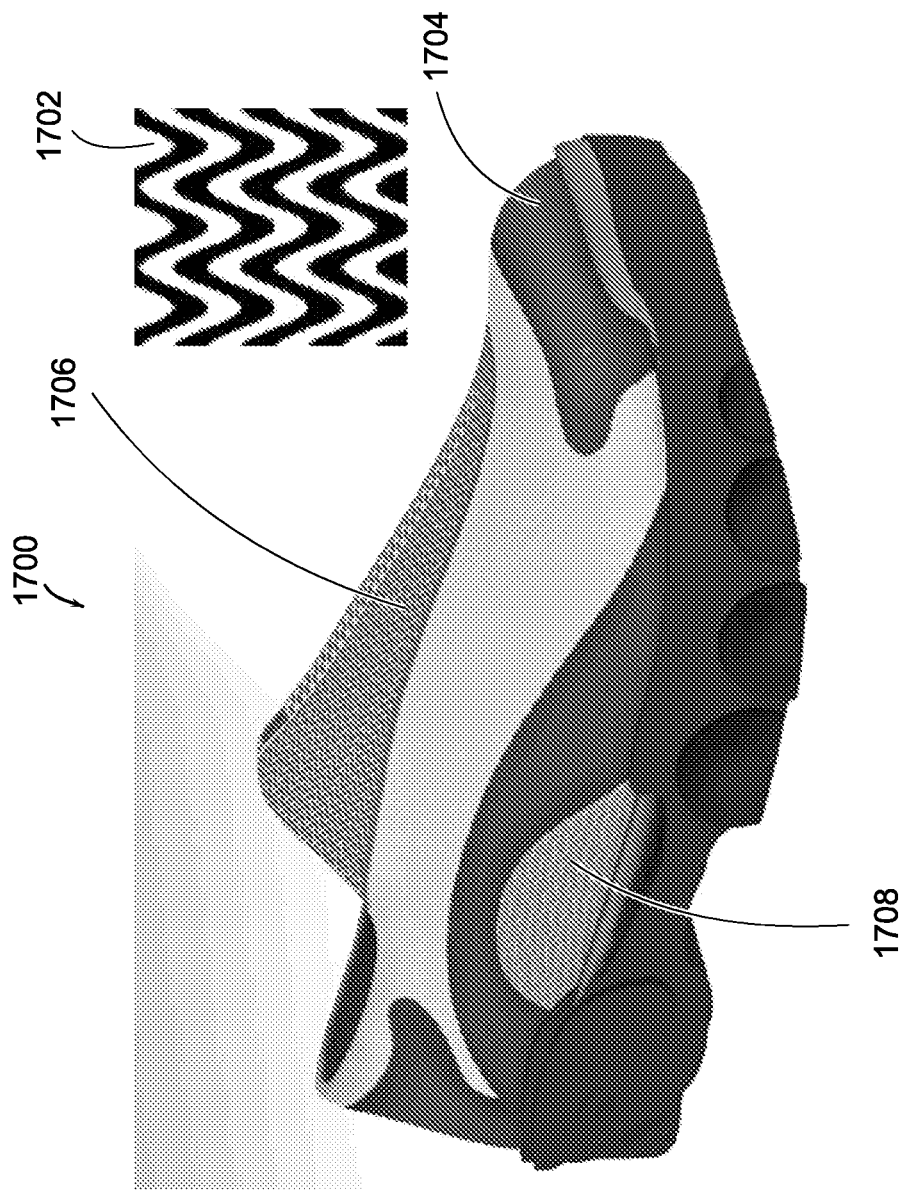
FIG. 17 is a schematic diagram illustrating the result of wrapping an exemplary two-dimensional texture onto the surface of a three-dimensional virtual object within selected regions, according to an illustrative embodiment of the invention.

FIG. 17 is a schematic diagram 1700 illustrating the result of wrapping an exemplary two-dimensional texture 1702 onto the surface of a three-dimensional object 1704 within multiple selected regions, according to an embodiment of the invention. The shoe illustrated in FIG. 17 shows two regions 1706 and 1708 of the shoe surface onto which the texture 1702 has been wrapped. The method of the invention is able to apply the texture without distortion caused by variations in the curvature of the shoe surface within the selected regions. The ability to align and scale the texture, using, for example, the H/GUI element 108 of FIG. 1, is also demonstrated by the shoe illustrated in FIG. 17. For example, the texture in region 1706 is aligned with the zigzag pattern running across the top of the shoe. The same texture pattern has been reduced in scale and rotated before being applied to region 1708, where the zigzag pattern runs along the length of the shoe, parallel to the edge of the sole.

The invention provides a graphical user interface element ("widget") adapted for use with the methods of mapping a two-dimensional texture onto the surface of a three-dimensional virtual object described herein. Thus, in addition to providing a low-distortion mapping technique, the invention provides a widget that enables interactive, intuitive adjustment of the texture by the user. Through manipulation of the widget, a user may adjust mapped texture on the surface of a virtual object while viewing a real-time graphical rendering of the adjustment in 3D object space. The widget offers a graphical representation of its position, scale, and orientation, which preferably relates to the position, scale, and orientation of the mapped texture. Additionally, the widget may be a haptic graphical interface element (H/GUI), providing a haptic representation according to a user's manipulation of a haptic interface device. For example, the haptic interface device may be the Phantom® haptic interface device manufactured by SensAble Technologies, Inc., in Woburn, Mass., described in U.S. Pat. No. 6,417,638, issued to Guy et al., the text of which is incorporated herein by reference in its entirety. For example, the haptic interface device is a six degree of freedom force reflecting tool that includes three powered axes and three free axes, all of which are tracked so that the position of a user connection element in the virtual environment (object space) can be determined and a corresponding force applied.

The haptic representation of the widget, combined with the graphical representation, provides an enhanced, intuitive experience for a user, enabling faster, improved adjustment of the mapped texture. For example, the widget may issue forces to a haptic interface device in response to a user signal or manipulation, aiding the user in locating and controlling the widget in order to perform an adjustment of mapped texture.

Figure 18A:
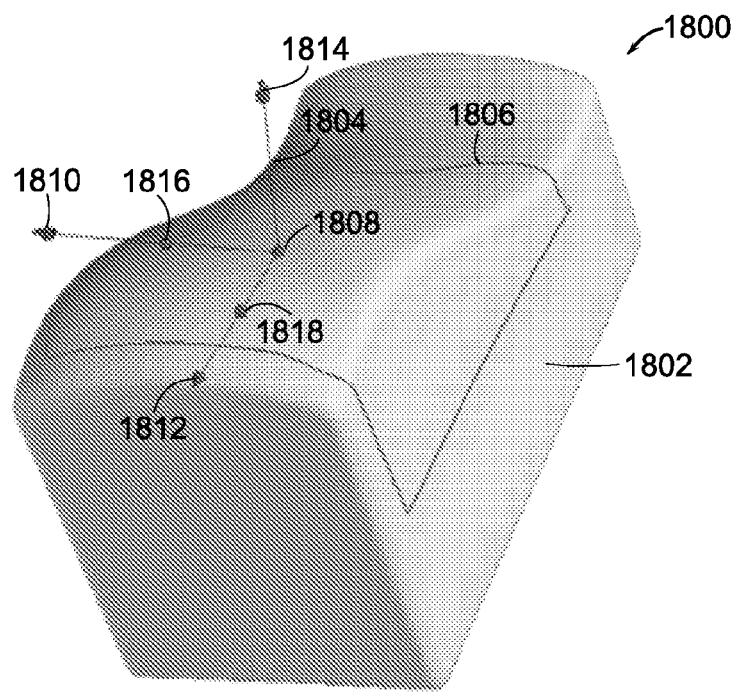
FIG. 18A is a screenshot of a virtual object upon which a user has drawn a curve loop; the screenshot also shows a haptic/graphical user interface element for applying and adjusting a texture on the surface of the object within the region defined by the curve loop, according to an illustrative embodiment of the invention.

FIG. 18A is a screenshot 1800 of a virtual object 1802 upon which a user has drawn a curve loop 1806. The screenshot 1800 shows a haptic/graphical user interface element (widget) 1804 for applying and adjusting a texture on the surface of the object 1802 within the region defined by the curve loop 1806. Here, the graphical representation of the widget 1804 is a set of three orthogonal axes that intersect at a common origin 1808. The widget 1804 includes a set of active locations ("hotspots") for adjusting texture applied to the surface of the virtual object 1802. Here, the widget has six hotspots, including one at the origin 1808, one at the end of each of the three axes 1810, 1812, 1814, and one along each of the two axes 1816, 1818 that lie along the "base plane," tangent to the surface of the virtual object 1802 at the widget origin 1808. Alternatively, there may be one, two, three, four, five, seven, eight, nine, ten, or more hotspots associated with the widget. The hotspots shown in FIG. 18A are graphically represented by cones 1810, 1812, 1814 and spheres 1808, 1816, 1818.

Figure 18B:
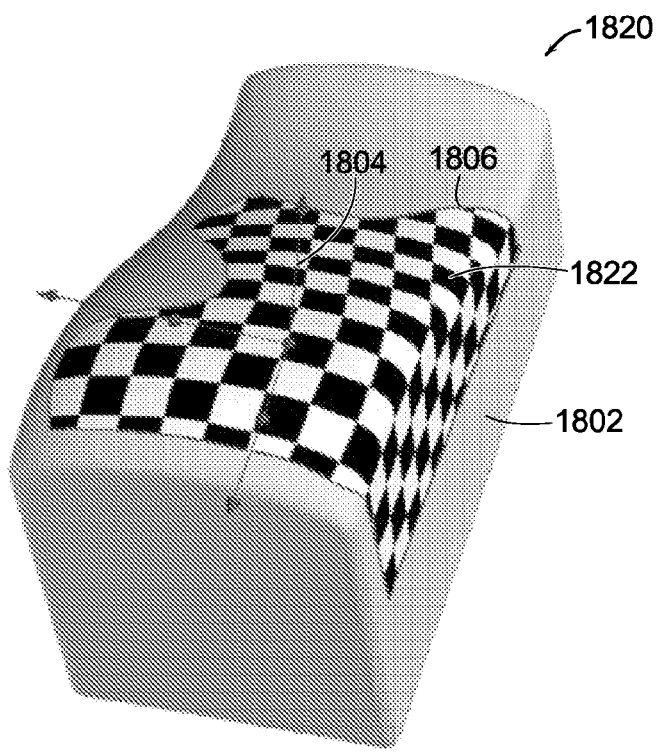
FIG. 18B is a screenshot of the virtual object of FIG. 18A following wrapping of a checkerboard texture on the surface of the object within the user-defined region, according to an illustrative embodiment of the invention.

FIG. 18B is a screenshot 1820 of the virtual object 1802 of FIG. 18A following application of a checkerboard texture 1822 onto the surface of the object 1802 within the region bounded by the user-drawn curve loop 1806. The checkerboard texture 1822 is an example of a repeating, "tiled" pattern applied to the surface of the virtual object 1802. Alternatively, the mapped texture may be a non-tiled image.

Figure 19A:
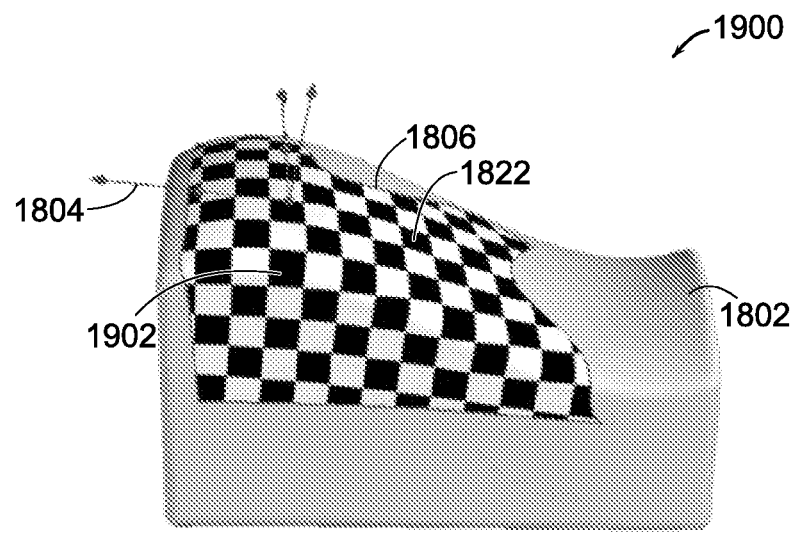
FIG. 19A is a screenshot showing the virtual object and haptic/graphical user interface element of FIG. 18B from an angle that highlights texture wrapping on a sharp curvature feature within the user-defined region, according to an illustrative embodiment of the invention.

FIG. 19A is a screenshot 1900 showing the virtual object 1802 and H/GUI element (widget) 1804 of FIG. 18B from an angle that highlights texture wrapping on a sharp curvature feature 1902 within the region bounded by the user-drawn curve loop 1806. Texture is wrapped within the user-defined region 1806 successfully, with a minimum of distortion. Using the above-described Phantom® haptic interface device, the virtual object 1802 shown in FIG. 19A is represented within a space of about 100×50×50 mm.

Figure 19B:
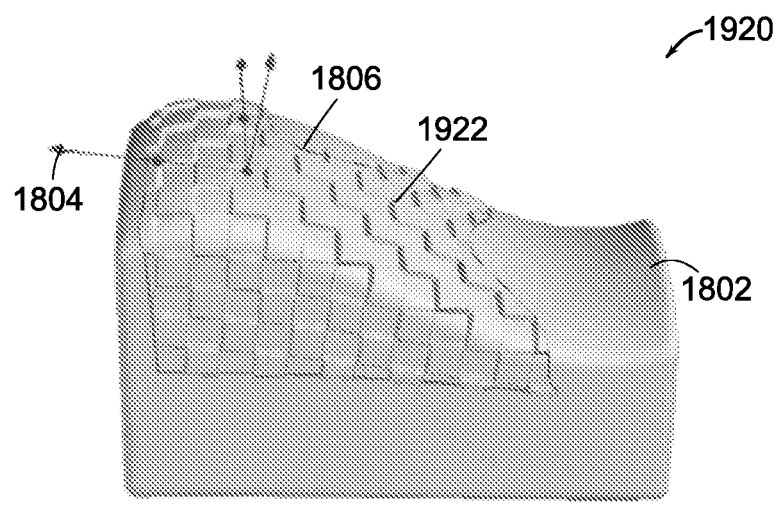
FIG. 19B is a screenshot showing the virtual object and haptic/graphical user interface element of FIG. 18A following the wrapping of an embossing pattern within the user-defined region, according to an illustrative embodiment of the invention.

FIG. 19B is a screenshot 1920 showing the virtual object 1802 and widget 1804 of FIG. 18A following the application of an embossing pattern 1922 within the user-defined region 1806. The embossing pattern 1922 in FIG. 19B is directly analogous to the two-dimensional texture 1822 applied in FIG. 19A. Here, the embossing pattern assigns an adjustment along a normal to the surface of the virtual object 1802, where the white squares of the checkerboard pattern 1822 are raised and/or the black squares are sunken with respect to the surface of the virtual object 1802. Any scheme for assigning adjustments along normals to the surface may be used to apply an embossing pattern on the surface of the virtual object 1802.

The graphical representation of the widget 1804 shown in FIG. 18A offers various functional benefits. For example, the widget does not significantly obstruct the view of the region 1806 on the surface of the virtual object 1802 to which texture is mapped. Furthermore, the functions of the "hotspots" in adjusting mapped texture are related to their positions on the widget, as described in more detail below. This functional/positional relationship enables a user to more easily discover and use the texture-adjustment functions of the widget.

For example, the widget 1804 shown in FIG. 18A has a hotspot at an "origin" 1808, where the three axes of the widget intersect. Here, the origin 1808 is positioned directly on the surface of the virtual object 1802, within the user-defined region 1806 being textured. The origin 1808 may correspond to a point on a first patch, where the first patch relates a (u,v) parameter space to the XYZ coordinate space of the virtual object 1802. The (u,v) parameter space is shared by a planar second patch upon which the texture is superimposed. A normal to the surface ("surface normal") of the virtual object 1802 is determined by evaluating the surface derivatives of the first patch at the widget origin 1808. The surface normal defines the Z-axis of the widget, which extends from the surface of the virtual object 1802 in an outward direction perpendicular to a plane ("base plane") tangent to the surface at the widget origin 1808. The base plane contains the X-axis and Y-axis of the widget. The X-axis and Y-axis are orthogonal to the Z-axis.

The hotspot at the origin 1808 of the widget 1804 in FIGS. 18A and 18B allows a user to "grab onto" the texture 1822 and drag it across the surface of the virtual object 1802, thereby translating the texture 1822 within the user-defined region 1806. The function of the hotspot at the origin 1808 is related to its position on the widget 1804, since the origin 1808 lies on the surface of the object 1802 at a location within the user-defined region 1806.

The hotspots 1810, 1812, 1814 at the tips of the three axes of the widget 1804 in FIGS. 18A and 18B allow a user to scale the applied, mapped texture by adjusting the length of the corresponding widget axis. For example, a user may adjust an embossing height and/or depth by manipulating hotspot 1814 at the tip of the Z-axis. A user may adjust a length or width associated with each tile of an applied 2D texture by manipulating the respective hotspot 1810, 1812 at the tip of the X-axis or Y-axis. The functions of the hotspots at the tips of the widget axes 1810, 1812, 1814 are related to their positions on the widget 1804, since a user can intuitively associate the scale of a dimension of the applied texture with the length of the corresponding widget axis.

The hotspots 1816, 1818 on the X-axis and Y-axis of the widget 1804 allow a user to rotate the applied, mapped texture by "grabbing onto" the texture 1822 and dragging it around a circle to which the user may be haptically constrained upon activation of the hotspot(s) 1816, 1818.

Alternatively, the X-axis and Y-axis of the widget 1804 may be replaced with a disk or circular hoop, for example, rather than a pair of axes. The user may then rotate the texture 1822 and/or scale the texture by manipulating a hotspot (which may cover a continuous curve of points) along the edge of the disk or hoop.

The hotspots 1808, 1810, 1812, 1814, 1816, 1818 on the widget 1804 of FIGS. 18A and 18B provide visual and haptic cues about their location. Visual cues include, for example, spheres and cones, while haptic cues include, for example, gravity wells. Additionally, the widget 1804 may include use of a "boreline selection" or "view-apparent" selection method for selecting a hotspot on the widget 1804 based on a two-dimensional correspondence of the hotspot location and a cursor or tool location. For example, a user may be able to use a 2D representation of the position of a cursor or tool in 3D object space as viewed on a flat screen, and have the cursor/tool automatically repositioned to the hotspot location in 3D object space without having to search for the hotspot by attempting to move along the "depth" axis, where movement along the depth axis is not easily tracked using the 2D screen representation. In other words, view-apparent selection collapses depth for the purposes of selection, thereby making entities associated with a position in three-dimensional space easier to find and select. View-apparent selection is described in more detail in co-owned U.S. patent application Ser. No. 10/133,242, filed on Apr. 26, 2002, the text of which is hereby incorporated by reference in its entirety.

The visual and/or haptic attributes of the widget 1804 may change dynamically according to a user manipulation. For example, the graphical representation of the widget 1804, and/or a haptic constraint associated with a hotspot of the widget 1804 may change dynamically according to the widget "mode." The widget mode may be associated with a cursor or tool position and/or a user manipulation of a graphical user interface device or haptic/graphical user interface device. For example, possible widget modes include the following: an "idle" mode, a "snapped" mode, a "clicked" mode, a "dragging" mode, and a "release" mode.

The widget 1804 of FIGS. 18A and 18B has its default appearance in idle mode, where the cursor/tool is not near the widget 1804. During snapped mode, the cursor/tool has approached the widget 1804, and the widget's appearance indicates one or more actions for adjusting mapped texture that is/are available to the user. "Snapping" may be associated with a haptic constraint, such as a gravity well, described in more detail herein below. Snapping may additionally or alternatively be associated with a visual highlighting that indicates snapping has occurred.

A clicked mode occurs upon execution of a user signal while the cursor/tool is positioned on a hotspot of the widget 1804. For example, the user may click a button on the haptic/graphical user interface device after positioning a cursor/tool on a hotspot in order to begin an adjustment associated with the hotspot. The user click may be accompanied by a change in the appearance of the widget 1804 and/or a haptic force applied via the H/GUI device.

Dragging occurs when the user maintains activation of an operation by, for example, keeping a button depressed while moving the H/GUI device. The appearance of the widget 1804 may change during the dragging mode; for example, the length of an axis of the widget 1804 may change as a user clicks-and-drags a hotspot at the tip of an axis of the widget 1804. Additionally, or alternatively, a haptic constraint associated with a hotspot may be activated, deactivated, or change dynamically during the dragging mode. An adjustment of mapped texture may occur during the dragging mode, and the virtual object 1802 may be rendered dynamically to provide a sequence of frames that visually present the adjustment in real time according to the user manipulation. In one example, the dynamic rendering only affects a graphical representation of the virtual object 1802, not the underlying volumetric representation of the 3D virtual object. For example, during dragging, the underlying model of the virtual object 1802 may remain unchanged, while the graphical rendering is dynamically updated to reflect the texture adjustment produced by the user manipulation. Avoiding unnecessary modifications of the underlying model improves rendering speeds.

A release mode corresponds to the deactivation of an operation upon a user signal, such as a release of a button following a click-and-drag operation. Upon release, the net effect of the texture adjustment may be implemented. Thus, upon release, any change in the volumetric representation of the underlying 3D virtual object 1802 may be made to reflect the net adjustment corresponding to the user manipulation. For example, when performing a click-and-drag to adjust the depth and/or height associated with an embossed pattern that is mapped onto the surface of the virtual object 1802, the actual volumetric representation of the model is changed only upon release of the H/GUI device button by the user; however, a dynamic preview of the deepening or heightening of the embossed pattern is provided to the user as the user drags the appropriate hotspot.

The visual appearance of the widget 1804 may change according to the current mode. For example, the widget 1804 may change color to indicate a transition from idle mode to snapped mode. A color change may also indicate a transition from snapped mode to clicked and/or dragging mode. The widget 1804 may also change shape during a transition between modes, for example, to accentuate an available adjustment and/or to de-emphasize less relevant portions of the widget 1804.

The visual appearance of the widget 1804 may also change to indicate an activated haptic constraint. For example, a haptic constraint along a line may be visually indicated by a thin line. Likewise, the deactivation of the haptic constraint may be visually indicated by the disappearance of the thin line.

The widget 1804 of FIGS. 18A and 18B may be associated with one or more haptic components. For example, a haptic point constraint or line constraint may be associated with the widget 1804 such that a force-feedback is applied to the user via a haptic interface device according to the position of a cursor/tool in relation to the widget 1804. The force is a function of the distance between the location of the cursor/tool and the location of the haptic constraint (i.e. point constraint or line constraint). As the user approaches a haptic constraint within a prescribed "snap-distance," the visual location of the cursor/tool is modified to coincide with the hotspot location. Thus, a "clean" visual snap to the constraint location is performed, while a haptic force is provided to pull or otherwise guide the haptic interface device toward the constraint location.

The hotspots of a widget 1804 may have point constraints associated with them. For example, the widget 1804 may arm a constraint associated with a given hotspot when the cursor/tool approaches the hotspot location within a prescribed snap-distance. The constraint is preferably a weak constraint, in that the user may pull off the constraint, if desired, by moving the haptic interface device to overcome the haptic force associated with the armed, or activated, constraint. Such a constraint may be called a gravity well or snap-point, for example. These constraints help guide the user toward the hotspots of the widget 1804, allowing easier, more intuitive utilization of the widget 1804.

A user may click-and-drag at a hotspot on the widget 1804 to adjust the texture applied on the surface of the virtual object 1802. A haptic constraint may be associated with a click-and-drag operation performed at any of the hotspots of the widget 1804. Such a constraint may help to guide the user in performing the desired adjustment. Constraints that are activated or armed during a click-and-drag operation may be weak in that they suggested a preferred direction of movement to the user via force feedback, but they allow the user to pull off the constraint if desired. There may be multiple constraints of varying force associated with a single click-and-drag operation at a given hotspot. A weak constraint may be applied to guide a user along an axis of the widget 1804 of FIG. 18A, and if the user pulls off the axis constraint, another constraint having a different associated force may be armed. For example, if the user pulls off the axis constraint, a weaker or stronger constraint may be activated to keep the user on a plane that contains the axis.

The haptic constraint associated with a given click-and-drag operation at a hotspot of the widget 1804 may be a strong, or "stick-to" constraint, requiring the user to keep the cursor/tool on the constrained geometry, subject to hardware limitations of the haptic interface device.

Haptic detents are "dents" or "bumps" which serve as spatial references for the user as the user moves the cursor/tool with the haptic interface device. Detents may be superimposed over other haptic constraints. For example, a user may experience haptic detents at various positions as the user performs a click-and-drag operation, dragging the cursor/tool along an axis or curve to which it is constrained. Such detents may allow a user to return to an initial location, or proceed to a reference location along an axis or loop to which the cursor/tool is constrained.

In one example, a detent allows a user to return exactly to the original click-point, offering a way for the user to "cancel" an unintended click-and-drag operation. For example, there is a detent at all hotspots 1808, 1810, 1812, 1814, 1816, 1818 of the widget 1804 of FIGS. 18A and 18B. Where the cursor/tool is constrained to a circular loop, detents help the user locate special angles, such as multiples of 90 degrees, from a start location or other reference location. For example, there is a detent at the 0, 90, 180, and 270 degree locations along a circular constraint during a click-and-drag operation to rotate texture using either of the hotspots 1816, 1818 of the widget 1804 of FIGS. 18A and 18B. Also, if two linear constraints cross at a point, a detent may be placed at the intersection point to signal to a user as the user is moving the cursor/tool along one constraint that the cursor/tool has crossed another constraint.

A haptic detent acts as a gravity well if the tool comes into close proximity (i.e., within a snap-distance). Haptic detents may be dependent on one or more underlying constraints. For example, when a cursor/tool is constrained to a line or circle, its position is compared to one or more haptic detent locations. If the cursor/tool is within a designated snap-distance, a force is applied to attract the cursor/tool to the location associated with the detent. The user experiences an effect analogous to that of a pothole in a road—as the cursor/tool travels along a line or curve constraint, for example, the smooth motion is interrupted by the detent. The user has the option of ending an operation at the snap-to detent location. For example, the user may release the button of the haptic interface device, ending the click-and-drag operation.

In some instances, the snap-to effect provided by a detent may be undesired by the user. For example, the user may wish to make small modifications near a click-position after the user clicks the cursor/tool on a hotspot of the widget 1804. Thus, the invention provides a mechanism for arming and disarming the haptic detents in a user-friendly way. For example, when the user clicks on a hotspot, the haptic detent at that hotspot is automatically disarmed, allowing an initial, small manipulation by the user within the snap-to distance associated with the hotspot. If the cursor/tool moves a designated distance from the click-point, the method automatically re-arms the detent at the click-point, and if the tool returns to the position, the user can find the original click-point haptically. Additionally, one or more haptic detents may be disarmed upon a supplemental user signal, for example, the pressing of a CTRL key or other key on a keyboard or keypad.

As described above, the widget 1804 shown in FIG. 18A is graphically represented as a set of three orthogonal axes that intersect at a common origin 1808. The origin 1808 is located on the surface of the virtual object, and the base plane containing the X-axis and Y-axis of the widget 1804 is tangent to the surface at the widget origin 1808. In one embodiment, the orientation of the X- and Y-axes of the widget 1804 is performed automatically. This enhances the user experience, because the X- and Y-axes of the widget 1804 may be automatically aligned according to the directions of edges associated with the mapped texture, particularly where the texture includes a repeating pattern or is a tiled pattern, as in the checkerboard texture 1822 of FIG. 18B. In the checkerboard texture 1822 example, the X-axis and Y-axis of the widget 1804 should align with the blocks of the checkerboard pattern. In other words, the X-axis (or Y-axis) should run substantially parallel to one of the square edges of a block of the checkerboard pattern, but not diagonally through a block of the checkerboard pattern.

The invention includes a method of determining the orientation of the axes of the widget 1804 shown in FIGS. 18A and 18B. The origin 1808 of the widget 1804 is a point on a first patch, where the first patch relates a (u,v) parameter space to the XYZ coordinate space of the virtual object 1802. The (u,v) parameter space is shared by a planar second patch, upon which the texture is superimposed. The second patch relates the (u,v) parameter space to a 2D "intermediate" (p,q) coordinate space as described in the block diagram 1100 of FIG. 11. Then, the transform matrix Q transforms (p,q) coordinates into final texture coordinates. To determine the orientation of the axes of the widget 1804 in FIGS. 18A and 18B such that the base plane axes align with the texture to be applied, first determine directions in XYZ object space that are tangent to the two isoparametric (u,v) curves that cross the widget origin 1808, one curve with constant u, and the other curve with constant v. This is done by evaluating the partial derivatives for the first patch to produce two vectors, $\partial XYZ/\partial u$ and $\partial XYZ/\partial v$. Similarly, partial derivatives of the second patch are evaluated at the same (u,v) location and combined with Q to produce the four scalar partial derivatives, $\partial s/\partial u$, $\partial t/\partial u$, $\partial s/\partial v$, and $\partial t/\partial y$. Then, a direction vector in XYZ object space that substantially aligns with the s coordinate of the mapped texture is determined, and the orientation of the X-axis of the widget 1804 is assigned such that it runs along the determined direction vector. The three components of the direction vector in XYZ object space may be evaluated according to Equations 2, 3, and 4 as follows:

$$\partial x/\partial s = (\partial x/\partial u)(\partial u/\partial s) + (\partial x/\partial v)(\partial v/\partial s) \qquad (2)$$

$$\partial y/\partial s = (\partial y/\partial u)(\partial u/\partial s) + (\partial y/\partial v)(\partial v/\partial s) \qquad (3)$$

$$\partial z/\partial s = (\partial z/\partial u)(\partial u/\partial s) + (\partial z/\partial v)(\partial v/\partial s) \qquad (4)$$

The direction of the X-axis of the widget 1804 is a vector having the components ($\partial x/\partial s$, $\partial y/\partial s$, $\partial z/\partial s$). The Y-axis of the widget 1804 may be determined by taking a cross product, between the Z-axis and the X-axis, where the Z-axis is normal to the surface of the virtual object at the widget origin 1808.

Figure 20:
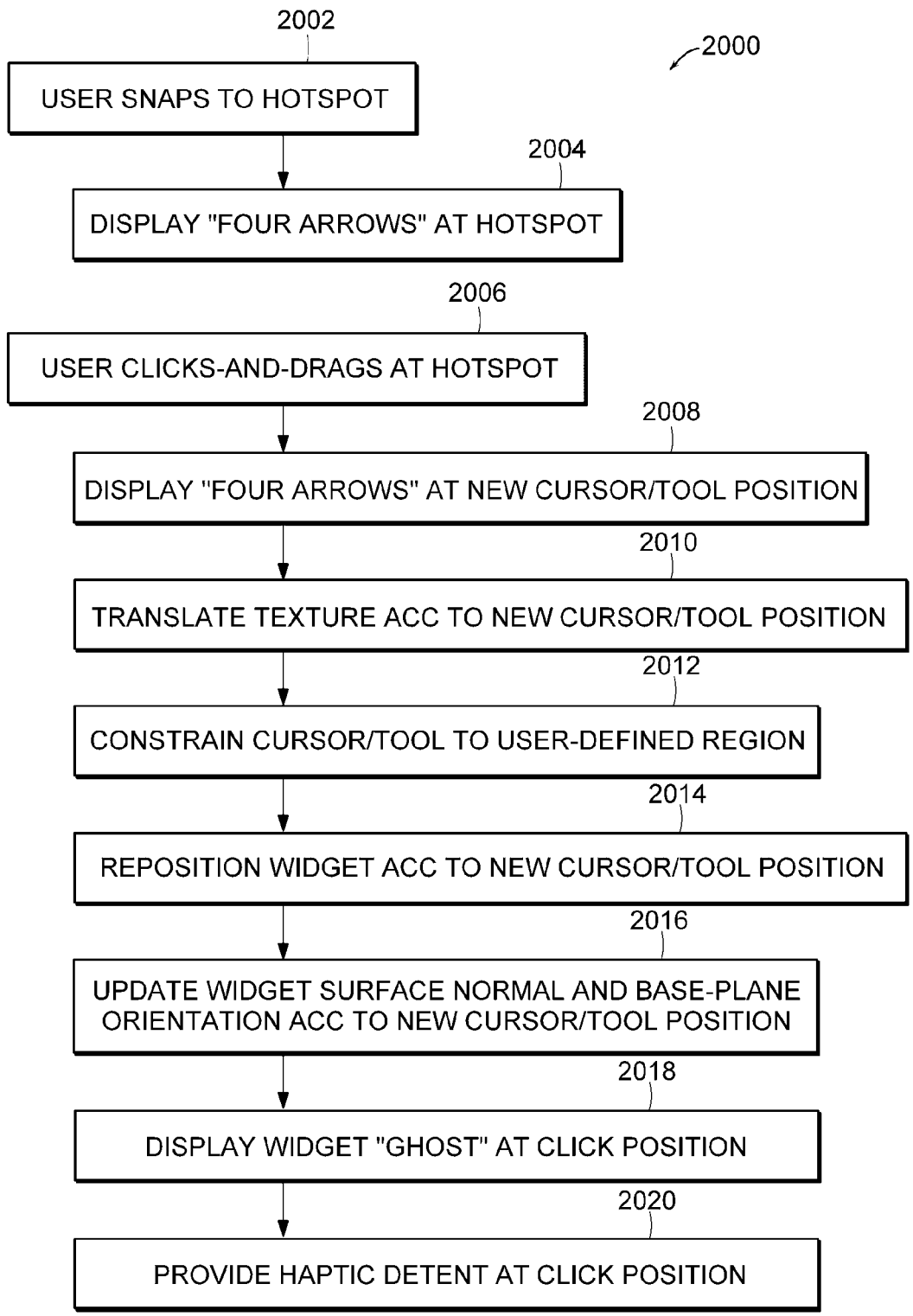
FIG. 20 is a block diagram featuring an interactive method for translating texture within a region, where the method provides a haptic/graphical user interface element having a "hotspot" for translating texture, according to an illustrative embodiment of the invention.
Figure 21:
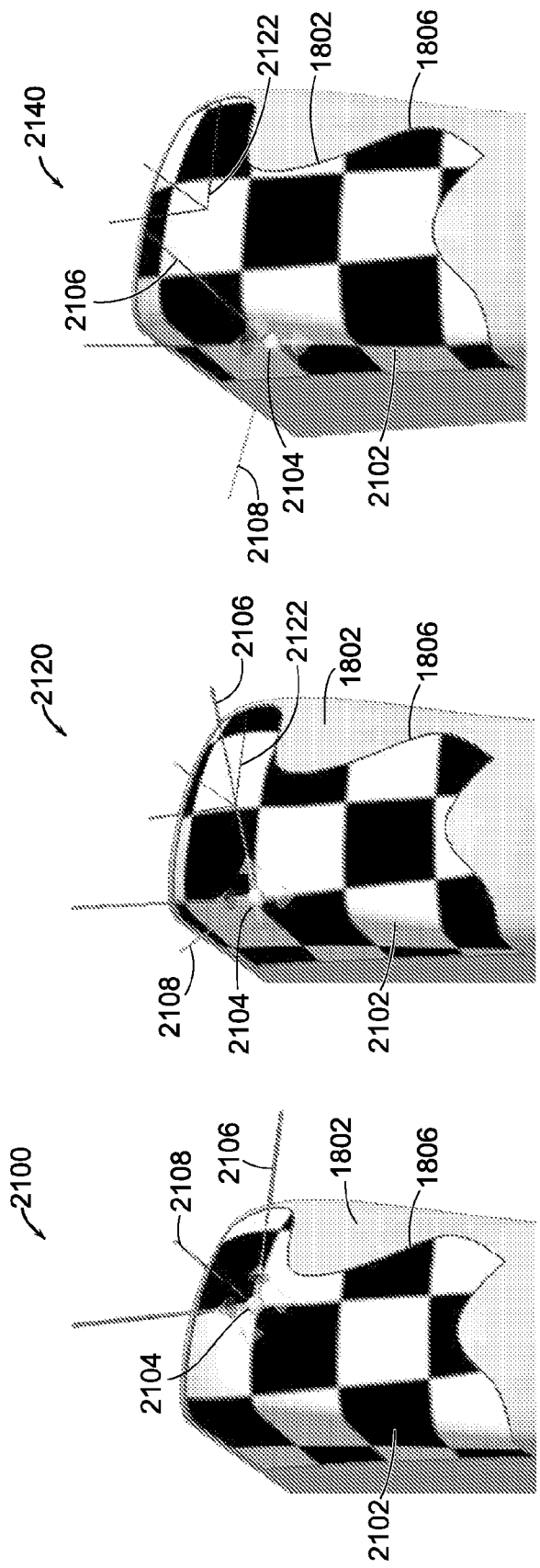
FIG. 21A is a screenshot showing the virtual object and haptic/graphical user interface element of FIG. 18A following a haptic "snap" to a hotspot located at the origin of the HGUI element, where the hotspot allows the user to translate texture applied within the user-defined region, according to an illustrative embodiment of the invention.
FIG. 21B is a screenshot showing the virtual object and haptic/graphical user interface element of FIG. 21A during a user "click-and-drag" at a hotspot for translating texture, where the cursor is haptically constrained to the user-defined region on the surface of the virtual object, and where the user has dragged the cursor to the left and slightly downward; the user movement results in the translation of the wrapped texture within the user-defined region to a new position, according to an illustrative embodiment of the invention.
FIG. 21C is a screenshot showing the virtual object and haptic/graphical user interface element of FIG. 21A during a user "click-and-drag" at a hotspot for translating texture, where the cursor is haptically constrained to the user-defined region on the surface of the virtual object, and where the user has dragged the cursor to the left and downward; the user movement results in the translation of the wrapped texture within the user-defined region to a new position, according to an illustrative embodiment of the invention.

FIG. 20 is a block diagram 2000 featuring an interactive method for translating texture within a region using a haptic/graphical user interface element (widget). A hotspot located at the widget origin allows the user to translate texture applied within a user-defined region on the surface of a 3D virtual object. Any combination of the actions shown in the block diagram 2000 of FIG. 20 may be included in a method to provide the user with visual and haptic feedback as the user utilizes the widget to translate texture across the surface of the virtual object. As the user manipulates the cursor/tool such that it approaches within a predetermined distance of the widget origin, haptic feedback is delivered to the user via a haptic interface device, and the cursor/tool snaps to the hotspot at the origin, as indicated in step 2002 of FIG. 20. FIG. 21A is a screenshot 2100 showing the virtual object 1802 and widget 1804 of FIG. 18A following a haptic snap at the widget origin 1808. The aforementioned view-apparent selection method may be implemented to allow the user to select the hotspot 1808 based on a two-dimensional correspondence of the hotspot location and the cursor/tool location.

Step 2004 of the block diagram 2000 of FIG. 20 indicates that a set of four orthogonal arrows emanating from the snap point at the widget origin 1808 is displayed to provide a visual cue to the user that the translation function is available upon clicking at this hotspot. The four arrows lie in the base plane of the widget 1804 and are aligned with the X- and Y-axes of the widget 1804. The "four arrows" cue 2104 is shown in FIG. 21A.

If the user chooses to activate a texture translation operation, she may click at the hotspot at the widget origin 1808, as indicated in step 2006 of FIG. 20, and drag at any location within a constrained space. Any combination of steps 2008, 2010, 2012, 2014, 2016, 2018, and 2020 may be performed in any order to provide haptic and graphical feedback to the user to facilitate a translation of the texture 2102, as shown in FIGS. 21A, 21B, and 21C. As the user drags the hotspot 1808, the "four arrows" cue 2104 continues to be displayed at the updated cursor/tool position, as indicated in step 2008 of FIG. 20. In step 2010, a texture translation corresponding to the updated cursor/tool position is determined and displayed to the user. The texture translation displayed in step 2010 may be a preview of changes that would be made to the underlying model if the user ends the click-and-drag operation at the current, updated cursor/tool position.

As the user performs the click-and-drag operation in the method 2000 of FIG. 20 for translating mapped texture, the cursor/tool is constrained to the region bound by the user-drawn curve 1806 to which the texture is mapped, as indicated in step 2012 of FIG. 20 and as illustrated in FIGS. 21A, 21B, and 21C. Superimposed on this haptic constraint is a haptic detent at the initial click position, as indicated in step 2020 of FIG. 20. The haptic detent allows a user to find the original click position and effectively cancel a texture translation adjustment. During the click-and-drag operation, the user is provided visual feedback as indicated in steps 2014, 2016, and 2018 of FIG. 20. In step 2014, the position of the widget 1804 is dynamically updated according to the new cursor/tool position, as the user drags the hotspot. In step 2016, the base plane and surface normal orientation is dynamically updated according to the new cursor/tool position so that the X-, Y-, and Z-axes of the widget 1804 may be properly displayed as the user moves the widget across the surface of the virtual object 1802. Furthermore, a "ghost" image of the widget as it appeared at the initial click position may be displayed as indicated in step 2018, to serve as a visual cue of the original user click position. The ghost image may be a thin, grey version of the widget.

FIG. 21A is a screenshot 2100 showing the virtual object 1802 and haptic/graphical user interface element of FIG. 18A following a haptic snap to the hotspot 1808 for translating texture along the surface of the virtual object 1802. FIG. 21B is a screenshot 2120 during a user click-and-drag operation at the hotspot 1808, where the cursor/tool is haptically constrained to the user-defined region 1806 on the surface of the virtual object 1802. In FIG. 21B, the user has dragged the cursor to the left and slightly downward of the original location shown in FIG. 21A. The resulting translation of the texture 2102 may be noted by comparing screenshots 2100 and 2120. A ghost image at the original click position is shown at reference 2122 in FIGS. 21B and 21C. The screenshot 2140 of FIG. 21C shows that the user has dragged the cursor, along with the widget 1804 and texture 2102, further to the left, and downward of the position in FIG. 21B.

Figure 22:
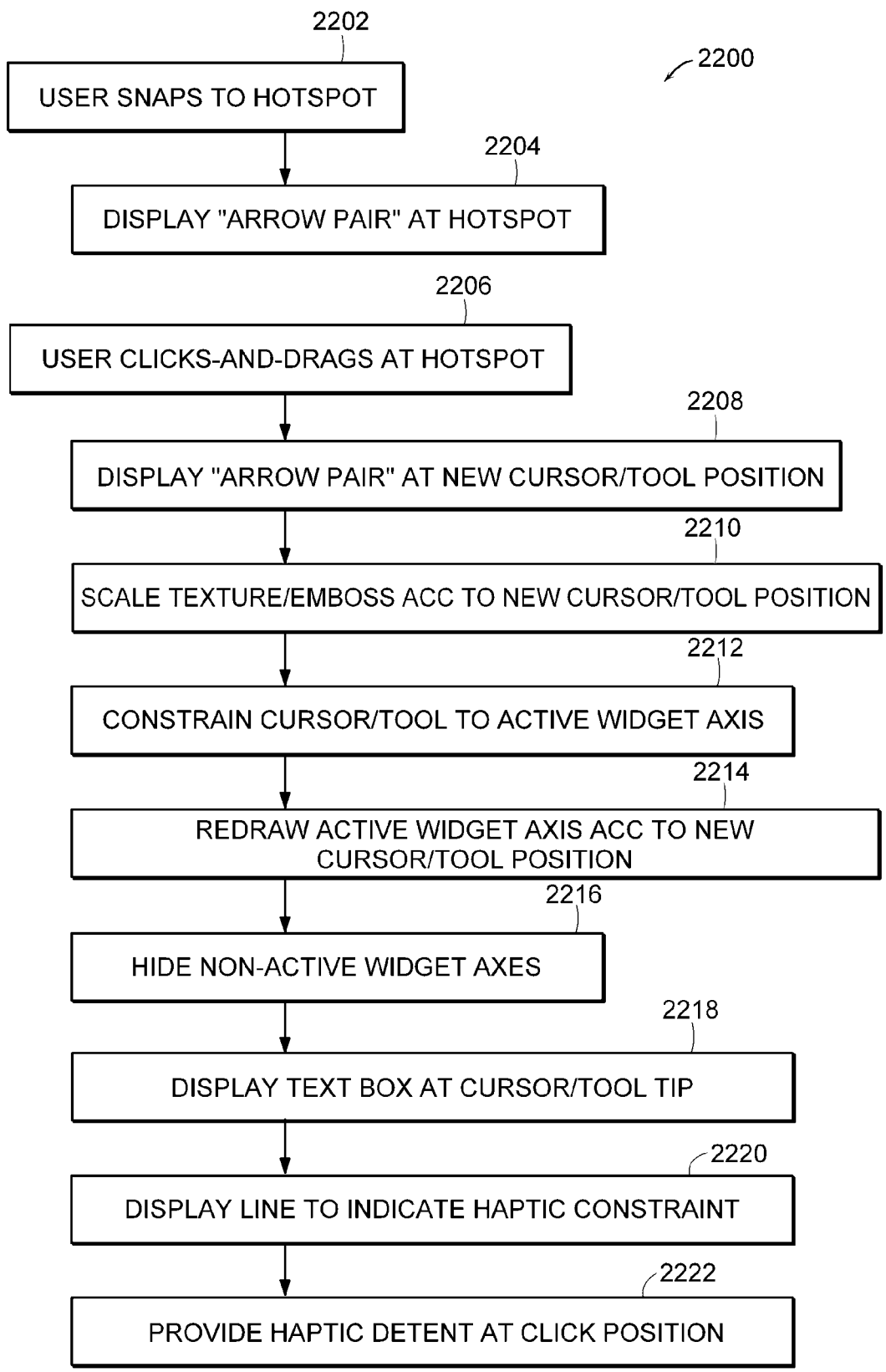
FIG. 22 is a block diagram featuring an interactive method for scaling texture within a region, where the method provides a haptic/graphical interface element having one or more "hotspots" for scaling texture, according to an illustrative embodiment of the invention.
Figure 24A:
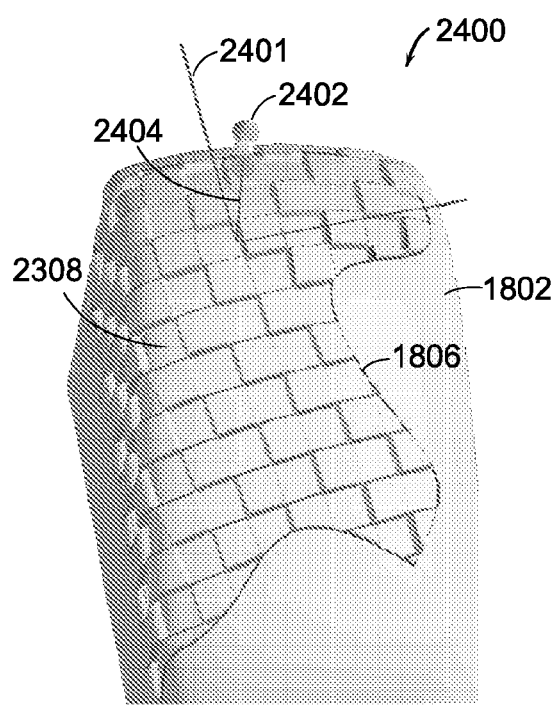
FIG. 24A is a screenshot showing the virtual object and haptic/graphical user interface element of FIG. 18A following a haptic "snap" to an "end arrow" hotspot located at the z-axis tip of the H/GUI element, where the hotspot allows the user to adjust embossing height/depth applied within the user-defined region, according to an illustrative embodiment of the invention.

FIG. 22 is a block diagram 2200 featuring an interactive method for scaling texture using a haptic/graphical user interface element (widget). Three hotspots located at the tips of the X-, Y- and Z-axes, as shown at references 1810, 1812, and 1814 of FIG. 18A, allow the user to scale the length, width, and depth/height of texture applied within a user-defined region on the surface of a 3D virtual object. Depth and/or height adjustments are applicable for textures that are embossed on the surface of the virtual object. Any combination of the actions shown in the block diagram 2200 of FIG. 22 may be included in a method to provide the user with visual and haptic feedback as the user utilizes the widget to scale the length, width, and/or depth/height of the texture. As the user manipulates the cursor/tool such that it approaches within a predetermined distance of any of the three hotspots 1810, 1812, 1814 the cursor/tool snaps to the corresponding hotspot, as indicated in step 2202 of FIG. 22. FIG. 23A is a screenshot 2300 showing the virtual object 1802 and widget 1804 of FIG. 18A following a haptic snap at the Y-axis scaling hotspot 1812. FIG. 24A is a screenshot 2400 showing the virtual object 1802 and widget 1804 of FIG. 18A following a haptic snap at the Z-axis scaling hotspot 1814. The aforementioned view-apparent selection method may be implemented to allow the user to select any hotspot based on a two-dimensional correspondence of the hotspot location and the cursor/tool location.

Step 2204 of the block diagram 2200 of FIG. 22 indicates that a pair of arrows emanating from the snap point is displayed to provide a visual cue to the user that the X-axis, Y-axis, or Z-axis scaling function is available upon clicking at this hotspot. The arrow pair lies along the corresponding axis of the widget 1804. The "arrow pair" cue is shown in FIGS. 23A, 23B, and 23C at reference 2304, and in FIGS. 24A and 24B at reference 2402.

If the user chooses to activate a texture scaling operation, she may click at the corresponding hotspot 1810, 1812, 1814 of the widget 1804, as indicated in step 2206 of FIG. 22, and drag the cursor/tool anywhere along a constrained path or within a constrained region. Any combination of steps 2208, 2210, 2212, 2214, 2216, 2218, 2220, and 2222 may be performed in any order to provide haptic and graphical feedback to the user to facilitate scaling of the texture 2308, as shown in FIGS. 23A, 23B, 23C, 24A, and 24B. FIGS. 23A, 23B, 23C, 24A, 24B feature a texture 2308 represented on the surface of the virtual object 1802 as an embossing pattern, but the texture 2308 may alternately be represented, for example, as a two-dimensional image or repeating pattern. As the user drags the hotspot 1810, 1812, or 1814, the "arrow pair" cue continues to be displayed at the updated cursor/tool position, as indicated in step 2208 of FIG. 22. In step 2210, a scaled texture corresponding to the updated cursor/tool position is determined and displayed to the user. The scaled texture displayed in step 2210 may be a preview of changes that would be made to the underlying model if the user ends the click-and-drag operation at the current, updated cursor/tool position.

As the user performs the click-and-drag operation in the method 2200 of FIG. 22 for scaling mapped texture, the cursor/tool is constrained to the respective axis along which the texture is scaled, as indicated in step 2212 of FIG. 22 and as illustrated in FIGS. 23A, 23B, 23C, 24A, and 24B. A thin grey line is rendered along the corresponding widget axis, extending beyond the widget origin and corresponding axis hotspot, to visually indicate the presence of the haptic constraint. Superimposed on this haptic constraint is a haptic detent at the initial click position, as indicated in step 2222 of FIG. 22. The haptic detent allows a user to find the original click position and effectively cancel a texture scaling adjustment. During the click-and-drag operation, the user is provided visual feedback, as indicated in steps 2214, 2216, 2218, and 2220 of FIG. 22. In steps 2214 and 2216, the active widget axis is repeatedly redrawn with varying length, according to the movement of the cursor/tool, while the nonactive axes are either hidden from view or made thinner and/or less noticeable. A text box is rendered near the tool position, according to step 2218. The text box displays relevant text about the texture scale for the case of X-axis or Y-axis adjustment, or about the emboss height for the case of Z-axis adjustment. In step 2220, a line is displayed to visually indicate the location of the original user click position.

Figure 24B:
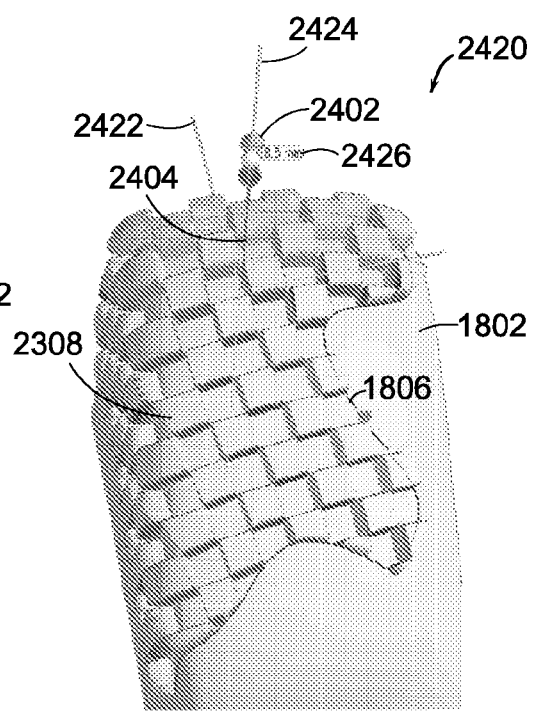
FIG. 24B is a screenshot showing the virtual object and haptic/graphical user interface element of FIG. 24A during a user "click-and-drag" at a hotspot for adjusting texture embossing height/depth, where the cursor is haptically constrained to the z-axis, and where the user has dragged the cursor along the z-axis to adjust embossing height to 8.5 mm, according to an illustrative embodiment of the invention.

FIG. 23A is a screenshot 2300 showing the virtual object 1802 and haptic/graphical user interface element (widget) 1804 of FIG. 18A following a haptic snap to the hotspot 1810 for scaling texture 2308 along the X-axis 2306 of the widget. FIG. 23B is a screenshot 2320 during a user "click-and-drag" operation at the hotspot 1810, where the cursor/tool is haptically constrained to the user-defined region 1806 on the surface of the virtual object 1802. In FIG. 23B, the user has dragged the cursor along the X-axis such that the tile size of the texture 2308 is increased to 66.0×66.0 mm. The updated scaling value is indicated by the text box 2324. In FIGS. 23B and 23C, the axes of the texture aligning with both the X- and Y-axes are scaled simultaneously, according to an adjustment, here, of the X-axis hotspot. A similar adjustment may be made using the Y-axis hotspot. In another embodiment, the X-axis and Y-axis are scaled separately. The screenshot 2340 of FIG. 23 shows that the user has further dragged the cursor along the X-axis of the widget 2322 to increase the tile size of the texture 2308 to 91.4×91.4 mm. FIG. 24A is a screenshot 2400 showing the virtual object 1802 and widget of FIG. 18A following a haptic snap to the Z-axis end-arrow hotspot 1814. The user clicks-and-drags the Z-axis hotspot 1814 to adjust an embossing height and/or depth applied within the user defined region 1806 on the surface of the virtual object 1802. FIG. 24A shows a visual representation of the Y-axis 2401 of the widget 2404 following a haptic snap to the Z-axis hotspot 1814. FIG. 24B is a screenshot 2420 showing the widget 2404 following an adjustment of the depth of the applied texture 2308 to 8.5 mm, as indicated by the text box 2426. The inactive axes are visually diminished 2422, while a thin grey line 2424 indicates the haptic constraint along the Z-axis in effect during the click-and-drag operation performed by the user.

Figure 25:
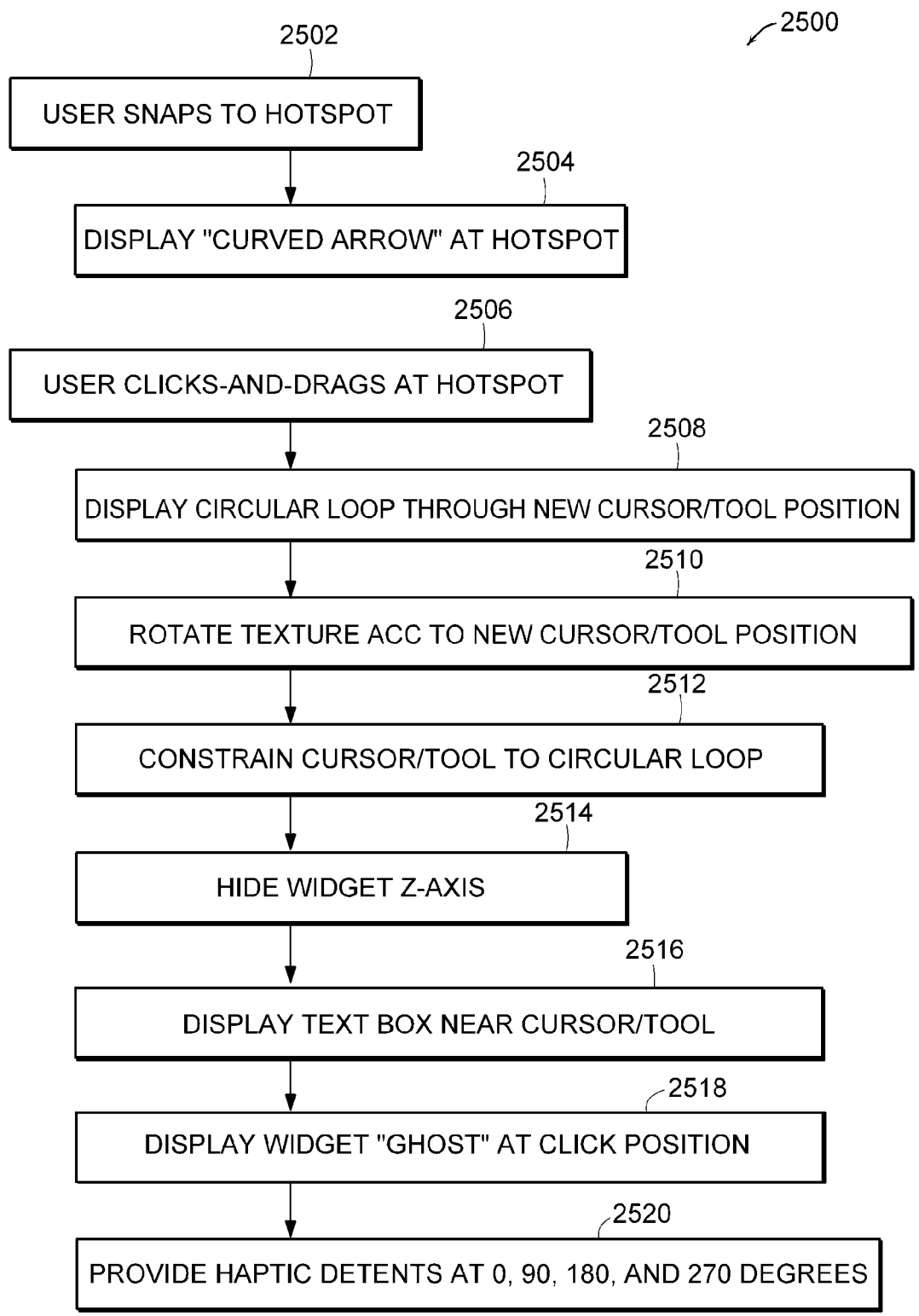
FIG. 25 is a block diagram featuring an interactive method for rotating texture within a region, where the method provides a haptic/graphical user interface element having "hotspots" along its x- and y-axes for rotating texture, according to an illustrative embodiment of the invention.
Figure 26:
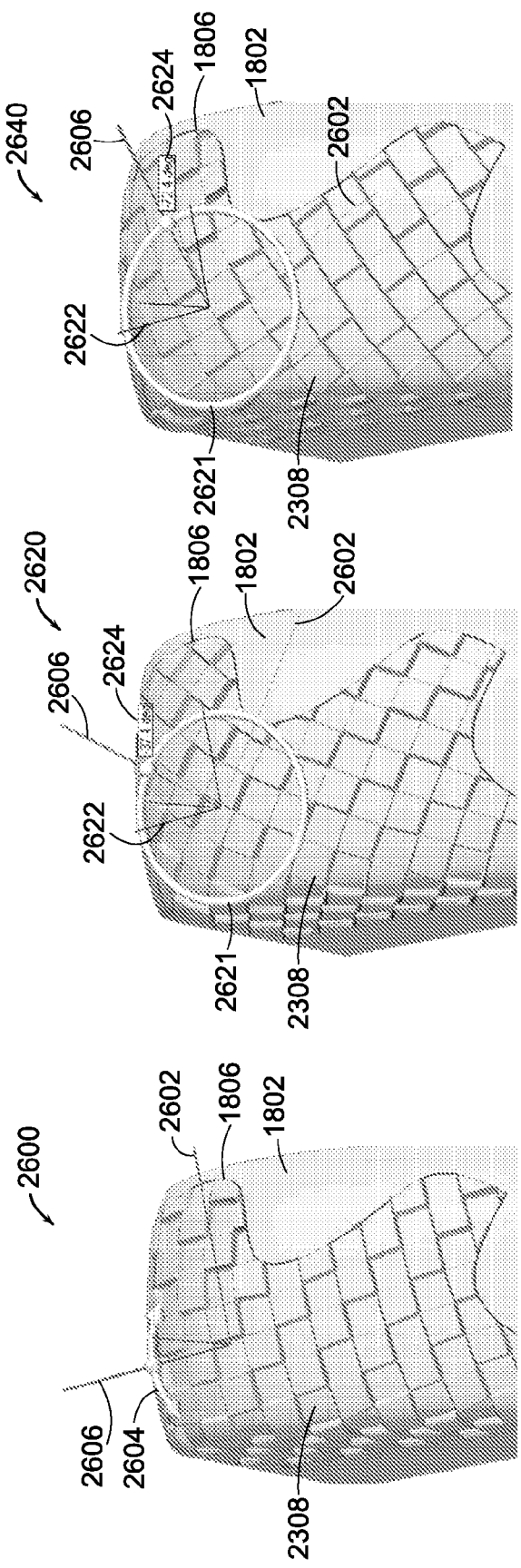
FIG. 26A is a screenshot showing the virtual object and haptic/graphical user interface element of FIG. 18A following a haptic "snap" to a hotspot that allows the user to rotate texture applied within the user-defined region, according to an illustrative embodiment of the invention.
FIG. 26B is a screenshot showing the virtual object and haptic/graphical user interface element of FIG. 26A during a user "click-and-drag" at either the x-axis or y-axis "midline" hotspot for rotating texture applied within the user-defined region, where the cursor is haptically constrained to a circular loop, and where the user has dragged the cursor along the loop −37.4 degrees from the click point, according to an illustrative embodiment of the invention.
FIG. 26C is a screenshot showing the virtual object and haptic/graphical user interface element of FIG. 26A during a user "click-and-drag" at either the x-axis or y-axis "midline" hotspot for rotating texture applied within the user-defined region, where the cursor is haptically constrained to a circular loop, and where the user has dragged the cursor along the loop −72.4 degrees from the click point, according to an illustrative embodiment of the invention.

FIG. 25 is a block diagram 2500 featuring an interactive method for rotating texture applied within a region using a haptic/graphical user interface element (widget). Two hotspots located in the base plane of the widget, one at each midpoint of the X- and Y-axes, allow the user to translate texture applied within a user-defined region on the surface of a 3D virtual object. Any combination of the actions shown in the block diagram 2500 of FIG. 25 may be included in a method to provide the user with visual and haptic feedback as the user utilizes the widget to rotate the texture. As the user manipulates the cursor/tool such that it approaches within a predetermined distance of one of the texture rotation hotspots, haptic feedback is delivered to the user via a haptic interface device, and the cursor/tool snaps to the corresponding hotspot, as indicated in step 2502 of FIG. 25. FIG. 26A is a screenshot 2600 showing the virtual object 1802 and widget

1804 of FIG. 18A following a haptic snap at a texture rotation hotspot 1818. The aforementioned view-apparent selection method may be implemented to allow the user to select the hotspot 1818 based on a two-dimensional correspondence of the hotspot location and the cursor/tool location.

Step 2504 of the block diagram 2500 of FIG. 25 indicates that a double-ended curved arrow 2604 (FIG. 26A), the arrows of which emanate from the cursor/tool position, is displayed to provide a visual cue to the user that the rotation function is available upon clicking at this hotspot. If the user chooses to activate a texture rotation operation, she may click-and-drag at the hotspot, as indicated in step 2506 of FIG. 25. Any combination of steps 2508, 2510, 2512, 2514, 2516, 2518, and 2520 may be performed in any order to provide haptic and graphical feedback to the user, thereby facilitating a rotation of the texture 2308 by the user, as shown in FIGS. 26A, 26B, and 26C. As the user clicks the hotspot and/or begins to drag the hotspot, the curved arrow visual cue is replaced with a circular loop 2621, as shown in FIGS. 26B and 26C, about which the cursor/tool is constrained. Movement of the cursor/tool about this circular constraint path is indicated in the screenshots 2620, 2640 in FIGS. 26B and 26C. The haptic constraint limits manipulation of the cursor/tool to a circular path according to step 2512 of FIG. 25. In step 2510, a texture rotation corresponding to the updated cursor/tool position is determined and displayed to the user. The texture rotation displayed in step 2510 may be a preview of changes that would be made to the underlying model if the user ends the click-and-drag texture rotation operation at the current, updated cursor/tool position.

Superimposed on the circular path haptic constraint are haptic detents at various locations along the path. For example, in one example, there are haptic detents at 0, 90, 180, and 270 degrees around the circular path, where 0 degrees corresponds to the original click point. The user is provided visual feedback during the click-and-drag texture rotation operation, as indicated in steps 2514, 2516, and 2518 of FIG. 25. In step 2514, the Z-axis of the widget is hidden. Additionally, the inactive X-axis or Y-axis of the widget may be hidden as well. In step 2516, a text box is displayed to indicate the degree of texture rotation at the current, updated cursor/tool position. Furthermore, in step 2518, a ghost image of the widget as it appeared at the initial click position is displayed.

FIG. 26A is a screenshot 2600 showing the virtual object 1802 and haptic/graphical user interface element (widget) 1804 following a haptic snap to one of the hotspots 1816, 1818 for rotating texture that is mapped onto the surface of the virtual object 1802. The active Y-axis of the widget is indicated at reference 2606, and this axis is dynamically updated according to the user manipulation of the cursor/tool about the constraint ring 2621, as shown in FIGS. 26B and 26C. The inactive X-axis is indicated by a thin grey line 2602 or is hidden. A text box 2624 dynamically indicates a numerical rotation value corresponding to the current cursor/tool position. In FIG. 26B, the user has rotated the texture 2308 by −37.4 degrees from the click position; and in FIG. 26C, the user has rotated the texture 2308 by −72.4 degrees from the original click position. The texture 2308 shown in FIGS. 26A, 26B, and 26C is an embossing pattern. The texture 2308 may alternatively be an image or a repeating (tiled) two-dimensional pattern, for example.

Dynamic adjustment of texture according to user manipulation of the widget 1804 involves modifying the transformation matrix Q, described above. For example, step 2010 of FIG. 20 for translating texture, step 2210 of FIG. 22 for scaling texture, and step 2510 of FIG. 25 for rotating texture each involve changing the transformation matrix Q in a specific way to affect the respective texture adjustment corresponding to a new cursor/tool position.

The transformation matrix Q is a 3×3 general transformation matrix whose inverse $Q^{-1}$ transforms 2D coordinates (p,q) into final texture coordinates (s,t). The origin 1808 of the widget 1804, for example, as shown in FIG. 18A, is initially at Cartesian location OrigC on the first patch, which maps to texture coordinate OrigT according to the output of the planar second patch. As described above, the first patch relates a (u,v) parameter space to the XYZ coordinate space of the virtual object 1802; the (u,v) parameter space is shared by a planar second patch, upon which the texture is superimposed; and the second patch relates the (u,v) parameter space to a 2D "intermediate" (p,q) coordinate space. When a user clicks on a widget hotspot, its 3D position, $X_0$, in Cartesian object space maps to a unique 2D position, $S_0$, on the planar second patch, and the as-yet unadjusted texture is associated with current transformation matrix $Q_0$. The texture coordinate at the click location at the moment of the click, $T_0$, is determined according to Equation 5 as follows:

$$T_0 = S_0 * Q_0 \tag{5}$$

When the user performs a drag operation at a hotspot and moves the cursor/tool to a new position, $X_1$, in Cartesian object space, a new transformation matrix $Q_1$ is determined and used to render the adjusted texture according to the mapping methods described herein. Methods of determining $Q_1$ for translation, scaling, and rotation texture adjustments are described in more detail as follows.

The method of determining $Q_1$ for translation of mapped texture to a new position, $X_1$, begins by determining the point $S_1$ on the second patch to which $X_1$ maps. Then, T is defined according to Equation 6 as follows:

$$T = S_1 * Q_0 \tag{6}$$

and a distance d between T and $T_0$ is determined according to Equation 7 as follows:

$$d = T - T_0 \tag{7}$$

where $(d_s, d_t)$ are components of d in texture space. Then, matrix $M_{trans}$ is defined according to Equation 8 as follows:

$$M_{trans} = \begin{pmatrix} 1 & 0 & d_s \\ 0 & 1 & d_t \\ 0 & 0 & 1 \end{pmatrix} \tag{8}$$

and $Q_1$ then follows according to Equation 9:

$$Q_1 = Q_0 * M_{trans} \tag{9}$$

The method for determining $Q_1$ for scaling mapped texture according to a new location, $X_1$, to which the user drags a scaling hotspot begins by determining the distance between the location of the cursor/tool and the widget origin, expressed as a multiplicative factor. Thus, a scalar ratio, r, is determined according to Equation 10 as follows:

$$r = \frac{|X_1 - OrigC|}{|X_0 - OrigC|} \tag{10}$$

where ‖ denotes a Euclidian norm. The transformation matrix is scaled by the ratio r, but with the condition that the widget origin must retain its relative texture location OrigT. Thus, an offset scale matrix is determined according to Equation 11 as follows:

$$M_{offscale} = \begin{pmatrix} r & 0 & -OrigT_s^*(r-1) \\ 0 & r & -OrigT_t^*(r-1) \\ 0 & 0 & 1 \end{pmatrix} \quad (11)$$

and $Q_1$ then follows according to Equation 12:

$$Q_1 = Q_0 * M_{offscale} \quad (12)$$

When scaling the height of an embossing pattern, the ratio r is computed according to Equation 10 above, and the original, pre-drag, emboss height $h_0$ is scaled to determine new emboss height $h_1$, according to Equation 13 as follows:

$$h_1 = h_0 * r \quad (13)$$

The method of determining $Q_1$ for rotation of mapped texture proceeds by performing a mathematical coordinate transformation to express the new cursor/tool position using polar coordinates within the base plane of the widget 1804. Thus, the new cursor/tool position is expressed as an angle a and a radius, where the radius is measured with respect to the widget origin 1808, and the angle is measured about the widget origin 1808 in relation to a line from the origin to the original click point $X_0$. Thus, the angle a at $X_0$ is 0 degrees, and increases as the tool moves counterclockwise along a circle about the origin. $Q_1$ is computed such that it rotates the texture by angle α about the texture coordinate $T_0$. Since $T_0$ is not generally co-located with the origin, an offset rotation matrix, $M_{offrot}$, is determined, and $Q_1$ is computed according to Equation 14 as follows:

$$Q_1 = Q_0 * M_{offrot} \quad (14)$$

In an alternative embodiment, the X- and Y-axes of the widget are replaced with a disk or a circular hoop. The user clicks on any point of the circular hoop, or on any point on the edge of the disk, to scale and/or rotate the mapped texture. Thus, the four hotspots 1810, 1812, 1816, 1818 associated with the X- and Y-axes of the widget shown in FIG. 18A are replaced by a single representation (disk or circular hoop). The method for determining $Q_1$ for a scaling, rotation, or combined scaling/rotation uses a combination of the methods described above, and includes decomposing a new cursor/tool position into an angle a and a radius, expressing the change in radius as a ratio r, and applying two transformation matrices simultaneously to rotate by the angle a and scale according to the ratio r at the same time.

A user may reposition a widget 1804, such as the widget shown in FIG. 18B, by clicking on a new point within the mapped region 1822 on the surface of the virtual object 1802. This facilitates manipulation of a haptic interface device by allowing the user to reset the position of the haptic interface device that corresponds to the widget origin 1808. This action does not result in an adjustment of the texture.

Figure 27:
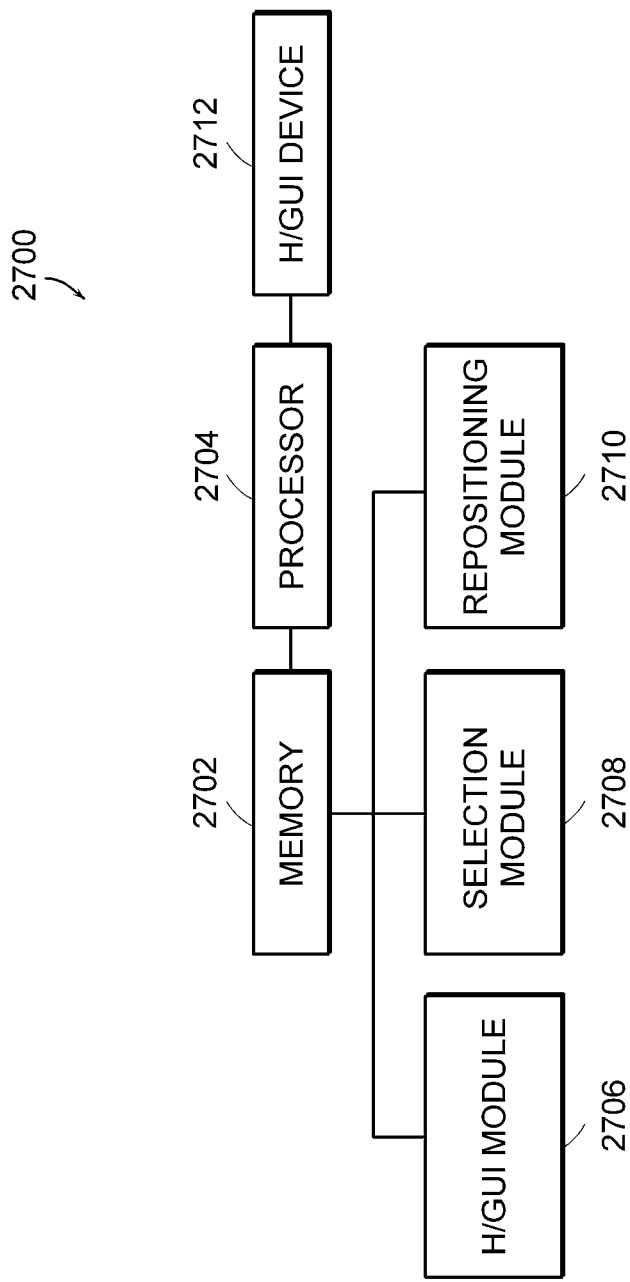
FIG. 27 is a block diagram 2700 featuring an apparatus for adjusting a texture within a user-defined region of the surface of a 3D virtual object, according to an illustrative embodiment of the invention.

FIG. 27 is a block diagram 2700 featuring an apparatus for adjusting a texture within a user-defined region of the surface of a 3D virtual object, according to the methods described herein. The apparatus includes a memory 2702 for storing a code that defines a set of instructions, and a processor 2704 for executing the set of instructions. The code includes a graphical user interface module 2706 adapted to provide a graphical user interface element (widget) having one or more hotspots for adjusting a texture within a user-defined region of the surface of a 3D virtual object, according to the methods described herein. In one embodiment, the graphical user interface module 2706 is a haptic/graphical user interface module. The code may also include a selection module 2708 adapted to select one of the widget hotspots based on a two-dimensional correspondence of the hotspot location and the cursor position. For example, the view-apparent selection method described above may be implemented by the selection module. The code may also include a repositioning module 2710 to move the cursor to a three-dimensional position corresponding to a selected hotspot. The widget is a graphical user interface element either with or without a haptic component. Preferably, the widget is a haptic/graphical user interface (H/GUI) element, where at least one hotspot of the widget is associated with haptic feedback. The apparatus of FIG. 27 may include a H/GUI device 2712 in communication with the processor 2704. For example, the H/GUI device 2712 may be the Phantom® haptic interface device manufactured by SensAble Technologies, Inc., in Woburn, Mass., described in U.S. Pat. No. 6,417,638, issued to guy et al., the text of which is incorporated by reference in its entirety. The H/GUI device 2712 allows a user to manipulate the cursor/tool and provides haptic feedback to the user. Force associated with the haptic feedback may be determined according to the H/GUI module 2706.

A computer hardware apparatus may be used in carrying out any of the methods described herein. The apparatus may include, for example, a general purpose computer, an embedded computer, a laptop or desktop computer, or any other type of computer that is capable of running software, issuing suitable control commands, receiving graphical user input, and recording information. The computer typically includes one or more central processing units for executing the instructions contained in software code that embraces one or more of the methods described herein. The software may include one or more modules recorded on machine-readable media, where the term machine-readable media encompasses software, hardwired logic, firmware, object code, and the like. Additionally, communication buses and I/O ports may be provided to link any or all of the hardware components together and permit communication with other computers and computer networks, including the internet, as desired.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A non-transitory computer-readable medium, wherein the computer-readable medium stores instructions that, when executed by a processor, cause the processor to:
   identify an arbitrarily-shaped user-defined region of a surface of a three-dimensional virtual object, wherein a boundary of the user-defined region includes one or more curved sections;
   for each location of a plurality of locations within the user-defined region:
      map the respective location to a corresponding location in a texture, and
      assign to the respective location a graphical value associated with the corresponding location; and
   provide, for graphical rendering in a display area of a user device, information comprising at least a portion of the three-dimensional virtual object, wherein the portion of the three-dimensional virtual object comprises the user-defined region, and the portion of the three-dimensional virtual object has the texture applied thereon.

2. The computer-readable medium of claim 1, wherein the instructions, when executed, further cause the processor to:

receive, from the user device, a first user input corresponding to a user interaction with the surface of the three-dimensional virtual object;

receive, from the user device, a second user input corresponding to a second user interaction with the surface of the three-dimensional virtual object;

responsive to receiving the second user input, provide, for rendering to the display area, updated information comprising the portion of the three-dimensional virtual object with an adjusted texture mapping.

3. The computer-readable medium of claim 2, wherein the first user input identifies a first location of the plurality of locations.

4. The computer-readable medium of claim 3, wherein the first user input identifies at least one of (a) a translation of the texture, (b) a rotation of the texture, and (c) a scaling of the texture.

5. The computer-readable medium of claim 4, wherein:

the second user input identifies a second location of the plurality of locations; and the instructions, when executed, further cause the processor to, responsive to the second user input:

provide, to the user device, haptic information to cause haptic feedback to a user input device of the user device based at least in part upon a position of the second location relative to the first location.

6. The computer-readable medium of claim 5, wherein:

the first user input identifies the rotation of the texture; and the user is haptically constrained to a circle, wherein a region of the circle is defined relative to the first location.

7. The computer-readable medium of claim 5, wherein:

The first user input identifies the translation of the texture; and the second user input corresponds to a dragging gesture.

8. The computer-readable medium of claim 7, wherein the instructions, when executed, further cause the processor to:

receive, from the user device, a third user input identifying a third location of the plurality of locations, wherein the third user input corresponds to a release gesture; and responsive to the release gesture, update a volumetric representation of the three-dimensional virtual object to reflect the texture adjustment.

9. The computer-readable medium of claim 8, wherein updating the volumetric representation of the three-dimensional virtual object comprises applying a translation matrix to map the texture to the volumetric representation of the three-dimensional virtual object.

10. The computer-readable medium of claim 4, wherein the texture is an image.

11. The computer-readable medium of claim 2, wherein the first user input identifies a normal to the surface of the three-dimensional object at the first location.

12. The computer-readable medium of claim 11, wherein the three-dimensional virtual object is represented in a first coordinate space and the two-dimensional texture is represented in a second coordinate space.

13. The computer-readable medium of claim 1, wherein the user device comprises the processor.

14. The computer-readable medium of claim 1, wherein the graphic value comprises a color value.

15. The computer-readable medium of claim 1, wherein the texture is a two-dimensional texture.

16. A system comprising:

a processor; and a memory comprising instructions, wherein the instructions, when executed by the processor, cause the processor to:

identify an arbitrarily-shaped user-defined region of a surface of a three-dimensional virtual object, wherein a boundary of the user-defined region includes one or more curved sections;

for each location of a plurality of locations within the user-defined region:

map the respective location to a corresponding location in a texture, and assign to the respective location a graphical value associated with the corresponding location; and provide, for graphical rendering in a display area of a user device, information comprising at least a portion of the three-dimensional virtual object, wherein the portion of the three-dimensional virtual object comprises the user-defined region, and the portion of the three-dimensional virtual object has the texture applied thereon.

* * * * *